United States Patent
Omata et al.

(10) Patent No.: US 9,172,322 B2
(45) Date of Patent: Oct. 27, 2015

(54) CONTROL APPARATUS FOR AC MOTOR

(71) Applicant: DENSO CORPORATION, Kariya, Aichi-pref. (JP)

(72) Inventors: Ryuji Omata, Anjo (JP); Takeshi Itoh, Nagoya (JP); Hirofumi Kako, Chita-gun (JP); Takashi Suzuki, Anjo (JP)

(73) Assignee: DENSO CORPORATION, Kariya (JP)

( * ) Notice: Subject to any disclaimer, the term of this patent is extended or adjusted under 35 U.S.C. 154(b) by 60 days.

(21) Appl. No.: 14/067,508

(22) Filed: Oct. 30, 2013

(65) Prior Publication Data

US 2014/0117893 A1     May 1, 2014

(30) Foreign Application Priority Data

Nov. 1, 2012   (JP) .................................. 2012-242126
Jul. 3, 2013    (JP) .................................. 2013-139790

(51) Int. Cl.
*H02P 21/00*     (2006.01)
*H02P 21/14*     (2006.01)

(52) U.S. Cl.
CPC .............. *H02P 21/14* (2013.01); *H02P 21/148* (2013.01)

(58) Field of Classification Search
CPC ..... H02P 21/00; H02P 21/0021; H02P 21/14; H02P 6/08; B60L 11/1803
USPC ............. 318/400.01, 400.02, 400.12, 400.14, 318/400.15, 700, 701, 721, 727, 599, 800, 318/801, 430, 432, 437; 388/800, 811, 812, 388/814, 819, 820, 823
See application file for complete search history.

(56) References Cited

U.S. PATENT DOCUMENTS

| | | | | |
|---|---|---|---|---|
| 6,229,719 | B1 * | 5/2001 | Sakai et al. | 363/37 |
| 6,260,644 | B1 * | 7/2001 | Otsu | 180/65.25 |
| 7,271,557 | B2 * | 9/2007 | Ajima et al. | 318/400.01 |
| 2008/0079385 | A1 * | 4/2008 | Hashimoto et al. | 318/801 |
| 2009/0026988 | A1 * | 1/2009 | Tomigashi | 318/400.02 |
| 2009/0237013 | A1 * | 9/2009 | Sato | 318/400.02 |
| 2010/0117586 | A1 * | 5/2010 | Akiyama | 318/801 |
| 2010/0123418 | A1 | 5/2010 | Itoh et al. | |
| 2010/0176757 | A1 * | 7/2010 | Yamakawa et al. | 318/400.09 |
| 2011/0133678 | A1 * | 6/2011 | Tomigashi | 318/400.04 |
| 2013/0278187 | A1 | 10/2013 | Suzuki et al. | |

FOREIGN PATENT DOCUMENTS

| | | |
|---|---|---|
| JP | 2004-159391 | 6/2004 |
| JP | 2008-050075 | 3/2008 |
| JP | 2010-178444 | 8/2010 |

OTHER PUBLICATIONS

Office Action (4 pages) dated Oct. 21, 2014, issued in corresponding Japanese Application No. 2013-139790 and English translation (3 pages).

* cited by examiner

*Primary Examiner* — Antony M Paul
(74) *Attorney, Agent, or Firm* — Nixon & Vanderhye P.C.

(57) ABSTRACT

A current estimation section of a motor control apparatus carries out the following processing. When an AC motor is controlled under a current feedback control scheme (sine wave control mode or overmodulation control mode), a β-axis current iβ is calculated based on a current detection value iw_sns in a sensor phase and a current command value iv* in one other phase. When the AC motor is controlled under a torque feedback control scheme (rectangular wave control mode), the β-axis current iβ is calculated based on a differential value Δiα of an α-axis current. Then a sensor phase reference current phase θx is calculated to estimate a U-phase current. Thus it is possible to use the current feedback control scheme and the torque feedback control scheme together.

16 Claims, 31 Drawing Sheets

FIG. 3

| FEEDBACK CONTROL | CURRENT FEEDBACK | | TORQUE FEEDBACK |
|---|---|---|---|
| CONTROL MODE | SINE WAVE PWM | OVERMODULATION PWM | RECTANGULAR WAVE (ONE PULSE) |
| INVERTER OUTPUT VOLTAGE | BASIC WAVE | BASIC WAVE | BASIC WAVE |
| MODULATION RATE | 0 TO 0.61 | MAX (SINE WAVE) TO 0.78 | 0.78 |
| CHARACTERISTIC | SMALL TORQUE VARIATION | HIGH OUTPUT IN INTERMEDIATE SPEED RANGE | HIGH OUTPUT IN HIGH SPEED RANGE |

THREE-PHASE CURRENT DETECTION VALUE AT SWITCH TIME

THREE-PHASE CURRENT DETECTION VALUE AT INTERMEDIATE TIME

COMPARATIVE EXAMPLE

COMPARATIVE EXAMPLE

FIRST EMBODIMENT

FIRST EMBODIMENT

CONTROL APPARATUS FOR AC MOTOR

CROSS REFERENCE TO RELATED APPLICATION

This application is based on and incorporates herein by reference Japanese patent applications No. 2012-242126 filed on Nov. 1, 2012 and No. 2013-139790 filed on Jul. 3, 2013.

FIELD

The present disclosure relates to a control apparatus for an AC motor, which detects a phase current in one of three phases with a current sensor to control energization of an AC motor.

BACKGROUND OF THE DISCLOSURE

In recent years, electric vehicles and hybrid vehicles mounted with an AC (alternating current) motor as a drive power source for the vehicle receives attention in light of social demands for improved fuel economy and reduced exhaust emissions. For example, some hybrid vehicles are so configured that a DC (direct current) electric power supply such as a secondary battery and an AC motor are connected with each other through a power conversion device such as an inverter. A DC voltage of the DC power supply is converted into an AC voltage by the inverter to drive the AC motor. The AC motor is controlled by a control apparatus in a manner disclosed in, for example, the following patent documents.
Patent document 1: JP-A-2004-159391
Patent document 2: JP-A-2010-124544
Patent document 3: JP-A-2008-86139

With respect to a control apparatus for an AC motor mounted in such a hybrid vehicle or an electric vehicle, it is known that a current sensor for detecting a phase current is provided only in one phase and not provided in other phases. The number of current sensors, the size of the vicinity of the three phase output terminals of the inverter, and the cost of a control system for the AC motor are thereby reduced. For example, a current estimation value in the phases (for example, U-phase and V-phase) other than a sensor phase (W-phase) is calculated based on a current detection value in one "sensor phase" (for example, W-phase) detected with a current sensor, a d-axis current command value and a q-axis current command value, and an electrical angle of the AC motor (for example, patent document 1 and 3).

As a control mode for an AC motor, a rectangular wave control mode is proposed (for example, patent document 2). In this control mode, a voltage utilization factor can be enhanced more than in a sine wave PWM control mode or overmodulation PWM control mode. Rectangular wave refers to a waveform, in which one cycle of current corresponds to one pulse.

The sine wave PWM control mode and overmodulation PWM control mode are equivalent to a current feedback control scheme. In this scheme, feedback is performed so that a d-axis current and a q-axis current calculated based on a detected value from a current sensor follow a d-axis current command value and a q-axis current command value. Meanwhile, in the rectangular wave control mode, the phase of a rectangular wave voltage is controlled by taking the following measure: an estimated torque is calculated from a d-axis current and a q-axis current calculated based on a detected value from a current sensor and feedback is performed so that this estimated torque follows a torque command value. This is thus equivalent to "torque feedback control scheme."

The rectangular wave control mode is employed especially in a high rotation operation range, in which weak field control is required for suppressing counter electromotive force. In this mode, an absolute value of a weak field current as a negative d-axis current is minimized. Further, it is possible to minimize the number of times of switching of an inverter to reduce switching loss. Because of these characteristics, it is effective to switch the control scheme in drive control for a motor-generator or the like of a hybrid vehicle or an electric vehicle based on the operating state, such as number of rotations and output torque, of a motor, that is, the voltage required for driving the motor. For example, the sine wave control mode is used in a low rotation range, the rectangular wave control mode is used in a high rotation range and the overmodulation control mode is used in an intermediate rotation range between the low rotation range and the high rotation range.

In AC motors mounted in hybrid vehicles or electric vehicles, the number of rotations and output torque vary more widely than in AC motors in other technical fields. Therefore, it is desired to ensure that the current feedback control scheme and the torque feedback control scheme can be used together. Therefore, it is desired to use the current feedback control scheme and the torque feedback control scheme together.

SUMMARY

It is therefore an object to provide a control apparatus for an AC motor, which detects a phase current in one of three phases with a current sensor to control energization of an AC motor and use both of a current feedback control scheme and a torque feedback control scheme.

According to one aspect, a control apparatus for an AC motor comprises an inverter for driving a three-phase AC motor, a current sensor for detecting a current flowing in a sensor phase in only one of three phases of the AC motor, and a controller for controlling energization of the AC motor by switching turn-on/off of a plurality of switching elements of the inverter. The controller switches a control scheme between a current feedback control scheme and a torque feedback control scheme in controlling energization of the AC motor. The current feedback control scheme feeds a current detection value in the sensor phase detected by the current sensor and a current estimation value based on the current detection value back to a current command value. The torque feedback control scheme feeds a torque estimation value pertaining to driving of the AC motor back to a torque command value.

Further, the controller has a current estimating section for estimating a d-axis current estimation value and a q-axis current estimation value based on the current detection value in the sensor phase, and calculates the torque estimation value based on the d-axis current estimation value and the q-axis current estimation value calculated by the current estimating section when the torque feedback control scheme is applied.

BRIEF DESCRIPTION OF THE DRAWINGS

FIG. 3 is a table schematically illustrating the control modes of an AC motor;

DETAILED DESCRIPTION OF EMBODIMENT

Figure 1:
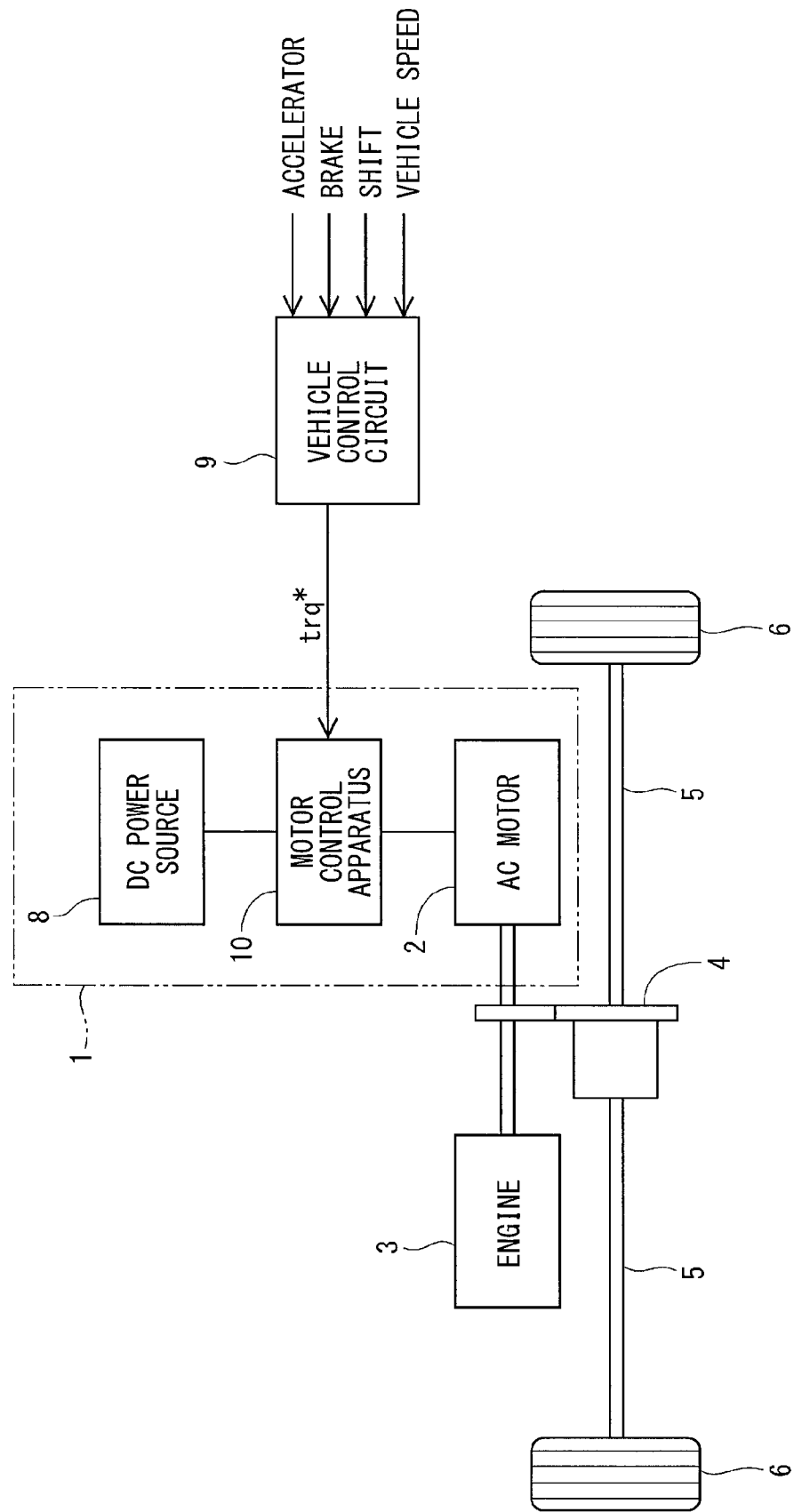
FIG. 1 is a schematic diagram illustrating the configuration of a motor drive system, to which a control apparatus for an AC motor is applied.

A control apparatus for an AC motor, which controls driving of an AC motor, will be described in detail with reference to the drawings. In the following embodiments, substantially the same configuration elements will be marked with the same reference numerals thereby to simplify the description.

First Embodiment

As illustrated in FIG. 1, a motor control apparatus 10 as a control apparatus for an AC (alternating current) motor according to the first embodiment is applied to a motor drive system 1 which drives a hybrid vehicle.

The motor drive system 1 includes an AC motor 2, a DC power source 8, the motor control apparatus 10, and the like. The AC motor 2 is a motor, which generates torque for driving, for example, drive wheels 6 of an electrically-driven vehicle. The AC motor 2 is a permanent-magnet, synchronous, three-phase AC motor.

The electrically-driven vehicle includes vehicles, such as hybrid vehicles, electric vehicles, and fuel cell electric vehicles, in which the drive wheels 6 are driven by electric energy. The electrically-driven vehicle in this embodiment is a hybrid vehicle equipped with an engine 3 and the AC motor 2, which is a motor-generator (MG) and has the following functions: a function as a motor which generates torque for driving the drive wheels 6; and a function as a generator which is driven by the kinetic energy of the vehicle transmitted from the engine 3 and the drive wheels 6 and is capable of generating electrical power.

The AC motor 2 is connected to an axle 5 through a gear 4 of, for example, a transmission. As a result, the driving force of the AC motor 2 rotates the axle 5 through the gear 4 and thereby drives the drive wheels 6.

The DC power source 8 is a dischargeable/rechargeable electric storage device, such as, for example, a secondary battery of nickel hydride, lithium ion, or the like, an electrical double layer capacitor, and the like. The DC power source 8 is connected with an inverter 12 (FIG. 2) of the motor control apparatus 10 and is so configured that it can provide and receive electric power to and from the AC motor 2 through the inverter 12.

A vehicle control circuit 9 is formed of a microcomputer and the like and includes therein CPU, ROM, I/O, a bus line connecting them, and the like, although not shown. The vehicle control circuit 9 controls the entire electrically-driven vehicle by software processing implemented by executing a pre-stored program at CPU and hardware processing implemented by dedicated electronic circuits.

The vehicle control circuit 9 is so configured that it can acquire signals from various sensors and switches and the like. These signals include an accelerator signal from an accelerator sensor, a brake signal from a brake switch, a shift signal from a shift switch, and the like. The vehicle control circuit 9 detects the operating state of the vehicle based on these acquired signals and the like and outputs a torque command value trq* corresponding to the operating state to the motor control apparatus 10. The vehicle control circuit 9 outputs a command signal to an engine control circuit, not shown, which controls the operation of the engine 3.

Figure 2:
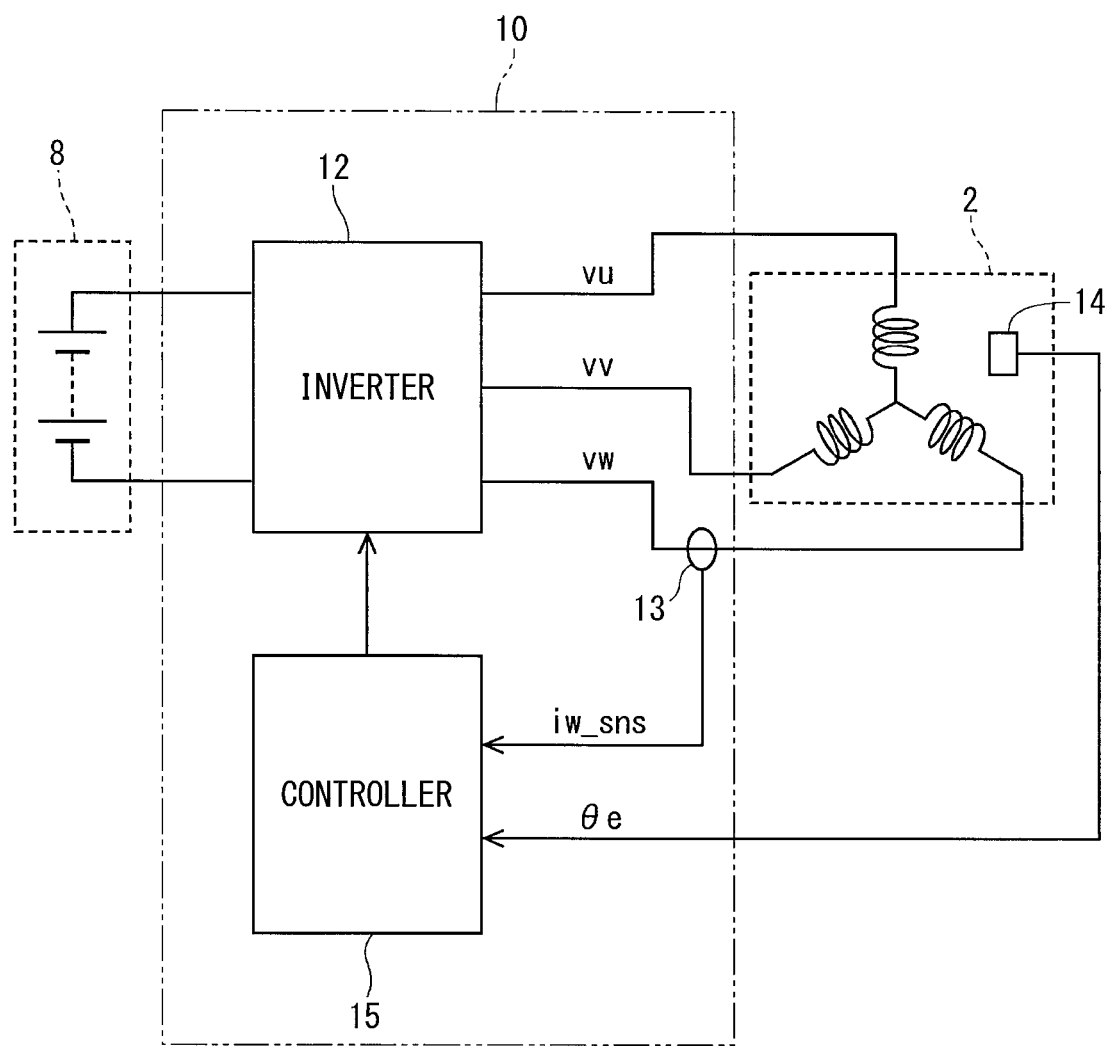
FIG. 2 is a block diagram of the control apparatus for an AC motor.

As illustrated in FIG. 2, the motor control apparatus 10 includes an inverter 12, a current sensor 13, and a controller 15 as a control section.

To the inverter 12, the boost voltage of DC power supply produced by a boost converter, not shown, is inputted as a system voltage VH. The inverter 12 includes six bridge-connected switching elements, not shown. For the switching elements, for example, IGBTs (insulated-gate bipolar transistors), MOS (metal-oxide semiconductor) transistors, bipolar transistors, and the like can be used. Turn-on/off of the switching elements is controlled based on PWM signals UU, UL, VU, VL, WU, WL outputted from a PWM signal generation section 25 (FIG. 5) of the controller 15. As a result, driving of the AC motor 2 is controlled based on three-phase AC voltages vu, w, vw applied to the AC motor 2.

The current sensor 13 is provided only in any one phase of the AC motor 2. In this embodiment, the current sensor 13 is provided in a W-phase of the AC motor 2. The W-phase, in which the current sensor 13 is provided, is referred to as a sensor phase. The current sensor 13 detects a phase current flowing in the W-phase as the current detection value iw_sns in the sensor phase and outputs it to the controller 15. Although the W-phase is taken as the sensor phase, the U-phase or V-phase may alternatively be taken as the sensor phase.

A rotation angle sensor 14 is provided in proximity to a rotor, not shown, of the AC motor 2 and detects an electrical angle θe and outputs it to the controller 15. The number of rotations (rotation speed) N of the rotor of the AC motor 2 is calculated based on the electrical angle θe detected by the rotation angle sensor 14. Hereafter, the number of rotations N of the rotor of the AC motor 2 will be simply referred to as the number of rotations N of the AC motor 2. The rotation angle sensor 14 is a resolver but may be any other type of sensor, such as a rotary encoder.

The motor control apparatus 10 consumes electric power in a power running operation using the AC motor 2 as a motor and generates electric power in a regenerative operation using the AC motor 2 as a generator according to the following: the number of rotations N of the AC motor 2 based on the electrical angle θe detected by the rotation angle sensor 14 and the torque command value trq* from the vehicle control circuit 9. Specifically, it switches the operation among the following four patterns according to the number of rotations N and whether the torque command value trq* is positive or negative.

<1> Normal rotation power running, in which power is consumed when the number of rotations N is positive and the torque command value trq* is positive.

<2> Normal rotation regeneration, in which power is generated when the number of rotations N is positive and the torque command value trq* is negative.

<3> Reverse rotation power running, in which power is consumed when the number of rotations N is negative and the torque command value trq* is negative.

<4> Reverse rotation regeneration, in which power is generated when the number of rotations N is negative and the torque command value trq* is positive.

With the number of rotations being N>0 (normal rotation) and the torque command value being trq*>0, or with the number of rotations being N<0 (reverse rotation) and the torque command value being trq*<0, the inverter 12 drives the AC motor 2 so that the following operation is performed: DC power supplied from the DC power source 8 side is converted into AC power by the switching operation of the switching elements; and torque is outputted (power running operation is performed).

Meanwhile, with the number of rotations being N>0 (normal rotation) and the torque command value being trq*<0, or with the number of rotations being N<0 (reverse rotation) and the torque command value being trq*>0, the inverter 12 carries out the following operation: it converts AC power generated by the AC motor 2 into DC power by the switching operation of the switching elements; and it supplies the DC power to the DC power source 8 side and thereby performs regenerative operation.

The modes of control of the AC motor 2 by the motor control apparatus 10 will be described with reference to FIG. 3. With respect to power conversion in the inverter 12, the motor control apparatus 10 switches the control mode among the three control modes shown in FIG. 3 to control the AC motor 2.

The sine wave PWM control mode (sine wave control mode is used as general PWM control. In this control mode, turn-on/off of the switching elements in the upper (high-potential side) and lower (low-potential side) arms in each phase of the inverter 12 is controlled in accordance with voltage comparison between sinusoidal voltage commands and carrier waves typified by triangular waves. As a result, the duty is controlled so that the fundamental component of the wave becomes a sine wave within a certain period of time: a set of high level periods corresponding to the on-periods of the upper arm switching elements and low level periods corresponding to the on-periods of the lower arm switching elements.

In the sine wave control mode, the amplitude of sinusoidal voltage commands is limited to the range of the carrier wave amplitude or below. For this reason, in the sine wave control mode, the fundamental component of applied voltage to the AC motor 2 can be increased only to approximately 0.61 times the system voltage VH. The system voltage VH is input DC voltage applied to the inverter 12. Hereafter, the ratio of the fundamental component (effective value) of the line-to-line voltage of the AC motor 2 to the system voltage VH applied to the inverter 12 will be referred to as a modulation rate.

In the sine wave control mode, the amplitude of sine wave voltage commands is within the range of the carrier wave amplitude or below. Therefore, the line-to-line voltage applied to the AC motor 2 becomes a sine wave. In this case, a control mode in which a voltage command is generated by superposing a 3kth-order harmonic component (k is a natural number) on a sine wave component within the range of the carrier wave amplitude or below is included in the sine wave control mode. Typically, the method of superposing a 3rd-order harmonic component on a sine wave when k=1 corresponds thereto. This makes it possible to increase the modulation rate up to approximately 0.71.

In this control scheme, a period during which a voltage command becomes higher than the carrier wave amplitude appears because of a harmonic component. However, since the 3kth-order harmonic component superposed in each phase is canceled between lines, the line-to-line voltage maintains a sine wave.

In the overmodulation PWM control mode (overmodulation control mode), the same PWM control as in the sine wave control mode is executed within the following range: the range in which the amplitude of the sine wave component of voltage commands is larger than the carrier wave amplitude. Especially, a fundamental component can be further enhanced by voltage amplitude correction which distorts voltage commands from their original sine wave waveform. As a result, it is possible to further enhance the modulation rate from the highest modulation rate in the sine wave control mode up to within the range of approximately 0.78. In the overmodulation control mode, the amplitude of the sine wave component of voltage commands is larger than the carrier wave amplitude; therefore, the line-to-line voltage applied to the AC motor 2 is not of a sine wave but is a distorted voltage.

In the sine wave control mode and the overmodulation control mode, the current feedback control in which the amplitude and phase of AC voltage applied to the AC motor 2 by feeding back output current is executed.

Meanwhile, in the rectangular wave control mode, one pulse of rectangular wave with the ratio of the high level period to the low level period being 1:1 within the above certain period is applied to the AC motor 2. As a result, the modulation rate is enhanced up to approximately 0.78.

In the rectangular wave control mode, the amplitude of applied voltage to the AC motor 2 is fixed. Therefore, the torque feedback control is executed by phase control of a rectangular wave voltage pulse based on the difference between a torque estimation value and a torque command value.

Figure 4:
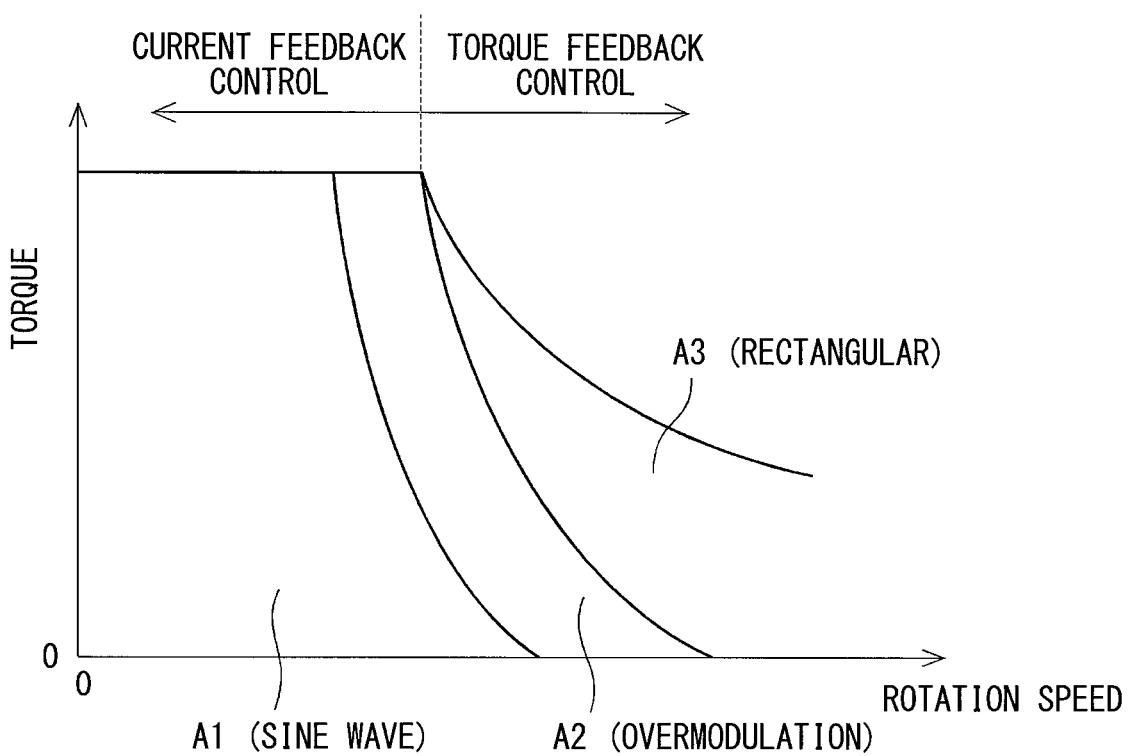
FIG. 4 is a graph indicating the correspondence between the operating state of an AC motor and the control mode.

FIG. 4 indicates the correspondence between the operating state of the AC motor 2 and the above-described control modes.

In the AC motor 2, the induced voltage is increased with increase in the number of rotations or output torque and thus motor required voltage required for driving the motor is increased. Consequently, it is necessary to make the system voltage VH boosted by the boost converter and inputted to the inverter 12 higher than the motor required voltage. The voltage utilization factor is improved by preferably taking the following measure: at the maximum value of system voltage VH, the control mode is switched from the sine wave control mode to the overmodulation control mode and further from the overmodulation control mode to the rectangular wave control mode.

As schematically shown in FIG. 4, in the low number of rotations range (low speed range) A1, the sine wave control mode is used to reduce torque fluctuation; in the middle number of rotations range (intermediate speed range) A2, the overmodulation control mode is used; and in the high number of rotations range (high speed range) A3, the rectangular wave control mode is applied. The output of the AC motor 2 is improved especially by applying the overmodulation control mode and the rectangular wave control mode.

In the torque feedback control scheme, a d-axis current command value or a q-axis current command value is not used. Therefore, the following takes place when the rectangular wave control mode is used in a control apparatus for an AC motor so configured that a current sensor for detecting phase current is provided only in one phase: a technology for using a d-axis current command value and a q-axis current command value to calculate a current estimation value in a phase other than the sensor phase cannot be applied.

That is, a control apparatus for an AC motor so configured that a current sensor is provided only in one phase used to involve the following problem: the current feedback control scheme in which a current command value is used and the torque feedback control scheme in which a current command value is not used cannot be used together.

Meanwhile, the motor control apparatus 10 in this embodiment is characterized in that: the current feedback control scheme in which a current command value is used and the torque feedback control scheme in which a current command value is not used can be used together; and the control mode can be switched among the above three control modes. For this reason, the configuration of the controller 15 and the configuration of the current estimation section in the controller 15 are varied from time to time according to the selected control mode.

In the following description, while the controller 15 is a collective designation, the control sections corresponding to the sine wave control mode, the overmodulation control mode, and the rectangular wave control mode are distinguished respectively with reference numerals 151, 152 and 153. This distinction is just for the sake of explanation. In this embodiment, the controller 15 provided in a physically identical circuit board is changed by software processing or hardware processing by a dedicated electronic circuit so as to perform each control mode.

First, the controller 151 corresponding to the sine wave control mode and the controller 152 corresponding to the overmodulation control mode with reference to FIG. 5 to FIG. 8. The sine wave control mode and the overmodulation control mode are both current feedback control schemes and have many common portions.

Figure 5:
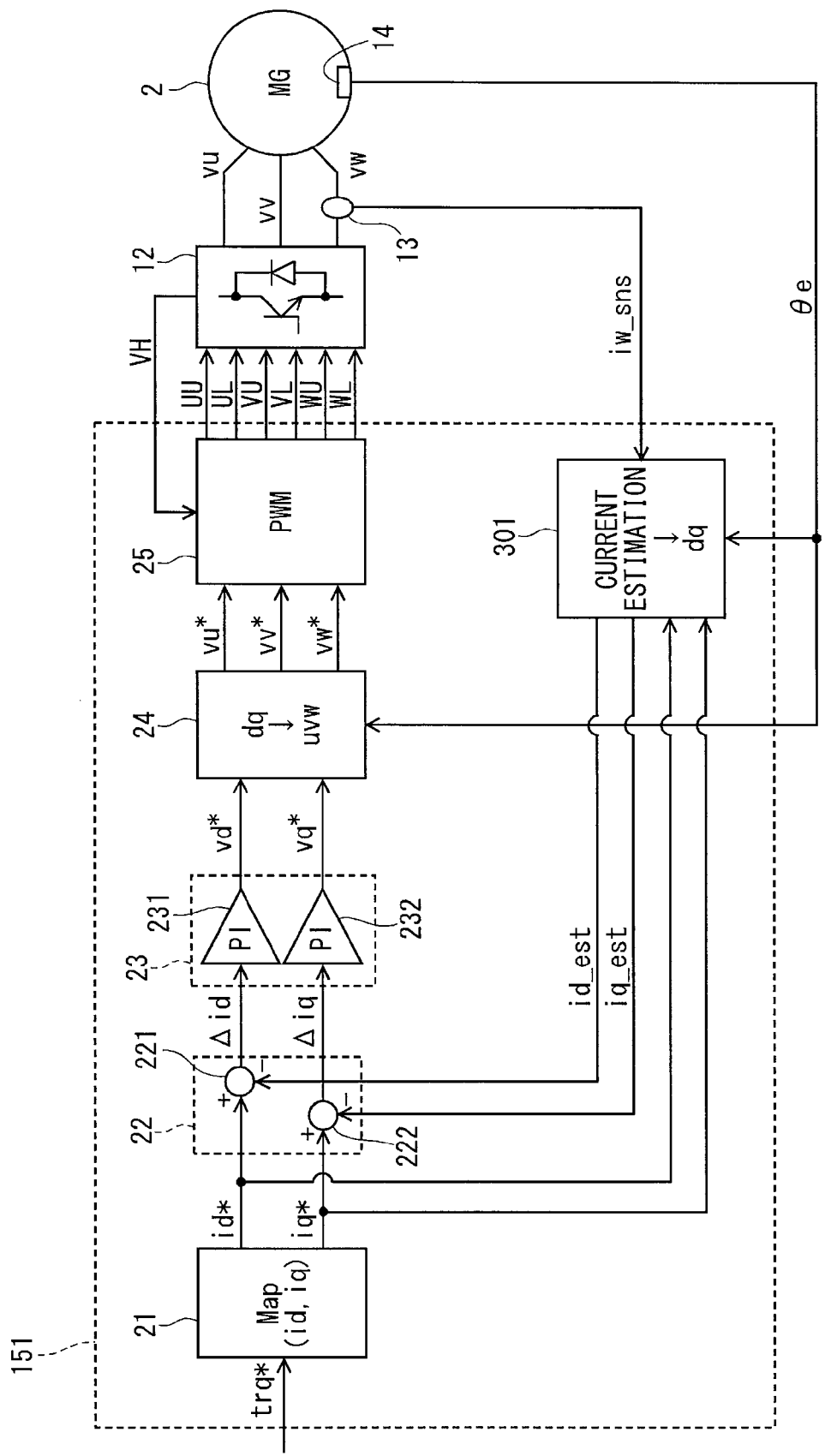
FIG. 5 is a block diagram illustrating the configuration of a control section of a control apparatus for an AC motor according to a first embodiment in a current feedback control scheme (sine wave control mode)

As illustrated in FIG. 5, the controller 151 corresponding to the sine wave control mode includes: a dq-axis current command value calculation section 21, a current subtracter 22, a PI calculation section 23, an inverse dq conversion section 24, a PWM signal generation section 25, and a current estimation section 301.

The dq-axis current command value calculation section 21 calculates the following based on the torque command value trq* acquired from the vehicle control circuit 9: a d-axis current command value id* and a q-axis current command value iq* in the rotating coordinate system (d-q coordinate system) of the AC motor 2. The d-axis current command value id* and the q-axis current command value iq* are calculated by referring to a pre-stored map. These command values may alternatively calculated from equations or the like.

The current subtracter 22 includes a d-axis current subtracter 221 and a q-axis current subtracter 222. At the d-axis current subtracter 221, a d-axis current difference Δid, which is a difference between the d-axis current command value id* and a d-axis current estimation value id_est calculated at the current estimation section 301 and fed back and, is calculated. At the q-axis current subtracter 222, a q-axis current difference Δiq, which is a difference between the q-axis current command value iq* and a q-axis current estimation value iq_est calculated at the current estimation section 301 and fed back, is calculated.

The PI calculation section 23 includes a d-axis PI calculation section 231 and a q-axis PI calculation section 232. At the d-axis PI calculation section 231, a d-axis voltage command value vd* is calculated by PI (proportional and integral) operation so that the d-axis current difference Δid is converged to 0 to make the d-axis current estimation value id_est follow the d-axis current command value id*. At the q-axis PI calculation section 232, a q-axis voltage command value vq* is calculated by PI operation so that the q-axis current difference Δiq is converged to 0 to make the q-axis current estimation value iq_est follow the q-axis current command value iq*.

At the inverse dq conversion section 24, the following processing is performed based on the electrical angle θe acquired from the rotation angle sensor 14: the d-axis voltage command value vd* and the q-axis voltage command value vq* are converted into a U-phase voltage command value vu*, a V-phase voltage command value w*, and a W-phase voltage command value vw*.

At the PWM signal generation section 25, PWM signals UU, UL, VU, VL, WU, WL pertaining to switching of turn-on/off of the switching elements of the inverter 12 are calculated based on three-phase voltage command values vu*, w*, vw* and the system voltage VH applied to the inverter 12.

Then driving of the AC motor 2 is controlled so that the following are implemented: three-phase AC voltages vu, w, vw are generated by the turn-on/off of the switching elements of the inverter 12 being controlled based on the PWM signals UU, UL, VU, VL, WU, WL; and the three-phase AC voltages vu, w, vw are applied to the AC motor 2 so that a torque corresponding to the torque command value trq* is outputted from the AC motor 2.

The controller 152 corresponding to the overmodulation control mode will be described next with reference to FIG. 6. Only differences from the configuration of the controller 151 corresponding to the sine wave control mode will be described.

Figure 6:
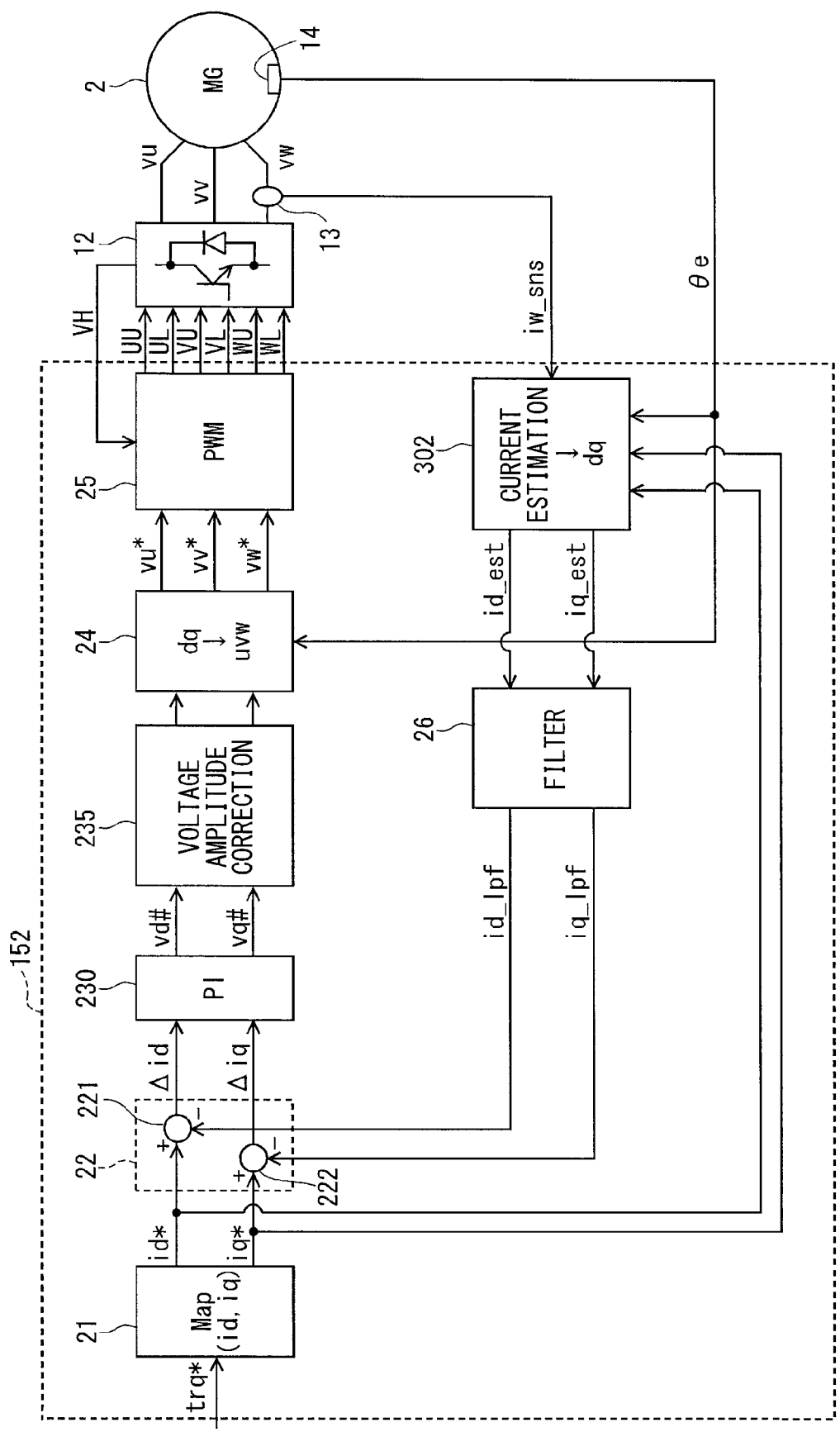
FIG. 6 is a block diagram illustrating the configuration of the control section of a control apparatus for an AC motor according to the first embodiment in a current feedback control scheme (overmodulation control mode)

As illustrated in FIG. 6, the controller 152 corresponding to the overmodulation control mode is different from the controller 151 corresponding to the sine wave control mode in that: a voltage amplitude correction section 235 is provided between a PI calculation section 230 and the inverse dq conversion section 24; and a filter processing section 26 is provided in the feedback path from a current estimation section 302 to the current subtracter 22.

The voltage amplitude correction section 235 distorts voltage commands from their original sine wave waveform so that the amplitude of sine wave component of voltage commands outputted by the PI calculation section 230 becomes larger than the carrier wave amplitude. This makes it possible to increase the modulation rate from the maximum modulation rate in the sine wave control mode to the range of approximately 0.78 as described with reference to FIG. 3.

The filter processing section 26 processes the d-axis current estimation value id_est and the q-axis current estimation value iq_est through a lowpass filter. It then feeds a filtered d-axis current estimation value id_lpf and a q-axis current estimation value iq_lpf back to the current subtracter 22.

The current estimation sections 301 and 302 perform current estimation in phases other than the sensor phase in the sine wave control mode and the overmodulation control mode, respectively. These control modes in the current feedback control scheme are characterized in that the d-axis current command value id* and the q-axis current command value iq* calculated by the dq-axis current command value calculation section 21 can be used in current estimation.

When the current sensor 13 is provided in two phases, the current in the remaining one phase in which the current sensor 13 is not provided can be easily calculated by taking the following measure: Kirchhoff's law in which the sum of the instantaneous values of three-phase currents iu, iv, iw is zero is utilized.

Meanwhile, in this embodiment in which the current sensor 13 is provided only in one phase (W-phase), the current in one of other phases (U-phase and V-phase) in which the current sensor 13 is not provided is estimated using the following at the current estimation section 301: in addition to the current detection value iw_sns in the sensor phase in one phase and the electrical angle θe, information of the d-axis current command value id* and the q-axis current command value iq*. In the following description, the phase, in which the current is estimated, will be referred to as an estimated phase. The U-phase is assumed to be the estimated phase. Alternatively, however, the W-phase may be taken as the sensor phase and the V-phase may be taken as the estimated phase.

Figure 7:
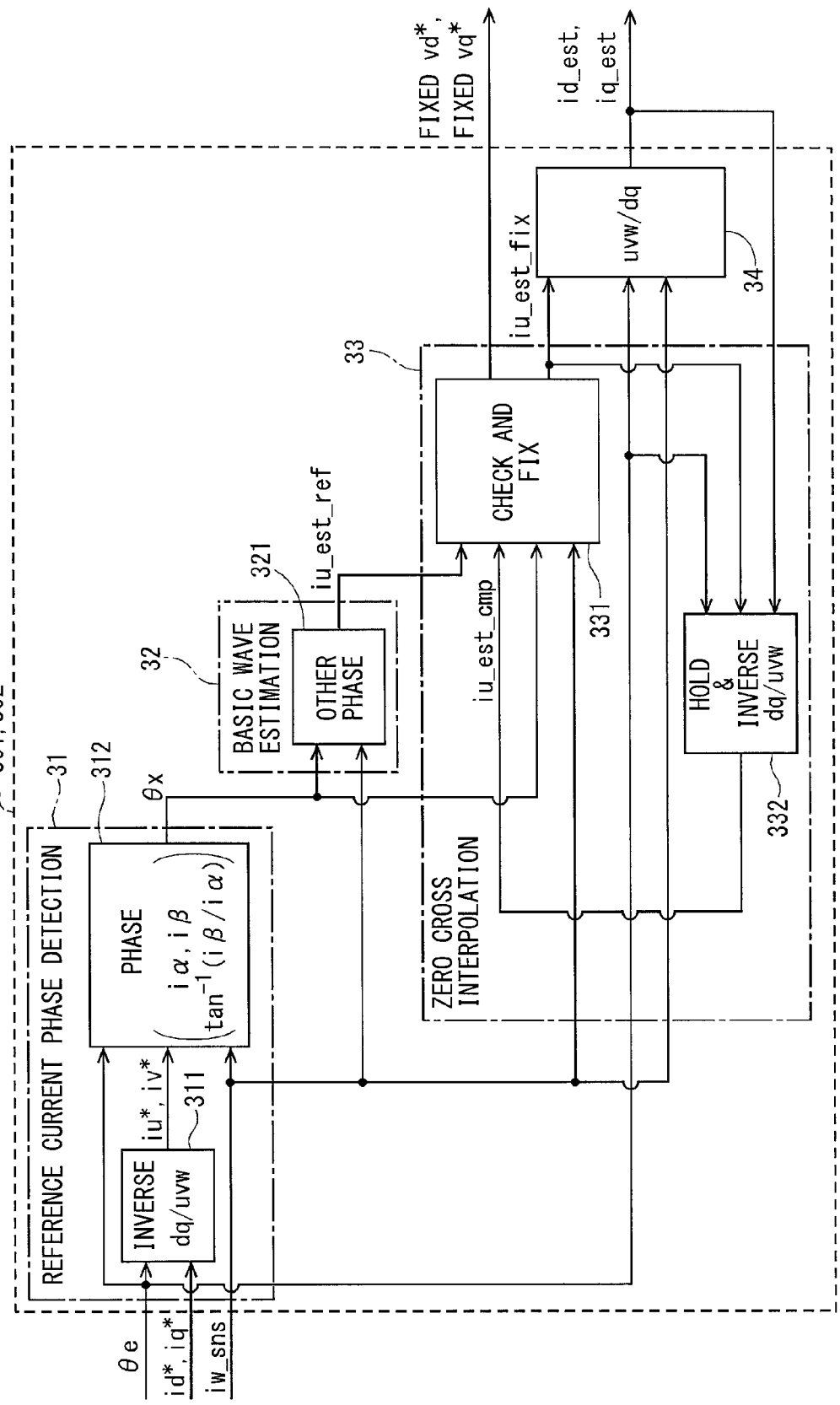
FIG. 7 is a block diagram illustrating the configuration of a current estimation section of the control section in FIG. 5 and FIG. 6.

As illustrated in FIG. 7, the current estimation sections 301, 302 each include: a sensor phase reference current phase detection section 31, a basic (fundamental) wave estimation section 32, a zero cross interpolation section 33, and a dq conversion section 34.

The sensor phase reference current phase detection section 31 includes an inverse dq conversion section 311 and a phase detection section 312 and calculates a sensor phase reference current phase θx.

At the inverse dq conversion section 311, the d-axis current command value id* and the q-axis current command value iq* calculated by the dq-axis current command value calculation section 21 and the electrical angle θe are acquired. Then the current command value iv* in V-phase which is not the estimated phase is calculated by inverse dq conversion. Alternatively, when the estimated phase is V-phase, the current command value iu* in U-phase may be calculated. Alternatively, U-phase and V-phase current command values iu*, iv* may be calculated.

At the phase detection section 312, the V-phase current command value iv* calculated at the inverse dq conversion section 311 and the current detection value iw_sns in the sensor phase are used to calculate an α-axis current iα and a β-axis current iβ. Thereafter, the sensor phase reference current phase θx defined in the α-β coordinate system is calculated.

Figure 8:
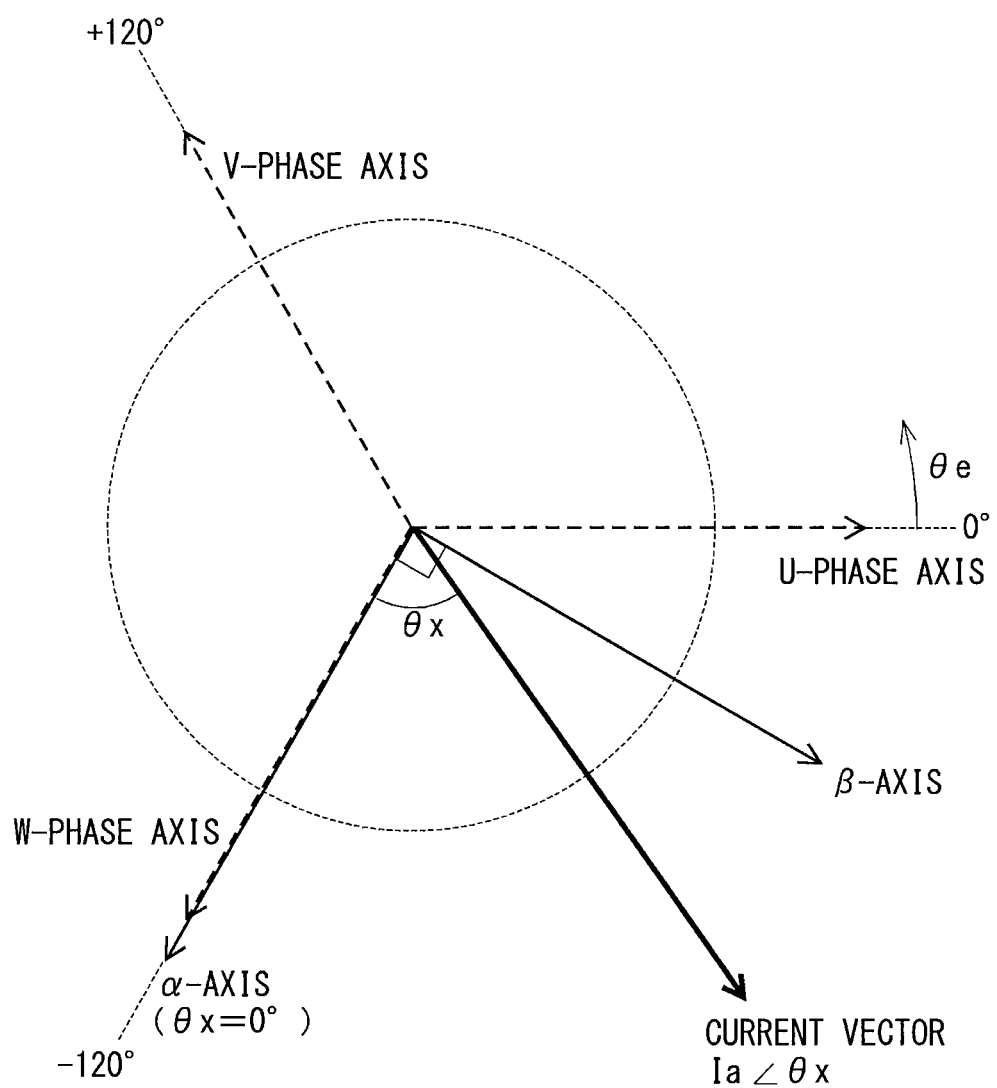
FIG. 8 is a diagram explaining a fixed coordinate system ($\alpha$-$\beta$ coordinate system) on the basis of a sensor phase.

As indicated in FIG. 8, the α-axis agrees with the axis of W-phase as the sensor phase and the β-axis is orthogonal to the α-axis. The sensor phase reference current phase θx is an angle in synchronization with the current detection value iw_sns in the sensor phase formed by the α-axis and the current vector of current amplitude Ia (Ia∠θx). In the power running state with normal rotation and positive torque, the sensor phase reference current phase θx is 0[°] when the waveform of W-phase current iw zero-crosses from negative to positive; and the sensor phase reference current phase θx is 180[°] when the waveform of W-phase current iw zero-crosses from positive to negative.

The α-axis current iα and the β-axis current iβ used in the calculation of the sensor phase reference current phase θx will be described below. When the α-axis current iα and the β-axis current iβ are expressed using the phase currents iu, iv, iw, equations (1) and (2) are obtained. In equations (1) and (2), K is a conversion factor.

$$i\alpha = K \times \left(iw - \frac{1}{2} \times iu - \frac{1}{2} \times iv\right) \quad (1)$$

$$i\beta = K \times \left(\frac{\sqrt{3}}{2} \times iu - \frac{\sqrt{3}}{2} \times iv\right) \quad (2)$$

As described above, the sum of the instantaneous values of the three-phase currents iu, iv, iw is 0 by Kirchhoff's law. That is, equation (3) below holds.

$$iu+iv+iw=0 \qquad (3)$$

When equation (1) is modified using equation (3), equation (4) below is obtained.

$$i\alpha = K \times \frac{3}{2} \times iw \qquad (4)$$

That is, as indicated by equation (4), the α-axis current is can be calculated based on only the W-phase current iw in the sensor phase. When the current detection value iw_sns in the sensor phase is used as the W-phase current iw, the α-axis current detection value iα_sns is expressed as follows by equation (5).

$$i\alpha\_sns = K \times \frac{3}{2} \times iw\_sns \qquad (5)$$

When the current command value iu* is used as the U-phase current iu and the current command value iv* is used as the V-phase current with reference to equation (2), the β-axis current estimation value iβ_est is expressed as follows by equation (6).

$$i\beta\_est = K \times \left( \frac{\sqrt{3}}{2} \times iu^* - \frac{\sqrt{3}}{2} \times iv^* \right) \qquad (6)$$

In equation (6), the β-axis current estimation value iβ_est is calculated from current command values iu* and iv* and the component of the current detection value iw_sns in the sensor phase detected by the current sensor 13 is not included therein. For this reason, the β-axis current estimation value iβ_est calculated by equation (6) is not necessarily information accurately reflecting actual current.

Consequently, when using Kirchhoff's law (equation (3)), equation (6) is modified so that the current detection value iw_sns in the sensor phase is included in the β-axis current estimation value iβ_est, equation (7) below is obtained.

$$i\beta\_est = K \times \left( -\sqrt{3} \times iv^* - \frac{\sqrt{3}}{2} \times iw\_sns \right) \qquad (7)$$

The following can be implemented by including the current detection value iw_sns in the sensor phase as an actual current in the β-axis current estimation value iβ_est as indicated by equation (7): it is possible to respond to control fluctuation and to narrow a range in which the W-phase axis component is small and conversion is less prone to occur; therefore, the accuracy of the β-axis current estimation value iβ_est can be enhanced. That is, it is possible to enhance the accuracy of detection of the sensor phase reference current phase θx calculated using the β-axis current estimation value iβ_est.

At the phase detection section 312, the sensor phase reference current phase θx can be calculated based on equation (8) below when the following are used: the calculated α-axis current detection value iα_sns calculated by equation (5) and β-axis current estimation value iβ_est calculated by equation (7). Alternatively, the β-axis current estimation value iβ_est may be calculated by equation (6) in place of equation (7).

When the sensor phase reference current phase θx is calculated by an arctangent function ($\tan^{-1}$) using equation (8), there are cases where the following takes place depending on the definitions of the α-axis current iα and the β-axis current iβ: the sensor phase reference current phase θx is not of an angle in synchronization with the sensor phase (W-phase). This is caused by the definition of the axis (for example, the interchange of the α-axis and the β-axis or the inversion of signs). In this case, the calculation method may be changed as appropriate so that the following takes place: the sensor phase reference current phase θx when the current detection value iw_sns in the sensor phase with normal rotation and positive torque zero-crosses from negative to positive is 0[°]; and the sensor phase reference current phase θx when the current detection value iw_sns in the sensor phase zero-crosses from positive to negative is 180[°]; that is, it is of an angle in synchronization with the sensor phase current detection value iw_sns. For example, the sensor phase reference current phase θx may be calculated after the signs of α-axis current iα and β-axis current iβ are operated. Alternatively, the α-axis current iα and the β-axis current iβ themselves may be interchanged or the phase difference 90[°] arising from the relation of orthogonality between the α-axis and the β-axis may be added to or subtracted from the calculated sensor phase reference current phase θx as appropriate.

$$\theta x = \tan^{-1}\left( \frac{i\beta\_est}{i\alpha\_sns} \right) \qquad (8)$$

The other phase estimation section 321 of the basic wave estimation section 32 calculates the U-phase current estimation value iu_est in the estimated phase using the following: the sensor phase reference current phase θx calculated at the phase detection section 312 and the current detection value iw_sns in the sensor phase.

Here, the current detection value iw_sns in the sensor phase and the U-phase current estimation value iu_est in the estimated phase are expressed using the sensor phase reference current phase θx. Since the phase difference between phases is 120[°], they are expressed as follows by equations (9) and (10). In equations (9) and (10), Ia denotes current amplitude.

$$iw\_sns = Ia \times \sin(\theta x) \qquad (9)$$

$$iu\_est = Ia \times \sin(\theta x - 120°) \qquad (10)$$

When equation (10) is modified by the addition theorem, the U-phase current estimation value iu_est is expressed as follows by equation (11) below using the sensor phase reference current phase θx and the current detection value iw_sns in the sensor phase.

$$\begin{aligned} iu\_est &= Ia \times \sin(\theta x - 120°) \\ &= -\frac{1}{2} \times Ia \times \sin(\theta x) - \frac{\sqrt{3}}{2} \times Ia \times \cos(\theta x) \\ &= -\frac{1}{2} \times iw\_sns - \frac{\sqrt{3}}{2} \times \frac{Ia \times \sin(\theta x)}{\tan(\theta x)} \\ &= \left\{ -\frac{1}{2} - \frac{\sqrt{3}}{2} \times \frac{1}{\tan(\theta x)} \right\} \times iw\_sns \end{aligned} \qquad (11)$$

When an estimation coefficient iu_kp is defined by equation (12), the U-phase current estimation value iu_est is expressed also as follows by equation (13) using the estimation coefficient iu_kp. The estimation coefficient iu_kp may be directly calculated by equation (12) or may be calculated by pre-mapping a part or the whole of equation (12) based on the sensor phase reference current phase θx and referring to this pre-stored map.

In cases where the controller 15 is formed of a common electronic control circuit (microcomputer), processing is performed not by continuous time but by discrete time when computing equations are implemented in the controller 15. Sensor detection values and each calculation value are also handled as discrete values based on specified resolution (LSB). Here, implementation of computing equations includes building of software programs and hardware circuits and the like. To avoid mathematical multiplication and division which impose a large processing load, it is effective to take the sensor phase reference current phase θx as argument and map the estimation coefficient iu_kp or the $\{1/\tan(\theta x)\}$ term in the estimation coefficient iu_kp. Provision of such a map facilitates the application to a discrete system, makes it possible to minimize the processing load on the microcomputer, and obviates the necessity for use of an expensive microcomputer high in arithmetic processing power.

$$iu\_kp = -\frac{1}{2} - \frac{\sqrt{3}}{2} \times \frac{1}{\tan(\theta x)} \quad (12)$$

$$iu\_est = iu\_kp \times iw\_sns \quad (13)$$

Referring to equation (11) or equation (13), the following is understood: when the U-phase current estimation value iu_est is calculated using the sensor phase reference current phase θx and the current detection value iw_sns in the sensor phase, the current amplitude Ia is not used. Therefore, it is unnecessary to determine the current amplitude Ia in current estimation and variables to be calculated can be reduced.

The U-phase current estimation value iu_est calculated based on the sensor phase reference current phase θx and the current detection value iw_sns in the sensor phase is outputted to the zero cross interpolation section 33. It is outputted as the current estimation value (reference value) iu_est_ref in the estimated phase.

When the current detection value iw_sns in the sensor phase is 0 [A] or when the tangent tan(θx) of the sensor phase reference current phase θx is infinite, zero multiplication occurs in equation (11) in which the multiplication by 0 is performed. When the tangent tan(θx) of the sensor phase reference current phase θx is 0, zero division occurs in equation (11) in which division is performed by 0. For this reason, there is a possibility that the U-phase current estimation value iu_est in U-phase as the estimated phase fluctuates.

In this embodiment, consequently, the current estimation value (reference value) iu_est_ref is interpolated at the zero cross interpolation section 33 and zero division and zero multiplication are masked. With respect to zero division, the problem can be coped with also by taking the following measure to prevent an estimation value from being calculated by an unintended value in equation (13) by the influence of the discrete system: a limit value is provided in the estimation coefficient iu_kp or the $\{1/\tan(\theta x)\}$ term in the estimation coefficient iu_kp. When equation (13) is implemented in the controller 15, it is also effective to map the estimation coefficient iu_kp or the $\{1/\tan(\theta x)\}$ term in the estimation coefficient iu_kp. In this case, the problem can be coped with also by providing a limit value on the map.

The zero cross interpolation section 33 includes a zero cross checking section 331 and a previous value holding section 332.

At the zero cross checking section 331, it is checked whether or not the zero cross condition holds.

In this embodiment, it is determined that the zero cross condition holds when the current detection value iw_sns in the sensor phase is within a predetermined range including 0 [A]. A value within the predetermined range means that the absolute value of the current detection value iw_sns in the sensor phase is a predetermined value or below. Alternatively it means that the absolute value of the estimation coefficient iu_kp is a predetermined value or above. The predetermined value here may be set as a current value, for example, ±5 [A], may be set based on resolution in the discrete system, for example, 5 [LSB], or may be set by a mathematical expression or the like.

Since the current detection value iw_sns in the sensor phase and the sensor phase reference current phase θx are in synchronization with each other, it may be determined by the value of the sensor phase reference current phase θx.

When it is determined that the zero cross condition does not hold, the current estimation value (reference value) iu_est_ref calculated at the other phase estimation section 321 is outputted as a fixed current estimation value (definite value) iu_est_fix to the dq conversion section 34 without change.

Meanwhile, when it is determined that the zero cross condition holds, the following processing is performed: the d-axis current difference Δid and the q-axis current difference Δiq (FIG. 5 and FIG. 6) are forcedly set to 0 [A] and the d-axis voltage command value vd* and the q-axis voltage command value vq* are thereby fixed. Alternatively, the d-axis voltage command value vd* and the q-axis voltage command value vq* may be directly fixed by holding them at previous values or taking other like measures.

The zero cross checking section 331 acquires a current estimation value (interpolated value) iu_est_cmp from the previous value holding section 332. Then it outputs this current estimation value (interpolated value) iu_est_cmp as the current estimation value (definite value) iu_est_fix to the dq conversion section 34.

At the previous value holding section 332, a previous value is held beforehand. When it is determined that the zero cross condition holds, the current estimation value (interpolated value) iu_est_cmp is calculated and outputted to the zero cross checking section 331.

For example, at the previous value holding section 332, the current estimation values (definite value) iu_est_fix calculated a predetermined number of the latest times are held as the current estimation value (held value) iu_est_hld. When it is determined that the zero cross condition holds, the current estimation value (held value) iu_est_hld as previous value or value therebefore is outputted as the current estimation value (interpolated value) iu_est_cmp to the zero cross checking section 331.

For example, at the previous value holding section 332, the d-axis current estimation values id_est and the q-axis current estimation values iq_est calculated before at the dq conversion section 34 a predetermined number of the latest times are held. They are held as the d-axis current estimation value (held value) id_est_hld and the q-axis current estimation value (held value) iq_est_hld. When it is determined that the zero cross condition holds, the following is outputted as current estimation value (interpolated value) iu_est_cmp to the zero cross checking section 331: the U-phase current estimation value calculated by inverse dq conversion using the d-axis current estimation value (held value) id_est_hld and the q-axis current estimation value (held value) iq_est_hld as previous value or value therebefore.

At the dq conversion section 34, the d-axis current estimation value id_est and the q-axis current estimation value iq_est are calculated by dq conversion using the fixed current estimation value (definite value) iu_est_fix acquired from the zero cross interpolation section 33, the current detection value iw_sns in the sensor phase, and the electrical angle θe.

Any method other than the method described above in relation to this embodiment may be used in zero cross interpolation at the current estimation sections 301, 302 or zero cross interpolation may be not used as required.

The d-axis current estimation value id_est and the q-axis current estimation value iq_est are calculated at the dq conversion section 34. The dq conversion is performed by using a general equation (14) of dq conversion.

$$\begin{bmatrix} id\_est \\ iq\_est \end{bmatrix} = \sqrt{\frac{2}{3}} \begin{bmatrix} \cos(\theta e) & \cos(\theta e - 120°) & \cos(\theta e + 120°) \\ -\sin(\theta e) & -\sin(\theta e - 120°) & -\sin(\theta e - 120°) \end{bmatrix} \begin{bmatrix} iu \\ iv \\ iw \end{bmatrix} \quad (14)$$

As understood from equation (3), the current iv is expressed as iv=−iu−iw by Kirchhoff's law. When iu=iu_est and iw=iw_sns are substituted into equation (14), equation (15) below is obtained. In this embodiment, the zero cross-interpolated current estimation value (definite value) iu_est_fix is used as iu_est.

$$\begin{bmatrix} id\_est \\ iq\_est \end{bmatrix} = \sqrt{\frac{2}{3}} \begin{bmatrix} \cos(\theta e) & -\cos(\theta e - 120°) & \cos(\theta e - 120°) & -\cos(\theta e - 120°) \\ -\sin(\theta e) & +\sin(\theta e - 120°) & -\sin(\theta e - 120°) & +\sin(\theta e - 120°) \end{bmatrix} \begin{bmatrix} iu\_est \\ iw\_sns \end{bmatrix} \quad (15)$$

$$= \sqrt{\frac{2}{3}} \times \sqrt{3} \begin{bmatrix} \cos(\theta e + 30°) & -\cos(\theta e - 90°) \\ -\sin(\theta e + 30°) & \sin(\theta e - 90°) \end{bmatrix} \begin{bmatrix} iu\_est \\ iw\_sns \end{bmatrix}$$

$$= \sqrt{2} \begin{bmatrix} \sin(\theta e + 120°) & -\sin(\theta e) \\ \cos(\theta e + 120°) & -\cos(\theta e) \end{bmatrix} \begin{bmatrix} iu\_est \\ iw\_sns \end{bmatrix}$$

As indicated by equation (15), the d-axis current estimation value id_est and the q-axis current estimation value iq_est can be calculated by dq conversion using current values (detection value or estimation value) in two of the three phases. Therefore, at the other phase estimation section 321, the current estimation value in one (U-phase) of the two phases other than the sensor phase only has to be calculated; and the current estimation value in the other phase (V-phase) need not be calculated.

The overall configuration of the motor control apparatus 10 in operation in the torque feedback control scheme, especially, the configuration thereof pertaining to current estimation will be described next with reference to FIG. 9 to FIG. 15. The torque feedback control scheme is different from the current feedback scheme as discussed in FIG. 3.

Figure 9:
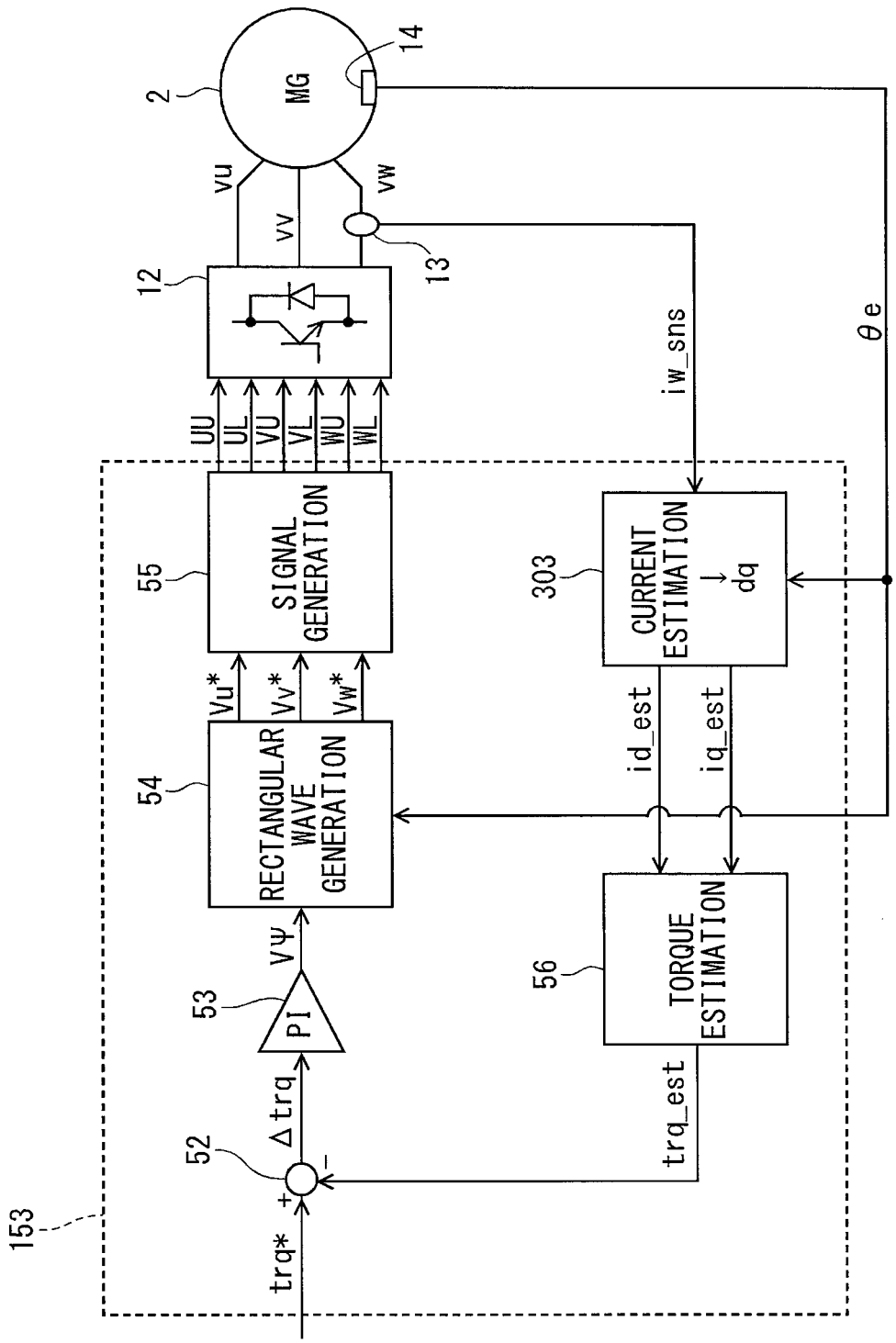
FIG. 9 is a block diagram illustrating the configuration of the control section of a control apparatus for an AC motor according to the first embodiment in a torque feedback control scheme (rectangular wave control mode)

As illustrated in FIG. 9, a controller 153 corresponding to the rectangular wave control mode includes a torque subtracter 52, a PI calculation section 53, a rectangular wave generation section 54, a signal generation section 55, a current estimation section 303, and a torque estimation section 56.

The torque subtracter 52 calculates a torque difference Δtrq which is the difference between a torque estimation value trq_est fed back from the torque estimation section 56 and the torque command value trq*.

The PI calculation section 53 calculates a voltage phase command value Vψ as the phase command value of a voltage vector by PI operation so that the torque difference Δtrq is converged to 0 to make the torque estimation value trq_est follow the torque command value trq*.

The rectangular wave generation section 54 generates rectangular waves based on a voltage phase command value Vψ and the electrical angle θe and outputs a U-phase voltage command value vu*, a V-phase voltage command value vv* and a W-phase voltage command value vw*.

The signal generation section 55 generates voltage command signals UU, UL, VU, VL, WU, WL pertaining to switching of turn-on/off of the switching elements of the inverter 12 based on the U-phase voltage command value vu*, the V-phase voltage command value w* and the W-phase voltage command value vw*. Then it outputs these signals to the inverter 12.

As a result of turn-on/off of the switching elements of the inverter 12 being controlled based on the voltage signals UU, UL, VU, VL, WU, WL, three-phase AC voltages vu, w, vw are generated. As a result of the three-phase AC voltages vu, w, vw being applied to the AC motor 2, driving of the AC motor 2 is controlled so that torque corresponding to the torque command value trq* is outputted.

The current estimation section 303 calculates a d-axis current estimation value id_est and a q-axis current estimation value iq_est based on the current detection value iw_sns in the sensor phase detected by the current sensor 13 and the electrical angle θe acquired from the rotation angle sensor 14.

The torque estimation section 56 calculates a torque estimation value trq_est by a map, a mathematical expression, or the like based on the d-axis current estimation value id_est and q-axis current estimation value iq_est estimated by the current estimation section 303. Then it feeds the estimation value back to the torque subtracter 52.

The current estimation section 303, which estimates the current estimation value of phases other than the sensor phase in the rectangular wave control mode, will be described in detail with reference to FIG. 10. The description is made based on comparison with the current estimation sections 301, 302 (FIG. 7) in the sine wave control mode and the overmodulation control mode.

Figure 10:
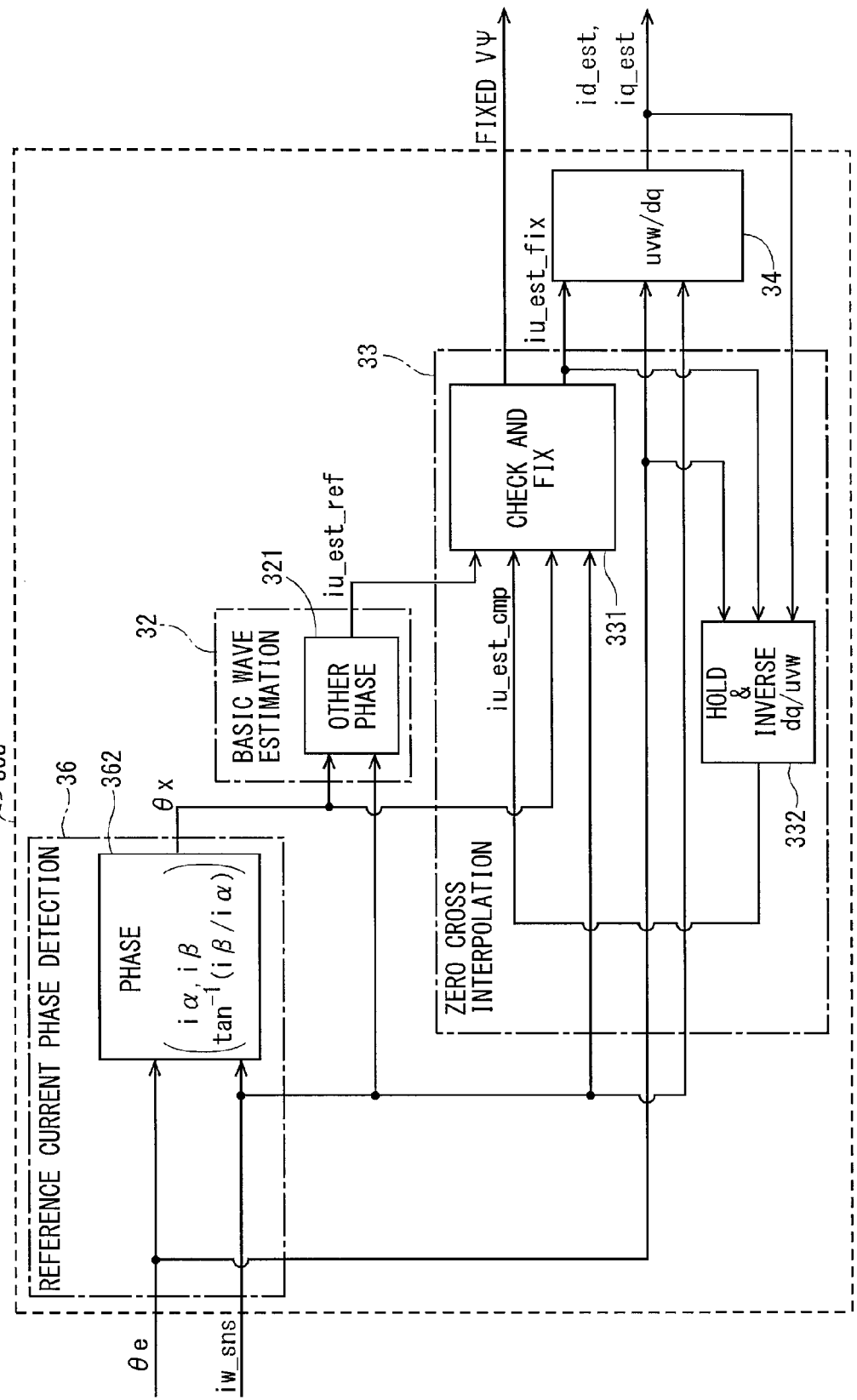
FIG. 10 is a block diagram illustrating the configuration of the current estimation section of the control section in FIG. 9.

As illustrated in FIG. 10, the configuration of the current estimation section 303 in the torque feedback control scheme is similar to the current estimation sections 301, 302. It is however different in the current feedback control scheme only in the configuration of the sensor phase reference current phase detection section 36 and the amount of operation fixed at the time of zero crossing of sensor phase current at the zero cross interpolation section 33.

Unlike the sensor phase reference current phase detection section 31 in the current feedback control scheme, the sensor phase reference current phase detection section 36 is not inputted with the d-axis current command value id* or the q-axis current command value iq*; therefore, it does not have the inverse dq conversion section 311. Consequently, the current command values iu*, iv* in the phases (U-phase and V-phase) other than the sensor phase are not calculated.

It is the same as in the current feedback control scheme in that: the phase detection section 362 calculates the α-axis current iα and the β-axis current iβ and then calculates the sensor phase reference current phase θx by equation (8) using the α-axis current iα and the β-axis current iβ; and the signs of α-axis current iα and β-axis current iβ and the like may be changed in equation (8) as appropriate. However, it is different from in the current feedback control scheme in the calculation method for the β-axis current iβ. More specifically, in the current feedback control scheme, the d-axis current command value id* and the q-axis current command value iq* are involved and the V-phase current command value iv* can be calculated. Unlike this scheme, in the torque feedback control scheme which does not involve the d-axis current command value id* or the q-axis current command value iq*, the β-axis current iβ cannot be calculated using equations (6) and (7).

Consequently, in the torque feedback control scheme, attention is paid to that: the α-axis current iα and the β-axis current iβ are in the relation of sine wave and cosine wave and the phase difference between the α-axis current iα and the β-axis current iβ is 90[°]. It therefore employs a method of calculating the β-axis current iβ based on a differential value Δiα of the α-axis current.

First, the differential value Δiα of the α-axis current is calculated by the following equation (16) based on the following: the amount of change of α-axis current iα to electrical angle change θe [rad] between times when the α-axis current iα is calculated based on the current detection value in the sensor phase; that is, the difference between the present time value and previous value of α-axis current iα.

$$\Delta i\alpha = -\{i\alpha(n) - i\alpha(n-1)\}/\Delta\theta e \quad (16)$$

The electrical angle change Δθe is a value expressing electrical angle change from the previous current detection time to the present current detection time by radian. iα(n) is the present time value of α-axis current and iα(n−1) is the previous value of α-axis current.

When the signs in equation (16) are inverted depending on the definitions of α-axis current iα and β-axis current iβ, the signs may be operated as required so that it is suitable for the calculation of "$\tan^{-1}(i\beta/i\alpha)$" by equation (8). Alternatively, when as a result of calculation, the sensor phase reference current phase θx is not synchronized with the current detection value iw_sns in the sensor phase, the following measure may be taken in addition to sign handling: the phase difference 90[°] is added to or subtracted from the calculated sensor phase reference current phase θx as appropriate. This is the same as in the current feedback control scheme.

Based on the above-described technical idea, the sensor phase reference current phase detection section 36 in the torque feedback control scheme carries out the following processing when the current of the AC motor 2 is estimated: at each current detection time, described later, the α-axis current iα is calculated by equation (5) using the current detection value iw_sns in the sensor phase detected by the current sensor 13. Then the differential value Δiα of the-axis current iα is calculated by equation (16) based on the amount of change of α-axis current iα to the electrical angle change Δθe between these current detection times. Then a correction amount H described later is added to the differential value Δiα of α-axis current to calculate the β-axis current iβ. Thereafter, the sensor phase reference current phase θx is calculated by equation (8) using the α-axis current iα and the β-axis current iβ.

At the zero cross interpolation section 33, the voltage phase command value Vψ is fixed at the time of zero crossing of sensor phase current in place of the d-axis voltage command value vd* and the q-axis voltage command value vq* in the current feedback control scheme. In this case, the torque difference Δtrq (FIG. 7) may be forcedly set to 0 [Nm] or may be directly fixed by holding the voltage phase command value Vψ at the previous value or taking other like measures. Fluctuation in the voltage phase command value Vψ due to an error in the current estimation value iu_est is thereby prevented. Therefore, it is possible to eliminate a possibility that torque feedback control of the AC motor 2 becomes unstable.

In the rectangular wave control mode, the current detection time is selected as follows.

Figure 11:
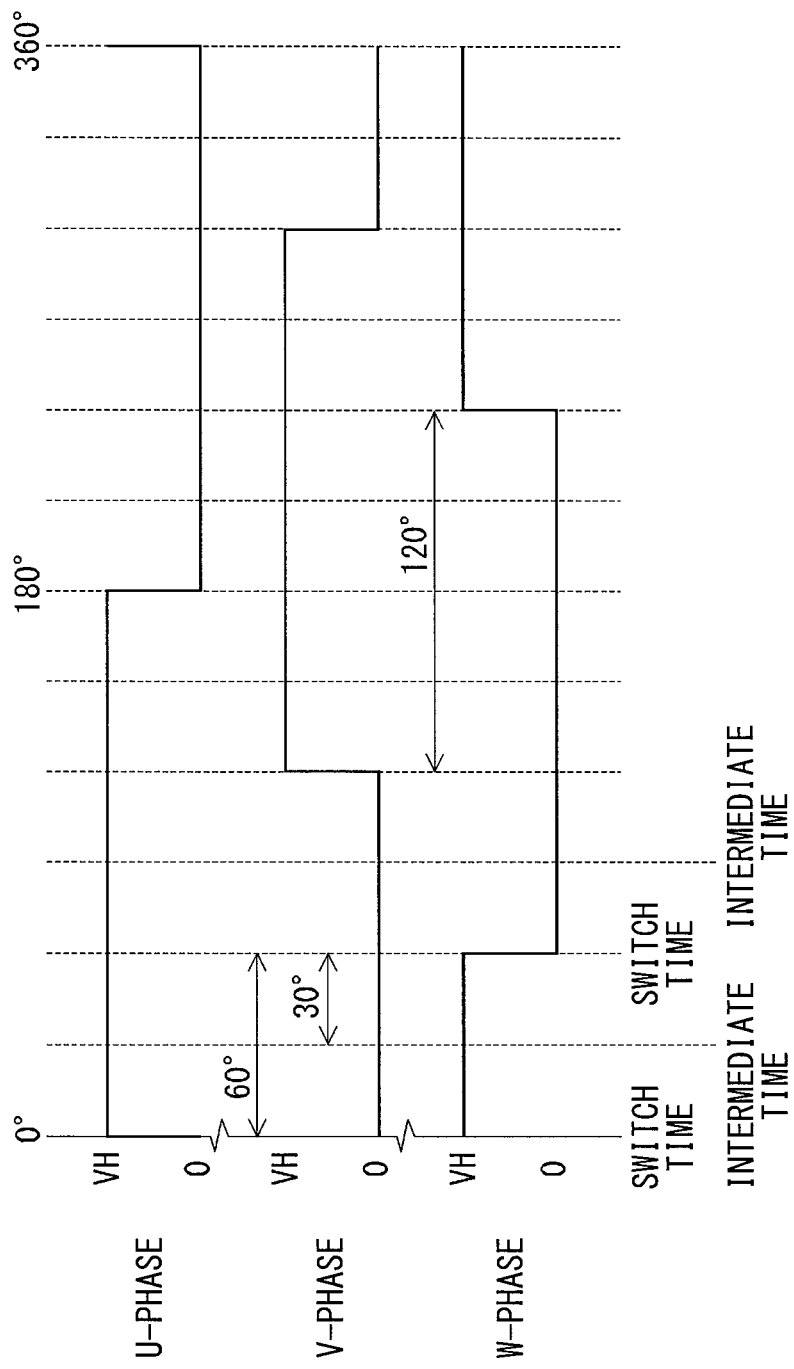
FIG. 11 is a chart explaining switch timing and intermediate timing in the rectangular wave control mode.

As indicated in FIG. 11, the voltage waveform in each phase in the rectangular wave control mode is a waveform in which 0 [V] equivalent to the off-state and system voltage VH equivalent to the on-state are switched over every phase 180 [°]. The phases of the three-phase voltage waveform are shifted from one another by 120[°]. By the switching elements (not shown) in any phase of the inverter 12 being turned on and off at every electrical angle 60[°], turn-on/off of the voltage waveform is switched. The time when the switching elements are turned on and off is referred to as a switch time. The difference in electrical angle between successive switch times is 60[°].

In this embodiment, the detection of current in the sensor phase by the current sensor 13 is performed at each switch time and each intermediate time set between successive switch times.

M intermediate times (m is a natural number) can be set for each electrical angle obtained by equally dividing 60[°] which is the difference in electrical angle between successive switch times by (m+1). For example, one intermediate time can be set for an electrical angle shifted by 30[°] from each switch time. Alternatively two (M=2) intermediate times may be set for electrical angles shifted by 20[°] and 40[°] from each switch time or three (M=3) intermediate times may be set for electrical angles shifted by 15[°], 30[°], and 45[°] from each switch time. As a result, the electrical angle change between each switch time and the intermediate time immediately therebefore or thereafter and the electrical angle change between successive intermediate times are equal to each other.

In the following description, it is assumed as a representative example that, as indicated in FIG. 11, one intermediate time with the electrical angle change between it and each switch time being 30[°] is set in the intermediate phase between successive switch times.

For the following reasons, it is desirable to carry out the detection of current in the sensor phase not only at each switch time but also at each intermediate time as shown in FIGS. 12A, 12B to FIGS. 14A, 14B.

Figure 12A:
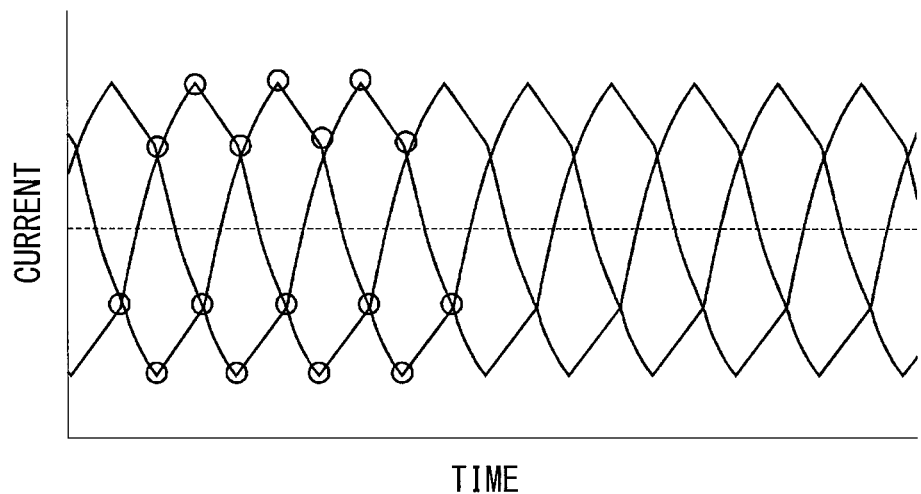
FIGS. 12A and 12B are charts showing the waveform of a current detection value at each switch time and each intermediate time, respectively.
Figure 12B:
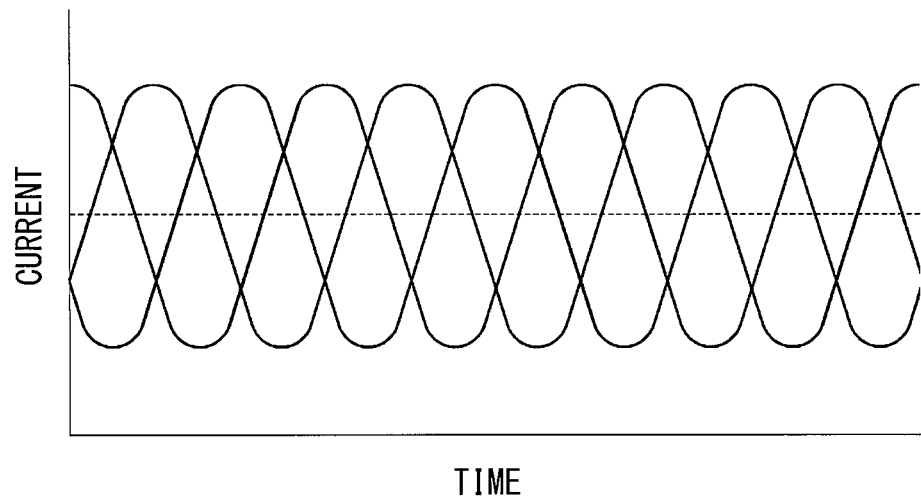

As indicated in FIG. 12A, the waveform of the current detection value detected at each switch time is distorted by the influence of the switching operation of the switching elements. Meanwhile, as indicated in FIG. 12B, the waveform of the current detection value detected at each intermediate time is not influenced by the switching operation so much and is hardly distorted. For this reason, the current waveform formed of both the current detection value at each switch time and the current detection value at each intermediate time is not regularly increased or decreased like a sine wave and tends to irregularly increase or decrease.

With respect to each waveform in FIG. 12A and in FIG. 12B, each of individual waveforms substantially regularly increases or decreases.

Figure 13A:
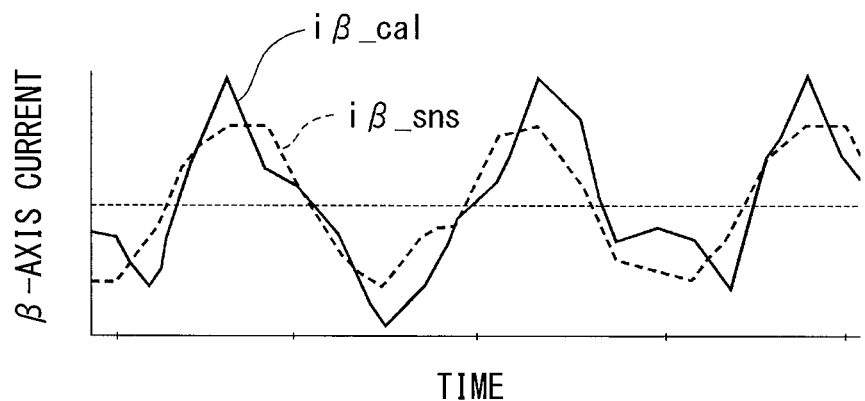
FIGS. 13A and 13B are charts explaining the accuracy of calculation of a $\beta$-axis current i$\beta$ and a sensor phase reference current phase $\theta$x in a comparative example, respectively.
Figure 13B:
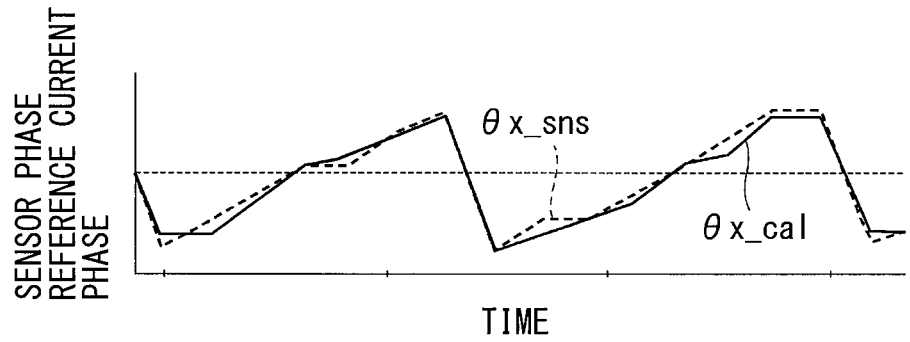

In the comparative examples shown in FIG. 13A and FIG. 13B, the differential value Δiα of the α-axis current is calculated by: calculating the α-axis current is based on the current detection value iw_sns in the sensor phase both at each switch time and at each intermediate time; and differentiating it by switch time and intermediate time. Differentiation by switch time and intermediate time means that the differential value Δiα of the α-axis current is calculated based on the amount of change of α-axis current is to the electrical angle change θΔe between the switch time and the intermediate time.

FIGS. 13A and 13B indicate by solid lines the β-axis current calculation value iβ_cal and the sensor phase reference current phase calculation value θx_cal, which are obtained based on the thus calculated differential value Δiα of the α-axis current, respectively. FIGS. 13A and 13B also indicate by dotted lines the β-axis current measured value iβ_sns and the sensor phase reference current phase measured value θx_sns, which are actual measurement valueres, respectively.

As described above, the current detection value irregularly increases or decreases between the switch time and the intermediate time. Under the influence thereof, as shown in FIG. 13A, the accuracy of calculation of the β-axis current is degraded in the comparative example and the calculation value iβ_cal and the measured value iβ_sns differ from each other. In addition, as shown in FIG. 13B, the accuracy of calculation of sensor phase reference current phase θx based on the α-axis current iα and the β-axis current iβ is degraded and there is a possibility that the calculation value θx_cal and the measured value θx_sns differ from each other.

Figure 14A:
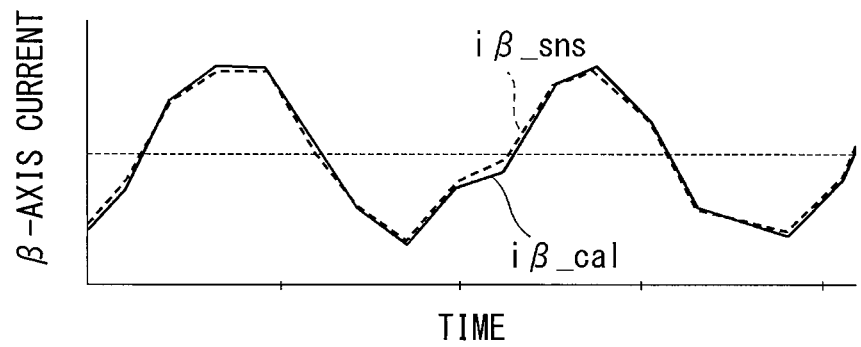
FIGS. 14A and 14B are charts explaining the accuracy of calculation of a $\beta$-axis current i$\beta$ and a sensor phase reference current phase $\theta$x in the first embodiment, respectively.
Figure 14B:
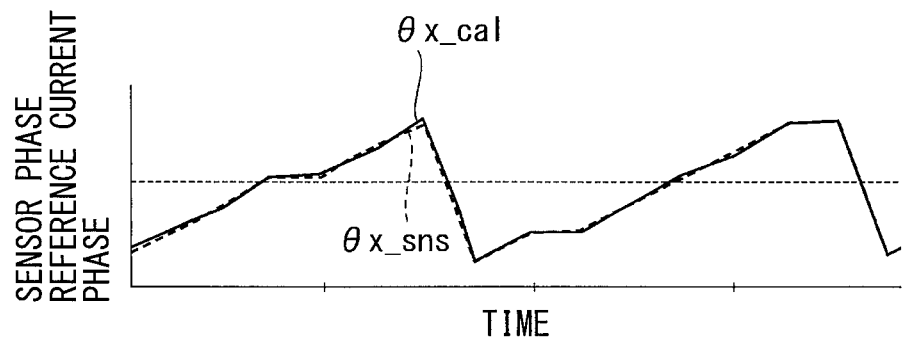

In the example according to the first embodiment, as shown in FIG. 14A and FIG. 14B, meanwhile, the α-axis current iα is calculated based on the current detection value iw_sns in the sensor phase both at each switch time and at each intermediate time. The differential value Δiα of the α-axis current is calculated by carrying out differentiation between switch times at each switch time and calculated by carrying out differentiation between intermediate times at each intermediate time. Differentiation between switch times means that the differential value Δiα of the α-axis current is calculated based on the amount of change of α-axis current iα to the electrical angle change Δθe from the previous switch time to the present switch time. Differentiation between intermediate times means that the differential value Δiα of the α-axis current is calculated based on the amount of change of α-axis current iα to the electrical angle change Δθe from the previous intermediate time to the present intermediate time. Then the β-axis current iβ is calculated based on the differential value Δiα of the α-axis current calculated at each time.

More specifically, for example, when a first intermediate time and a second intermediate time are set for electrical angles shifted by 20[°] and 40[°] from each switch time, differentiation is performed by the following combination: a combination of the first intermediate time and the present first intermediate time or a combination of the previous second intermediate time and the present second intermediate time. That is, the differentiation is not performed between the intermediate times different in electrical angle to each switch time, for example, between the first intermediate time and the second intermediate time.

In this example, the current detection value which irregularly increases or decreases between the switch time and the intermediate time has almost no influence. Therefore, as indicated in FIG. 14A, the β-axis current iβ can be accurately calculated and the calculation value iβ_cal and the measured value iβ_sns favorably agree with each other. Further, as indicated in FIG. 14B, it is possible to enhance the accuracy of calculation of the sensor phase reference current phase θx based on the α-axis current iα and the β-axis current iβ; and the calculation value θx_cal and the measured value θx_sns favorably agree with each other.

When the β-axis current iβ is calculated based on the differential value Δiα of the α-axis current, correction is performed as described below with reference to FIG. 15A and FIG. 15B.

Figure 15A:
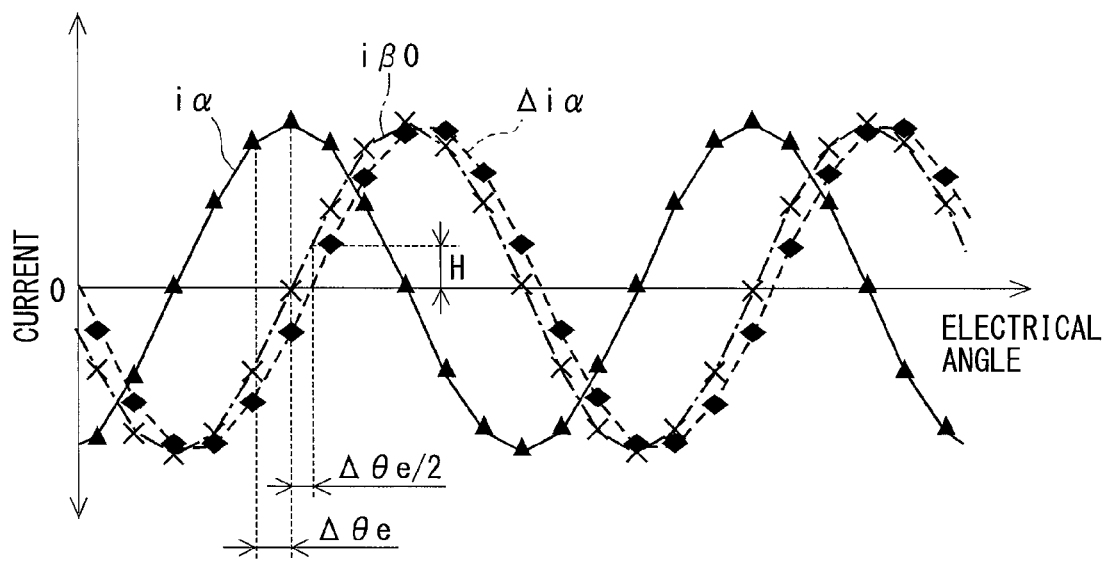
FIGS. 15A and 15B are charts explaining correction used when the $\beta$-axis current 1$\beta$ is calculated based on a differential value $\Delta$i$\alpha$ of the $\alpha$-axis current in the torque feedback control scheme.
Figure 15B:
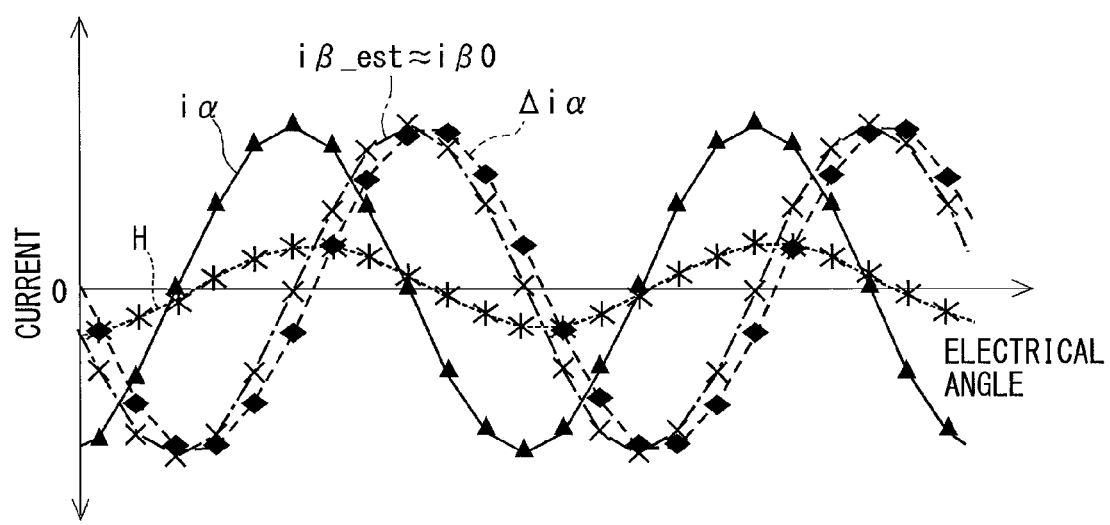

In FIGS. 15A and 15B, the horizontal axis indicates electrical angle. It is indicated that the current detection is performed at each electrical angles indicated by triangles and rhombuses in the waveform. In this example, 30[°] which is the electrical angle change between the switch time and the intermediate time corresponds to the electrical angle change Δθe in the current detection.

When it is supposed that the α-axis current iα and the β-axis current iβ are of ideal sine wave, the actual β-axis current iβ0 is the differential waveform of the α-axis current iα. It is defined as the amount of change of α-axis current iα in infinitesimal electrical angle change. However, the differential value Δiα of the α-axis current in the motor control apparatus 10 is the difference value of the α-axis current iα in finite electrical angle change Δθe. As indicated in FIG. 15A, therefore, the waveform of the differential value Δiα of the α-axis current is delayed from the waveform of actual β-axis current iβ0 by one-half of the electrical angle change, that is, Δθe/2.

Consequently, it is desirable to take the following measure when the β-axis current estimation value iβ_est is calculated based on the differential value Δiα of the α-axis current: a correction amount H equivalent to Δθe/2 is calculated by equation (17) and this correction amount H is added to the differential value Δiα of the α-axis current by equation (18).

$$H=\{i\alpha(n-1)+i\alpha(n)\}/2\times(\Delta\theta e/2) \quad (17)$$

$$i\beta\_est=\Delta i\alpha+H \quad (18)$$

As indicated by equation (17), the correction amount H is calculated as a value obtained by multiplying the average value of the previous value iα(n−1) and the present time value iα(n) of the α-axis current by one-half of the electrical angle change Δθe/2.

As indicated by FIG. 15B, the β-axis current estimation value iβ_est calculated by equations (17) and (18) favorably agrees with the waveform of actual β-axis current iβ0.

In this case, it is desirable to take the following measure with respect to the previous value iα(n−1) and present time value iα(n) of the α-axis current and the corresponding electrical angle change Δθe. That is, it is desirable to take the following measure to calculate the correction amount H as in the calculation of the differential value Δiα of the α-axis current: the α-axis current iα at the previous switch time and the present switch time and the electrical angle change Δθe between the switch times is employed for switch time; and the α-axis current iα at the previous intermediate time and the present intermediate time and the electrical angle change Δθe between the intermediate times is employed for intermediate time.

This makes it possible to accurately calculate the β-axis current iβ based on the differential value Δiα of the α-axis current using the correction amount H equivalent to one-half of the electrical angle change, that is, Δθe/2.

The above-described calculation method for the β-axis current iβ is just an example and the calculation method is not limited to the foregoing and may be changed as appropriate as long as the β-axis current iβ can be accurately calculated.

As described above, the motor control apparatus 10 in the first embodiment switches the feedback control scheme and the control mode according to the operating state of the AC motor 2 and further estimates the currents in the phases other than the sensor phase. It estimates the currents by the current estimation sections 301, 302, 303 (FIG. 7 and FIG. 10) of the control sections 151, 152, 153 (controller 15) corresponding to each control mode.

Current estimation processing routine performed by the current estimation sections 301, 302, 303 will be described with reference to the flowchart shown in FIG. 16 and FIG. 17. FIG. 17 illustrates details of the sensor phase reference current phase detection processing equivalent to Step 20 of FIG. 16. In the following description of the flowcharts, symbol S denotes step.

In the description of this embodiment, as described above, the W-phase is taken as the sensor phase of the three phases and the U-phase is selected as the estimated phase, the current in which is estimated, is taken as an example.

With respect to sections and methods for implementing each step, only a representative example will be described and the description of other sections and methods, which may alternatively be adopted as described with reference to FIG. 7, FIG. 10, and the like.

This current estimation routine is repeatedly performed in a predetermined operation cycle during a period during which the power to the controller 15 is supplied. When this routine is started, at S10, the first step, the current detection value iw_sns in the sensor phase detected at the current sensor 13 is acquired. In addition, the electrical angle θe of the AC motor 2 detected at the rotation angle sensor 14 is acquired.

At S20, the sensor phase reference current phase θx is detected. Specifically, as shown in FIG. 17, at S21, it is checked whether the control mode of the AC motor 2 is the sine wave control mode or the overmodulation control mode.

When the motor control apparatus 10 is operating in the sine wave control mode or the overmodulation control mode, a determination of YES is made at S21 and S22 is performed. At S22, the following processing is performed at the inverse dq conversion section 311 of the sensor phase reference current phase detection section 31: the current command value iv* in the V-phase is calculated by the inverse dq conversion based on the electrical angle θe of the AC motor 2 and the d-axis current command value id* and the q-axis current command value iq*. In this case, the V-phase is one other phase which is not the estimated phase of the two phases other than the sensor phase. Alternatively, the current command values iu*, iv* in the U-phase and the V-phase which are two other phases may be calculated.

S23, S24 and S28, the subsequent steps, are performed at the phase detection section 312 of the sensor phase reference current phase detection section 31. At S23, the α-axis current iα is calculated by equation (5) using the current detection value iw_sns in the sensor phase.

At S24, the β-axis current iβ is calculated by equation (7) using the current command value iv* in one other phase and the current detection value iw_sns in the sensor phase.

Meanwhile, when the motor control apparatus 10 is operating in the rectangular wave control mode, a determination of NO is made at S21 and S25 is performed. S25 to S28 are performed at the phase detection section 362 of the sensor phase reference current phase detection section 36. At S25, the α-axis current iα is calculated by equation (5) using the current detection value iw_sns in the sensor phase.

At S26, the differential value Δiα of the α-axis current is calculated by equation (16) based on the amount of change of α-axis current iα to the electrical angle change Δθe between current detection times for α-axis current iα.

For the electrical angle change Δθe between current detection times, it is desirable to normally use the electrical angle change between switch times and the electrical angle change between intermediate times. However, the electrical angle change between the switch time and the intermediate time may be used.

At the time of switching from the overmodulation control mode to the rectangular wave control mode, the interval by the switching patterns described later can be used to calculate the differential value Δiα of α-axis current.

At S27, the β-axis current iβ is calculated by adding the correction amount H by equations (17) and (18) based on the differential value Δiα of the α-axis current.

After the β-axis current iβ is calculated at S24 or S27, S28 is performed. At S28, the sensor phase reference current phase θx is calculated by equation (8) using α-axis current iα and β-axis current iβ.

Thereafter, S30 and S40 are performed at the other phase estimation section 321 of the basic wave estimation section 32.

At S30, the estimation coefficient iu_kp corresponding to the sensor phase reference current phase θx is calculated by equation (12) or acquired from a map.

At S40, the current estimation value (reference value) iu_est_ref in the U-phase is calculated by equation (13) using the estimation coefficient iu_kp and the current detection value iw_sns in the sensor phase.

Althernatively, the current estimation value iu_est in U-phase may be calculated by equation (11) using the sensor phase reference current phase θx and the current detection value iw_sns in the sensor phase without use of the estimation coefficient iu_kp.

Thereafter, S51 to S54 are performed at the zero cross interpolation section 33.

At S51, it is checked at the zero cross checking section 331 whether or not the present time is the time of zero crossing of sensor phase current. This checking is the same as in the current feedback control scheme in that the determination can be made according to, for example, whether or not the current detection value iw_sns in the sensor phase is within a predetermined range including 0 [A].

When it is determined at S51 that the present time is not the time of zero crossing of sensor phase current (NO), S52 is executed. Then the current estimation value (reference value) iu_est_ref in the U-phase calculated at S40 is outputted as the current estimation value (definite value) iu_est_fix in U-phase without change. S60 is then performed.

Meanwhile, when it is determined at S51 that the present time is the time of zero crossing of sensor phase current (YES), S53 is performed. At S53, when in operation in the current feedback control scheme, the d-axis voltage command value vd* and the q-axis voltage command value vq* are fixed; and when in operation in the torque feedback control scheme, the voltage phase command value Vψ is fixed.

At S54, subsequently, the current estimation value (interpolated value) iu_est_cmp in the U-phase is acquired from the previous value holding section 332. Then this current estimation value (interpolated value) iu_est_cmp is set as the current estimation value (definite value) iu_est_fix in the U-phase. Thus the current estimation value (reference value) iu_est_ref in the U-phase at the time of zero crossing is interpolated and S60 is executed.

At S60, last, dq conversion is performed by equation (15) at the dq conversion section 34 based on the current detection value iw_sns in the sensor phase, the current estimation value (definite value) iu_est_fix in the U-phase, and the electrical angle θe. The d-axis current estimation value id_est and the q-axis current estimation value iq_est are thereby calculated.

This completes the current estimation routine performed by the current estimation sections 301, 302, 303.

The current estimation method at the time of switching will be described with reference to the time charts in FIG. 18 to FIG. 22. This switching occurs when the energization control scheme is switched from the overmodulation control mode in the current feedback control scheme to the rectangular wave control mode in the torque feedback control scheme at the motor control apparatus 10. In FIG. 18 to FIG. 22, F/B denotes feedback and SW denotes switching. The timing marked with ○ or ◇ means that at that time an analog signal from the current sensor 13 is converted into a digital signal by an AD converter and outputted.

In the steady-state torque feedback control scheme except the time of switching, as described above, the β-axis current is calculated based on the differential value Δiα of the α-axis current calculated from the following: the amount of change of α-axis current iα to the electrical angle change Δθe between two present and past current detection times. However, when the α-axis current iα is calculated first after switching to the torque feedback control scheme, there is no past in the torque feedback control scheme; therefore, the steady-state logic cannot be applied without change. In control of the AC motor 2, stable driving by continuous current estimation is called for even when the control mode is switched. Therefore, it is necessary to stipulate a calculation method proper to the time of switching to enable continuous current estimation across switching.

Figure 18:
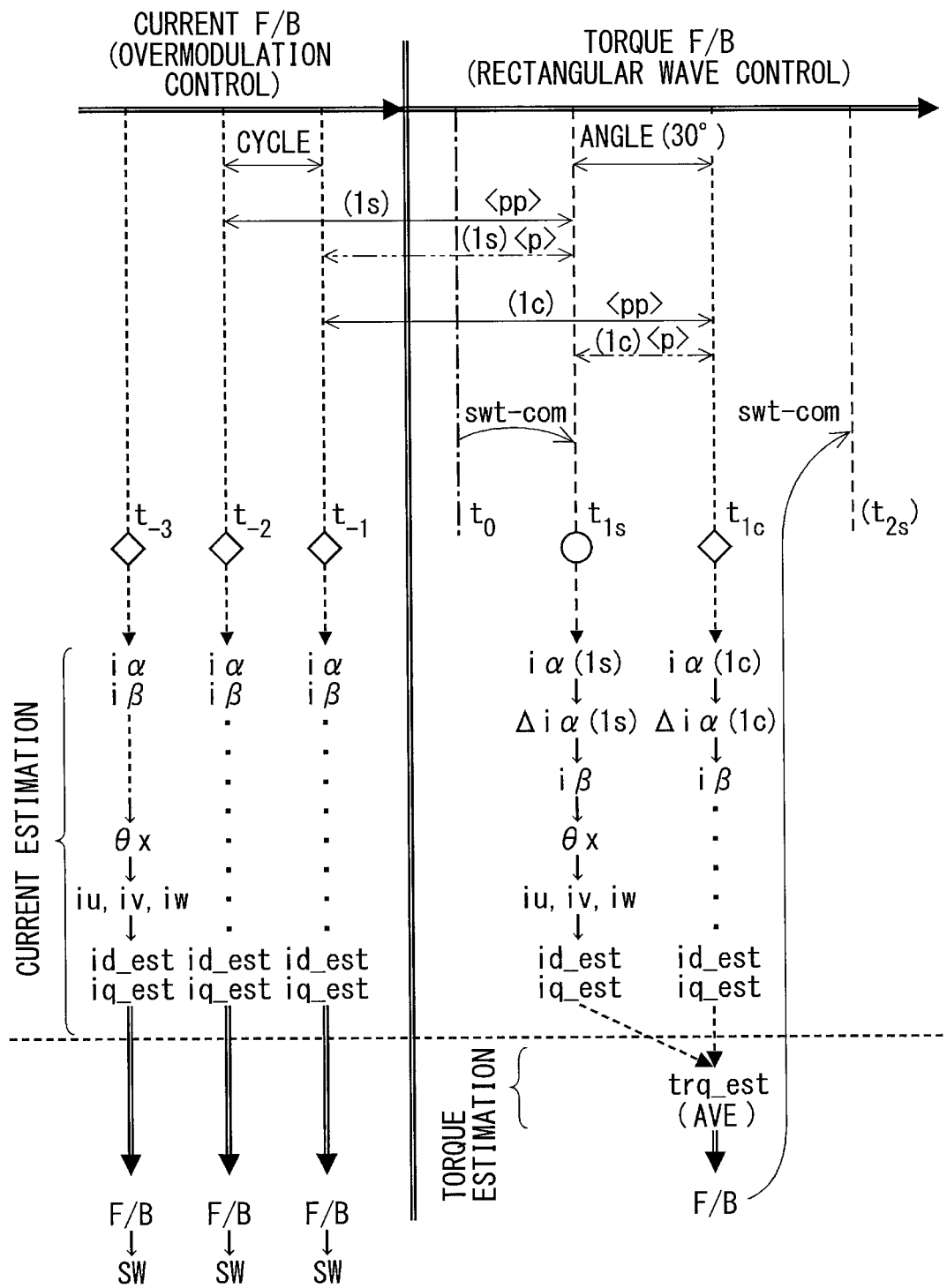
FIG. 18 is a time chart indicating a pattern [1] of switching from the current feedback control scheme to the torque feedback control scheme.
Figure 19:
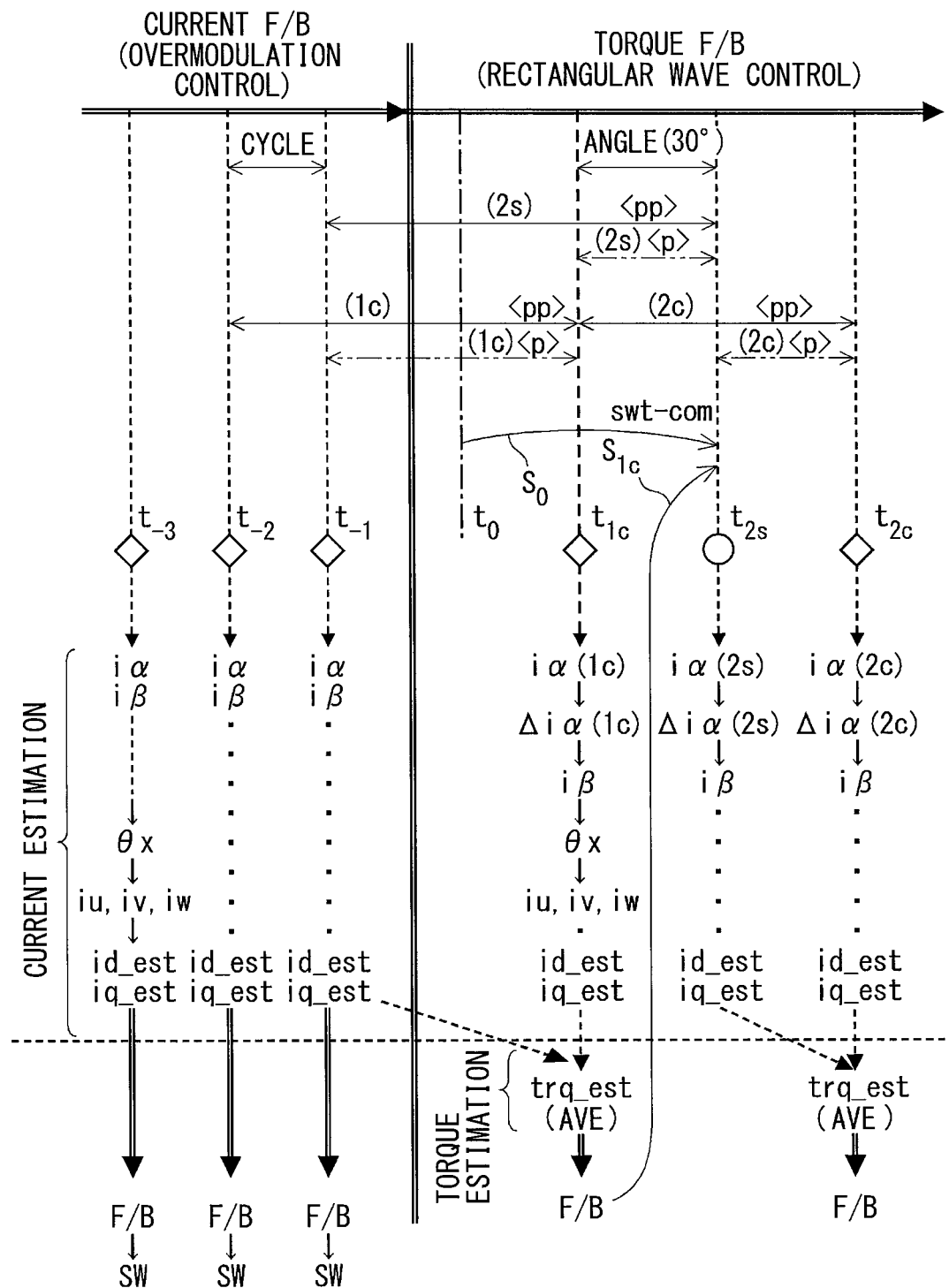
FIG. 19 is a time chart indicating a pattern [2] of switching from the current feedback control scheme to the torque feedback control scheme.

The switching pattern [1] illustrated in FIG. 18 and the switching pattern [2] illustrated in FIG. 19 inclusively show basic patterns of the method of current estimation at the time of switching.

In FIG. 18 and FIG. 19, the following takes place with the time indicated by a double line taken as the border: the control mode is switched from the overmodulation control mode in the current feedback control scheme to the rectangular wave control mode in the torque feedback control scheme. Symbol "t" denotes current detection time in a predetermined certain cycle in the current feedback control scheme and switch time and intermediate time in the torque feedback control scheme.

The suffix 1s to t denotes the first switch time for calculating the α-axis current after switching to the torque feedback control scheme; and the suffix 1c denotes the first intermediate time for calculating the α-axis current after switching. The second switch time for calculating the α-axis current after switching denoted by $t_{2s}$ denotes the switch time next to the first intermediate time $t_{1c}$ after switching regardless of whether or not the first switch time $t_{1s}$ after switching exists.

Symbol ○ denotes the switch time and symbol ◇ denotes the intermediate time. In this example, one intermediate time is set in the phase between successive switch times. Therefore, the electrical angle change from the switch time to the intermediate time and the electrical angle change from the intermediate time to the next switch time are both set to the constant angle 30 [°].

Swt-com denotes the determination of a switch time. At the time $t_0$ immediately after switching in FIG. 18, the next switch time $t_{1s}$ is determined. At the first intermediate time $t_{1c}$ after switching in FIG. 18 and FIG. 19, the next switch time $t_{2s}$ is determined based on the result of torque feedback.

The switching of the control mode is commanded at an arbitrary time according to the state of control; therefore, whether the first current detection time after switching is the switch time or the intermediate time depends on the operation state.

When it is supposed that the electrical angle change from the virtual switch time immediately before switching to the time of switching is θtr [°], the following takes place: when 30[°]≤θtr<60[°], as shown in FIG. 18, the first current detection time after switching is the switch time; meanwhile, when 0 [°]<θtr<30[°], as shown in FIG. 19, the first current detection time after switching is the intermediate time. In this case, the first switch time $t_{1s}$ after switching does not exist. The second switch time $t_{2s}$ after switching is determined based on either or both of information $S_0$ arising from time $t_0$ and information $S_{1c}$ arising from intermediate time $t_{1c}$.

The suffix −1 to t during a period in the current feedback control scheme before switching denotes the last current detection time before switching. The suffix −2 denotes the second last current detection time before switching and the suffix −3 denotes the third last current detection time before switching.

The time in a certain cycle when the current detection is performed in the current feedback control scheme is not the time immediately after switching but is substantially equivalent to the intermediate time. Therefore, it is marked with the same symbol ◇ as the symbol indicating the intermediate time in the torque feedback control scheme.

In the current feedback control scheme, the current estimation sections 301, 302 carry out the following processing: the α-axis current iα is calculated based on the current detection value in the sensor phase at each current detection time; and the β-axis current iβ is calculated based on the current detection value in the sensor phase and the current command value in one other phase. Then the current estimation sections 301, 302 calculate the sensor phase reference current phase θx from the α-axis current iα and the β-axis current iβ and calculate three-phase current values iu, iv, iw from the current detection value in the sensor phase and the sensor phase reference current phase θx. In this embodiment, the estimation value iu_est is used as the U-phase current iu and the detected value iw_sns is used as the W-phase current iw. The V-phase current iv can be calculated by Kirchhoff's law. The three-phase current values iu, iv, iw are dq-converted to calculate the d-axis current estimation value id_est and the q-axis current estimation value iq_est, which are fed back to the d-axis current command value id* and the q-axis current command value iq*.

Meanwhile, in the torque feedback control scheme, the current estimation section 303 carries out the following processing: at each switch time and each intermediate time, the α-axis current iα is calculated based on the electrical angle at that time and the current detection value in the sensor phase; thereafter, the β-axis current iβ is calculated based on the differential value Δiα of the α-axis current determined by the calculation method for the time of switching described below. Then as in the current feedback control scheme, the current estimation section 303 calculates the sensor phase reference current phase θx, the three-phase current values iu, iv, iw, the d-axis current estimation value id_est, and the q-axis current estimation value iq_est. The torque estimation section 56 calculates the torque estimation value trq_est based on the d-axis current estimation value id_est and the q-axis current estimation value iq_est and feeds it back to the torque command value trq*.

Hereafter, the calculation method for the differential value Δiα of the α-axis current at the time of control mode switching will be described. As described above, when the control mode is switched, it is required to carry out continuous current estimation across switching. For this purpose, it is necessary to transfer the control information such as current estimation values between the overmodulation control mode in the current feedback control scheme and the rectangular wave control mode in the torque feedback control scheme.

This embodiment is characterized in that the following are used to calculate the differential value $\Delta i\alpha$ of the $\alpha$-axis current at the first or first and second current detection times after switching to the torque feedback control scheme: the present time value which is the electrical angle at these times and the detected current is used; and the electrical angle in operation in the current feedback control scheme before switching and the detected current are used as past value.

There are two methods for using the past value: a pattern in which a previous value which is a value at the last time before the present time is used; and a pattern in which a second previous value which is a value at the second last time before the present time is used. In FIG. 18 and FIG. 19, <p> denotes a pattern in which the previous value is used and <pp> denotes a pattern in which the second previous value is used.

For example, in the pattern <p> in which the previous value is used at the first switch time $t_{1s}$ after switching in FIG. 18, the following measure is taken: the amount of change of $\alpha$-axis current is to the electrical angle change from the last current detection time $t_1$ before switching is taken as a differential value $\Delta i\alpha(1s)$. In the pattern <pp> in which the second previous value is used, the following measure is taken: the amount of change of $\alpha$-axis current is to the electrical angle change from the second last current detection time $t_2$ before switching is taken as a differential value $\Delta i\alpha(1s)$. (1s) on each arrow indicates that the electrical angle change indicated by the arrow is used in differentiation at that time.

In the pattern <p> in which the previous value is used at the first intermediate time $t_{1c}$ after switching in FIG. 18, the following measure is taken: the $\alpha$-axis current $i\alpha(1s)$ at the first switch time $t_{1s}$ after switching to the torque feedback control scheme is used to calculate the differential value $\Delta i\alpha(1c)$ at the constant angle 30[°]. In the pattern <pp> in which the second previous value is used, the following measure is taken: the amount of change of $\alpha$-axis current $i\alpha$ to the electrical angle change from the last current detection time $t_1$ before switching is taken as the differential value $\Delta i\alpha(1c)$. This is the same in the example shown in FIG. 19.

As described above, when the previous value is used as the past value, it is required to constantly hold one set of electrical angle and current detection value regardless of the feedback control scheme. When the second previous value is used, it is required to constantly hold two sets of electrical angle and current detection value.

The calculation of the torque estimation value trq_est by the torque estimation section 56 will be described next.

In this embodiment, as shown in FIG. 18 and FIG. 19, the torque estimation value trq_est is calculated by an average value (AVE) based on the following: the d-axis current estimation value id_est and the q-axis current estimation value iq_est calculated at some switch time; and the d-axis current estimation value id_est and the q-axis current estimation value iq_est calculated at the next intermediate time. This makes it possible to suppress abrupt fluctuation in torque estimation value trq_est.

In the case of the switching pattern [2] in FIG. 19, the torque estimation value trq_est may be calculated by the average value of the following at the first intermediate time $t_{1c}$ after switching: the d-axis current estimation value id_est and the q-axis current estimation value lq_est at the last current detection time $t_1$ in the current feedback control scheme.

Figure 20:
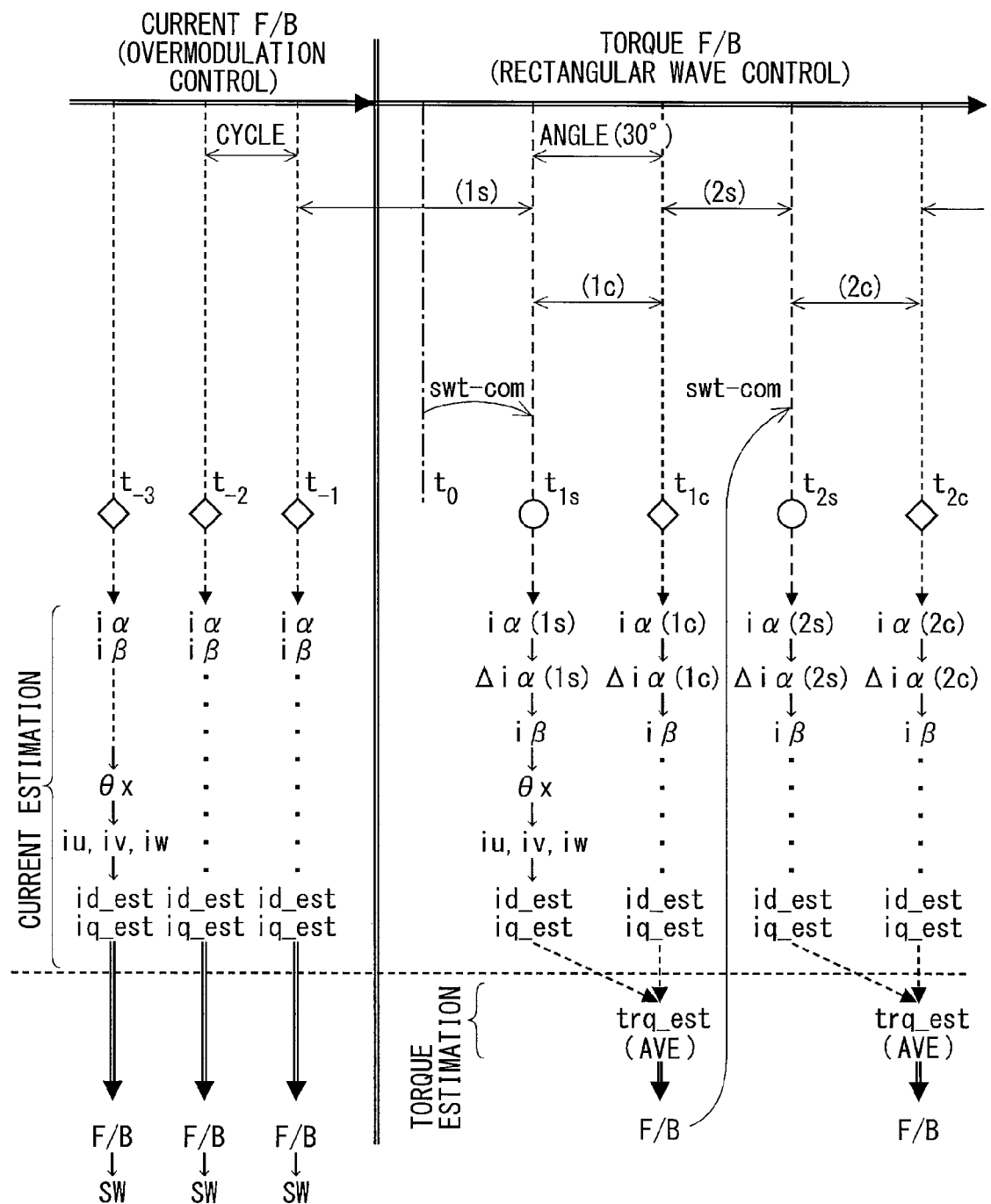
FIG. 20 is a time chart indicating a pattern [3] of switching from the current feedback control scheme to the torque feedback control scheme.
Figure 21:
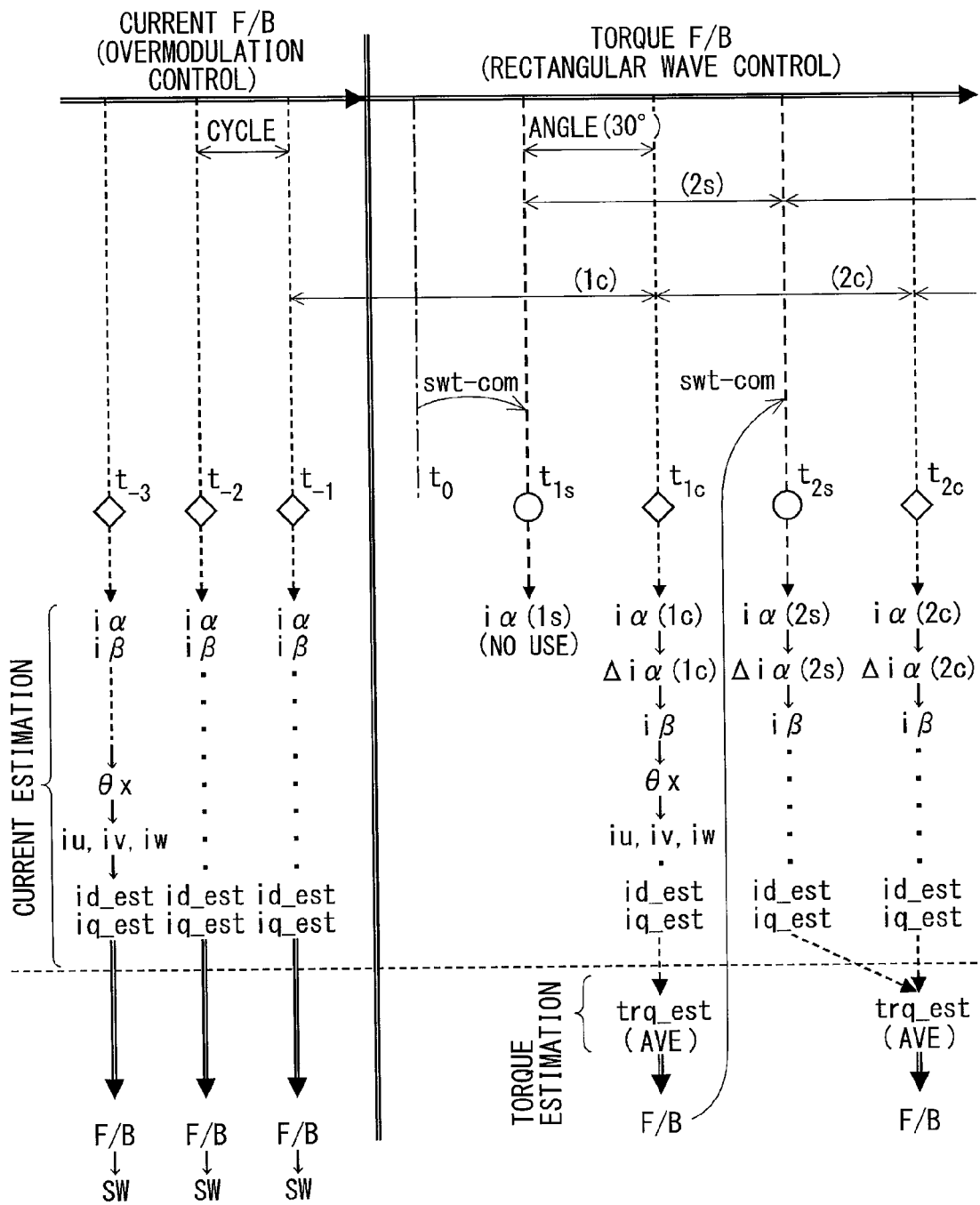
FIG. 21 is a time chart indicating a pattern [4] of switching from the current feedback control scheme to the torque feedback control scheme.
Figure 22:
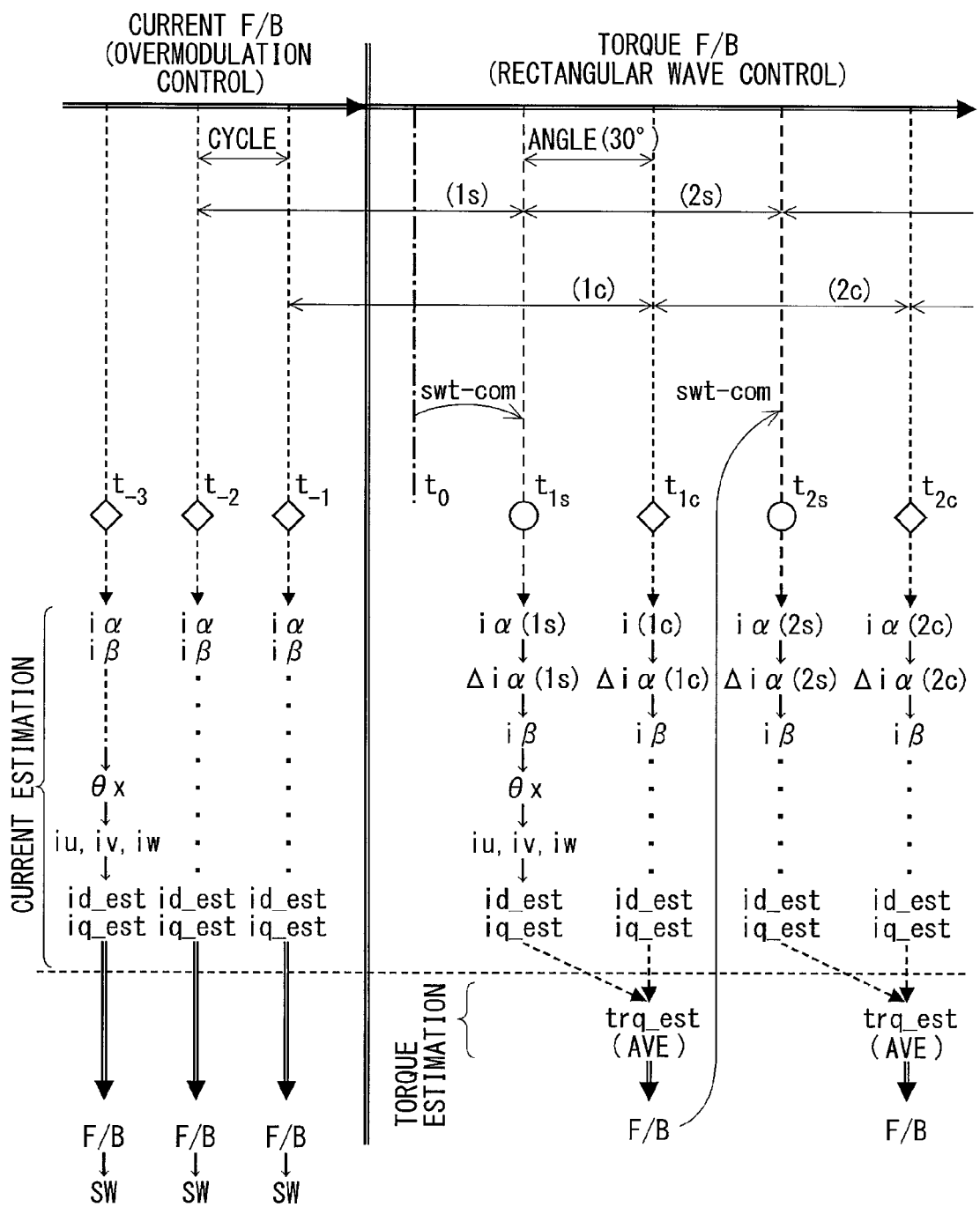
FIG. 22 is a time chart indicating a pattern [5] of switching from the current feedback control scheme to the torque feedback control scheme.

The time charts shown in FIG. 20 to FIG. 22 indicate patterns in which the switching patterns [1] and [2] shown in FIG. 18 and FIG. 19 are applied and gradual transition is made from the first $\alpha$-axis current calculation time after switching to steady-state current estimation.

The switching pattern [3] shown in FIG. 20 employs a pattern in which the previous value is used as the past value. More specifically, at the first switch time $t_{1s}$ after switching, the amount of change of $\alpha$-axis current $i\alpha$ to the electrical angle change from the last current detection time $t_1$ in the current feedback control scheme is taken as the differential value $\Delta i\alpha(1s)$. After the first intermediate time $t_{1c}$ after switching, the previous value after switching is normally used to calculate the differential value $\Delta i\alpha$ of $\alpha$-axis current.

The switching pattern [4] shown in FIG. 21 and the switching pattern [5] shown in FIG. 22 employ a pattern in which the second previous value is used as the past value. These patterns are common in: that at the first intermediate time $t_{1c}$ after switching to the torque feedback control scheme, the amount of change of $\alpha$-axis current $i\alpha$ to the electrical angle change from the last current detection time $t_1$ in the current feedback control scheme is taken as a differential value $\Delta i\alpha(1c)$; and that after the second switch time $t_{2s}$ after switching, the differential value $\Delta i\alpha$ of the $\alpha$-axis current is normally calculated between switch times and between intermediate times.

However, these switching patterns are different from each other in the following which takes place at the first switch time $t_{1s}$ after switching: in the switching pattern [5] in FIG. 22, the amount of change of $\alpha$-axis current $i\alpha$ to the electrical angle change from the second last current detection time $t_2$ before switching is taken as the differential value $\Delta i\alpha(1s)$; whereas in the switching pattern [4] in FIG. 21, the differential value $\Delta i\alpha(1s)$ is not calculated. That is, in the switching pattern [4], the electrical angle at the second last current detection time $t_2$ before switching or the $\alpha$-axis current $i\alpha$ at the time $t_2$ is not used as the past value and the electrical angle at the first switch time $t_{1s}$ after switching or the $\alpha$-axis current $i\alpha(1s)$ at the time $t_{1s}$ is not used as the present time value.

In the switching patterns (4) and (5), the $\alpha$-axis current is normally differentiated between the switch times and between the intermediate times to calculate the $\beta$-axis current $i\beta$; therefore, the accuracy of calculation of the $\beta$-axis current $i\beta$ can be enhanced. The last current detection time $t_1$ in the current feedback control scheme in which the second previous value is used at the first intermediate time $t_{1c}$ after switching is substantially the intermediate time. Differentiation equivalent to that between intermediate times is performed and this is favorable. When the time next to the time $t_0$ is an intermediate time as in the switching pattern [2] in FIG. 19, the differentiation between intermediate times is performed after the second intermediate time $t_{2c}$ after switching.

In the case of the switching pattern [5], the differentiation between the switch time and the intermediate time is substantially performed when the following are used as the second previous value at the first switch time $t_{1s}$ after switching: the electrical angle at the second last current detection time $t_2$ in the current feedback control scheme and the current detection value at the time $t_2$. Only the differential value at this time is different in property from the differential values thereafter. However, when the following measure is taken to calculate the torque estimation value trq_est, the problem is solved: the torque estimation value trq_est is calculated by the average value of the d-axis current estimation value id_est and the q-axis current estimation value iq_est calculated based on the differential value between intermediate times. Thus the influence of the current detection value at a switch time is diluted and is permissible.

Figure 23:
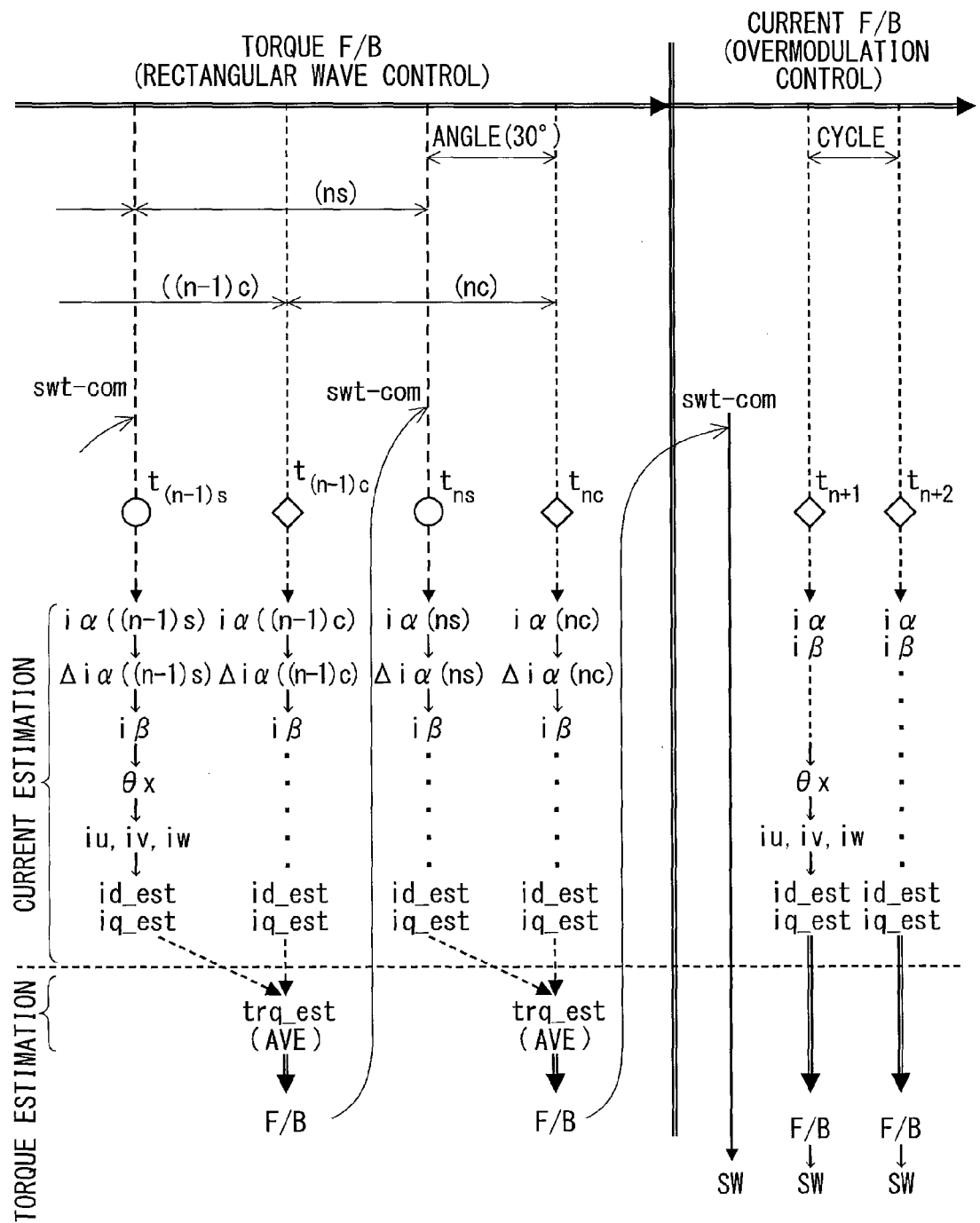
FIG. 23 is a time chart indicating a pattern [6] of switching from the torque feedback control scheme to the current feedback control scheme.

FIG. 23 is a time chart indicating the pattern [6] of switching from the rectangular wave control mode in the torque feedback control scheme to the overmodulation control mode in the current feedback control scheme contrary to the foregoing.

In FIG. 23, after the n-th intermediate time $t_{nc}$ in the rectangular wave control mode in the torque feedback control scheme, the control mode is switched to the overmodulation control mode in the current feedback control scheme. With respect to the calculation of the differential value $\Delta i\alpha$ of $\alpha$-axis current in the torque feedback control scheme, the patterns in which the differentiation is performed between the switch times and between the intermediate times as in the switching patterns [4] and [5] have been taken as examples. Instead, as in the switching pattern [3] in FIG. 20, the differentiation may be performed between the switch time and the intermediate time. The last time before switching may be a switch time.

The first switch time after switching to the overmodulation control mode in the current feedback control scheme is determined based on information in the torque feedback control scheme. At the first switch time after switching to the overmodulation control mode, switching may be performed after the current is detected.

After the subsequent current detection time $t_{n+1}$, the current estimation is performed only by the present time value. When attention is paid only to this respect, it seems that the past value need not be held during control in the current feedback control scheme. However, in consideration of a possibility that the control scheme may be switched from the current feedback control scheme to the torque feedback control scheme again, it is desirable to constantly hold the past value.

As described above, multiple intermediate times in the torque feedback control scheme may be set between successive switch times. When multiple intermediate times are set between successive switch times, it is desirable to take the following measure in the above switching patterns [4] and [5]: a number of past values corresponding to the number of intermediate times are held and differentiation is performed between corresponding intermediate times.

Experimental data pertaining to the time of switching of the control mode by the motor control apparatus 10 in this embodiment will be described with reference to FIG. 24 to FIGS. 27A, 27B.

Figure 24:
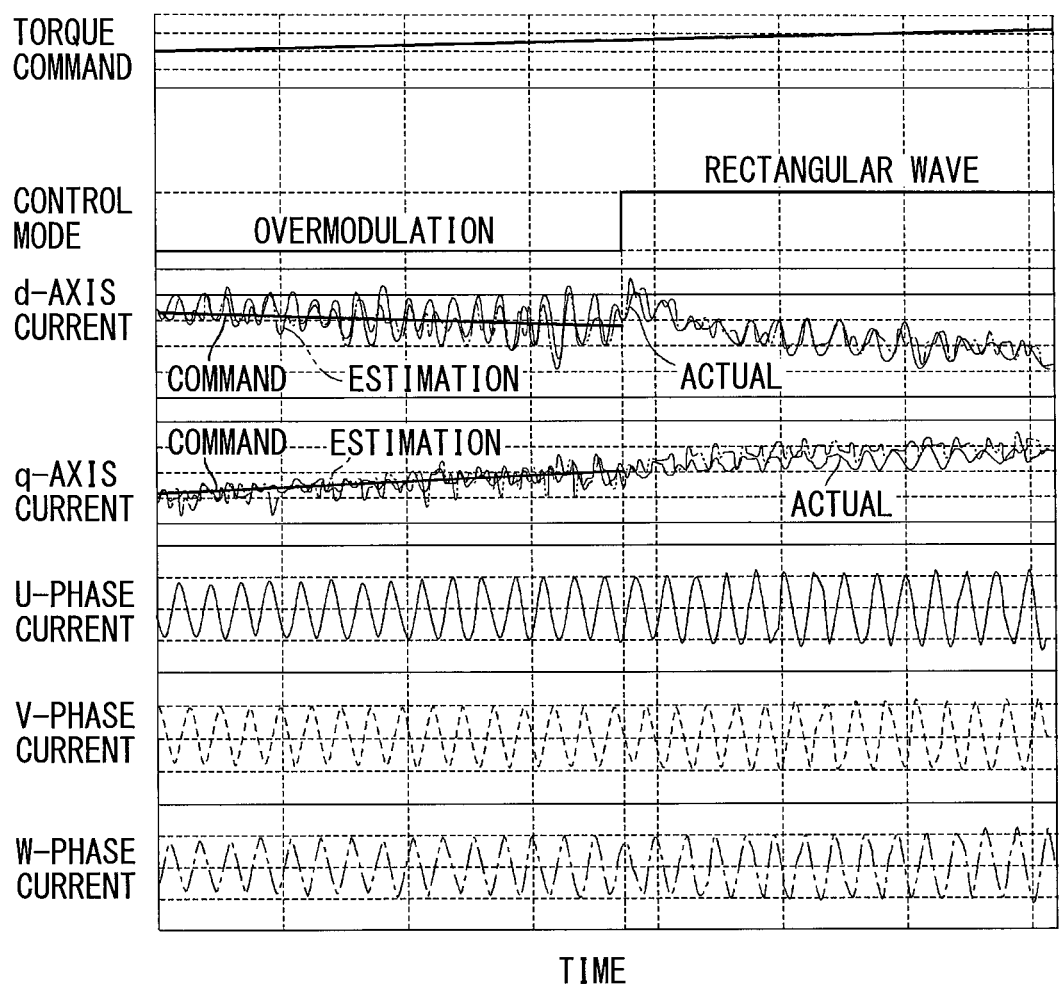
FIG. 24 is a chart showing experimental data of a current waveform provided when the control scheme is switched from the current feedback control scheme to the torque feedback control scheme according to the first embodiment.
Figure 25A:
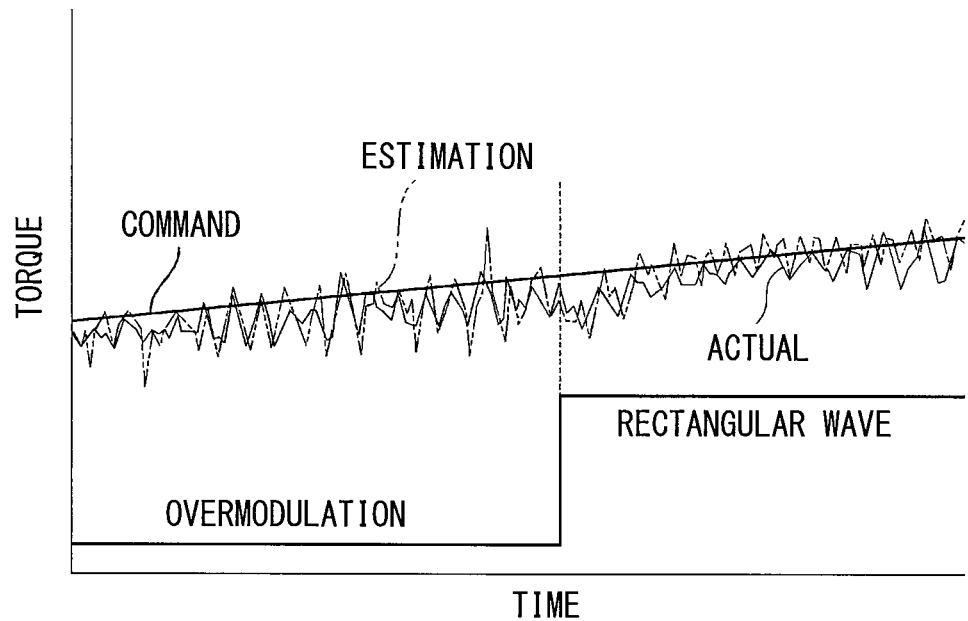
FIGS. 25A and 25B are experimental data of torque waveform based on the current waveform in FIG. 24.
Figure 25B:
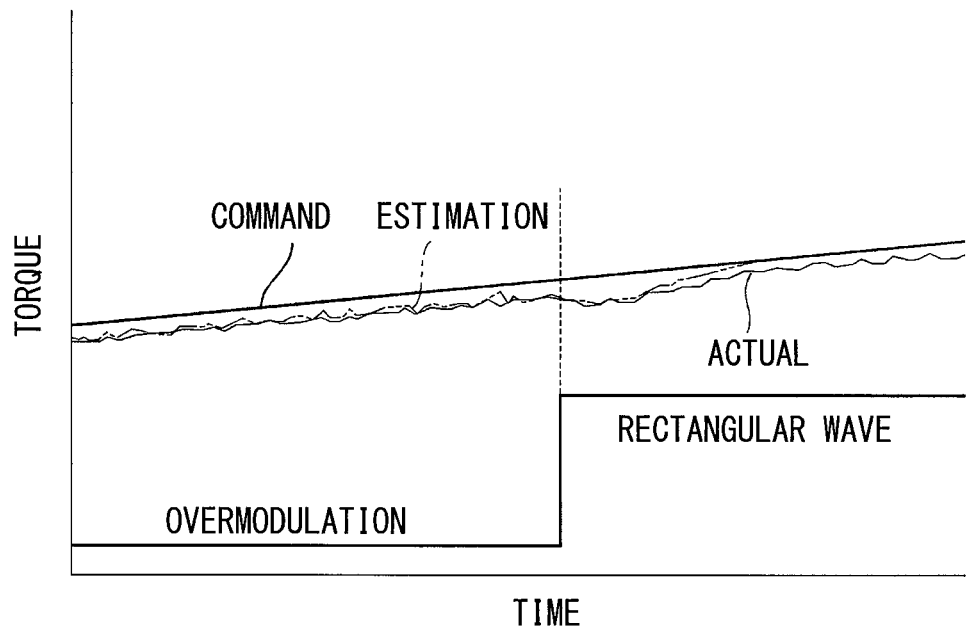

FIG. 24 and FIGS. 25A, 25B indicate the current waveform and torque waveform obtained when the above switching pattern [5] is applied at the time of the following switching: switching from the overmodulation control mode in the current feedback control scheme to the rectangular wave control mode in the torque feedback control scheme.

As indicated in FIG. 24, the three-phase currents in the U-phase, the V-phase, and the W-phase, the d-axis current, and the q-axis current are continuous across switching. As indicated in FIGS. 25A, 25B, the torque estimation value and the value obtained by smoothing the torque estimation value are also continuous. According to this result, it is verified that the switching from the overmodulation control mode to the rectangular wave control mode in this embodiment does not pose any problem in terms of practical use.

Figure 26:
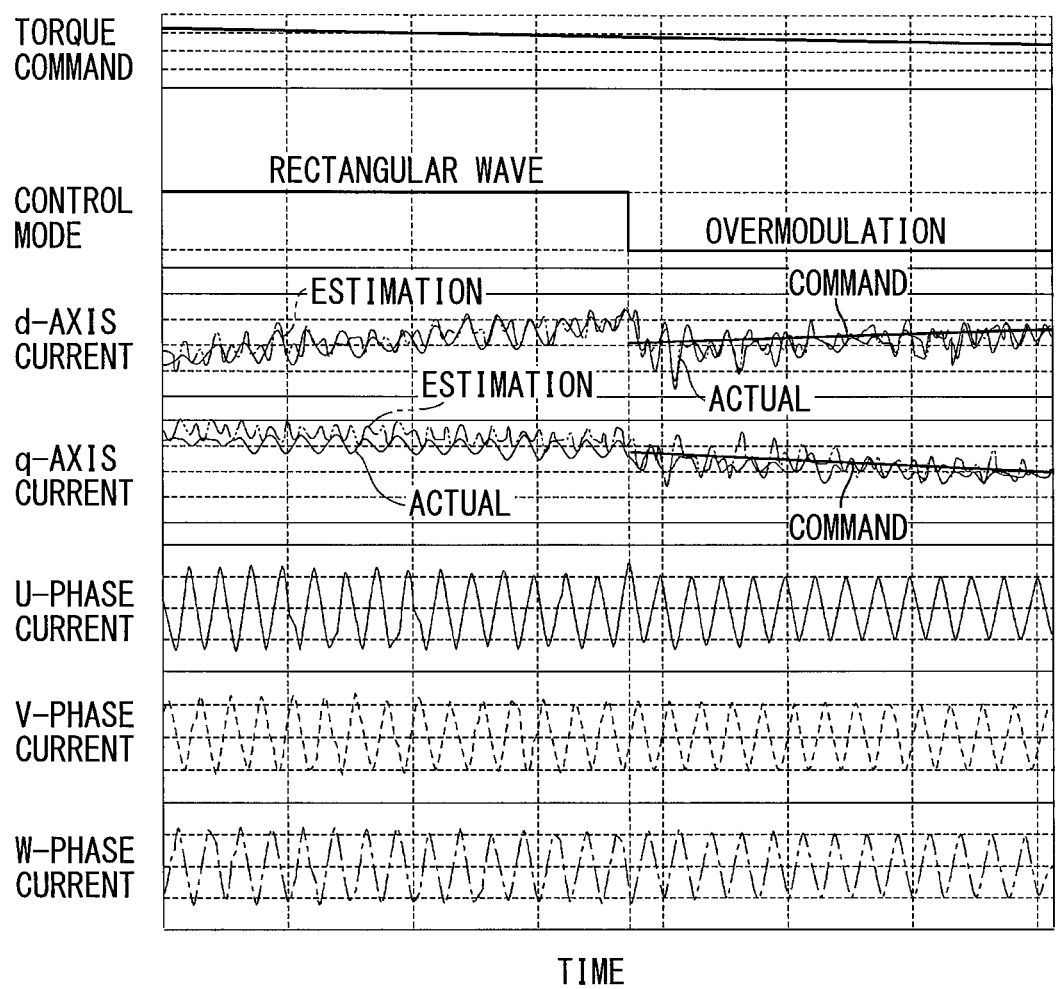
FIG. 26 is a chart showing experimental data of a current waveform provided when the control scheme is switched from the torque feedback control scheme to the current feedback control scheme according to the first embodiment.
Figure 27A:
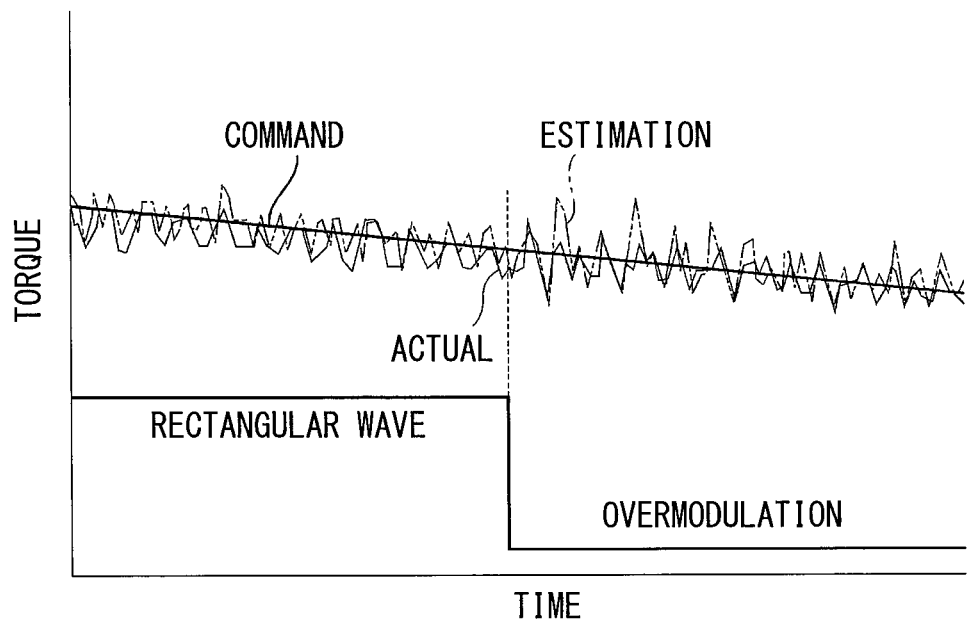
FIGS. 27A and 27B are charts showing experimental data of torque waveform based on the current waveform in FIG. 26.
Figure 27B:
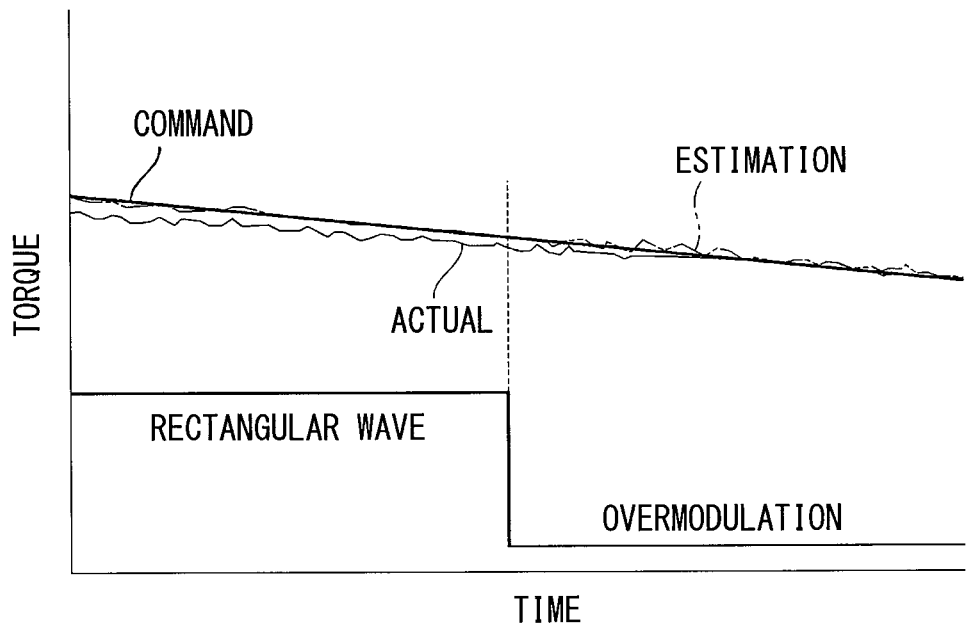

FIG. 26 and FIGS. 27A, 27B indicate the current waveform and the torque waveform obtained when the above switching pattern [6] is applied at the time of the following switching: switching from the rectangular wave control mode in the torque feedback control scheme to the overmodulation control mode in the current feedback control scheme.

As indicated in FIG. 26, the three-phase currents in the U-phase, the V-phase, and the W-phase, the d-axis current and the q-axis current are continuous across switching. As indicated in FIGS. 27A, 27B, the torque estimation value and the value obtained by smoothing the torque estimation value are also continuous. According to this result, it is verified that the switching from the rectangular wave control mode to the overmodulation control mode in this embodiment does not pose any problem in terms of practical use, either.

Advantage of First Embodiment (1) The motor control apparatus 10 detects the phase current in one of the three-phases by the current sensor 13 and estimates the phase currents in the other two phases. By providing the current sensor 13 only in the sensor phase, the number of current sensors can be reduced. This makes it possible to reduce the size of the vicinity of the three-phase output terminals of the inverter 12 and the cost of the motor control apparatus 10.

The following advantage is brought about by reducing the number of current sensors to one: the influence of gain error in current sensors that may occur in a conventional control system of an AC motor using multiple current sensors. This makes it possible to eliminate output torque fluctuation caused by gain error of multiple current sensors in the AC motor 2. In case of, for example, those for vehicles, this leads to elimination of vehicle vibration and merchantability of vehicles can be got rid of.

The controller 15 of the motor control apparatus 10 switches the current estimation method between the following with respect to the method of current estimation in the phases other than the sensor phase at the current estimation sections 301, 302, 303: between the operation in the current feedback control scheme and the operation in the torque feedback control scheme.

Specifically, the following measure is taken with respect to the calculation of the $\alpha$-axis current $i\alpha$ and the $\beta$-axis current $i\beta$: in the current feedback control scheme in which the current command value is used, the $\beta$-axis current $i\beta$ is calculated based on the current command values in the phases other than the sensor phase; meanwhile, in the torque feedback control scheme in which the current command value is not used, the $\beta$-axis current $i\beta$ is calculated based on the differential value $\Delta i\alpha$ of the $\alpha$-axis current without use of the current command value.

The first embodiment is compared with a conventional apparatus, which is so configured that a current sensor is provided only in one phase.

In the technology disclosed in patent document 1, the current estimation values in the two other phases (for example, V-phase and W-phase) based on the following: the current detection value in one phase (for example, U-phase) detected with a current sensor, a d-axis current command value and a q-axis current command value, and information about the electrical angle of the AC motor.

Specifically, a U-phase current phase angle θ is determined by adding the angle formed by the U-phase axes of the rotor and stator of the AC motor and the command current phase angle obtained from the d-axis current command value id* and the q-axis current command value iq*. Then the current amplitude Ia is calculated as follows by using the U-phase current phase angle θ' and the U-phase current detection value iu. This current amplitude Ia is multiplied by the sine value at the electrical angle shifted by ±120[°] from the U-phase current phase angle θ' and the current estimation values iv, iw in the two other phases are calculated as follows.

$$Ia = iu/[\sqrt{(1/3)} \times \{-\sin(\theta')\}]$$

$$iv = \sqrt{(1/3)} \times Ia \times \{-\sin(\theta'+120°)\}$$

$$iw = \sqrt{(1/3)} \times Ia \times \{-\sin(\theta'+240°)\}$$

Since this current estimation method requires a d-axis current command value id* and a q-axis current command value iq*, it cannot be applied to the torque feedback control scheme that does not involve a d-axis current command value id* or a q-axis current command value iq*.

Patent document 3 discloses a technology for calculating current estimation values in two other phases (for example, V-phase and W-phase) based on the following: a current detection value in one phase (for example, U-phase) detected with a current sensor and three-phase current command values. Specifically, of three-phase current command values iu*, iv*, iw* obtained by inverse-dq-converting a d-axis current command value id* and a q-axis current command value iq*, the current command values iv*, iw* in the two phases other than the sensor phase are handled as estimation values.

Similarly to the technology in patent document 1, this current estimation method also requires a d-axis current command value id* and a q-axis current command value iq*. Therefore, it cannot be applied to the torque feedback control scheme which does not involve the d-axis current command value id* or the q-axis current command value iq*.

Unlike these conventional arts, the controller 15 of the motor control apparatus 10 in this embodiment can do the following when in operation in the torque feedback control scheme: it can calculate the β-axis current iβ based on the differential value Δiα of the α-axis current without use of a current command value. This current estimation method is devised as the result of paying attention to that the phase difference between the α-axis current iα and the β-axis current iβ is 90[°] and the α-axis current iα and the β-axis current iβ are in the relation of sine wave and cosine wave.

This makes it possible to use the current feedback control scheme and the torque feedback control scheme together in a control apparatus for an AC motor which detects the phase current in one of the three phases with only one current sensor. In this embodiment, especially, the phase currents can be appropriately estimated by estimating the phase currents in the other phases based on the current detection value in one phase.

Therefore, when the control apparatus is applied to an AC motor 2 of a hybrid vehicle or the like as in this embodiment, the AC motor 2 can be efficiently driven by taking the following measure: the control mode is switched between the sine wave control mode or the overmodulation control mode and the rectangular wave control mode according to the operating state such as the number of rotations and output torque of the AC motor 2.

(2) At the current estimation sections 301, 302, 303 in this embodiment, the sensor phase reference current phase θx is calculated based on the following: the α-axis current iα and the β-axis current iβ in the fixed coordinate system (α-β coordinate system) relative to the sensor phase. Therefore, the actual current phase θx relative to the sensor phase can be calculated. In addition, the current estimation value iu_est in another phase is calculated based on the sensor phase reference current phase θx and the current detection value iw_sns in the sensor phase. Therefore, the current estimation value iu_est in the other phase can be accurately calculated with the influence of the harmonic component of the actual current phase θx and fluctuation which can ordinarily occur taken into account.

This embodiment will be compared with the conventional arts again. The technology in Jpatent document 1 and patent document 3 are both so designed that the following processing is performed: the currents in the phases other than the sensor phase are estimated based on a current command value. The current vector of an AC motor follows a command current vector while fluctuating relative to the command current vector corresponding to a current command value due to the influence of control error, feedback control, and the like. For this reason, a deviation is produced between an actual current phase and a command current phase and the command current phase is not information accurately reflecting the actual current phase. In this respect, these conventional arts do not take the actual current phase into account at all. In the conventional arts, the current estimation values in the two other phases are calculated using the U-phase current phase angle determined from a command current phase angle. Therefore, especially when torque change or rotational speed change is required as for vehicles, a current estimation value cannot be accurately calculated and there is a possibility that the control of an AC motor cannot be implemented.

Meanwhile, the controller 15 of the motor control apparatus 10 in this embodiment carries out current estimation based on the α-axis current iα and the β-axis current iβ in the α-β coordinate system; therefore, the accuracy of calculation of a current estimation value iu_est can be enhanced.

(3) In this embodiment, the following method is recommended as a favorable calculation method for β-axis current iβ in the current feedback control scheme: a method in which the β-axis current iβ is calculated based on the current command value in one phase other than the sensor phase and the current detection value in the sensor phase. That is, to calculate the β-axis current iβ, the following method is preferable to the method of calculating it based on the current command values in the two phases other than the sensor phase: the method of calculating it based on the current command value in one phase other than the sensor phase and the current detection value in the sensor phase. The following is a reason therefor:

When the α-axis current iα is calculated based on the current detection value iw_sns 1 in the sensor phase and the β-axis current iβ is calculated without use of the current detection value iw_sns in the sensor phase, the following range is relatively narrowed in the α-β coordinate system: a range where the current detection value has great influence and the error in the calculation of sensor phase reference current phase θx is small. For this reason, it is impossible to sufficiently enhance the accuracy of calculation of the sensor phase reference current phase θx or the accuracy of calculation of the current estimation value iu_est based on the sensor phase reference current phase θx.

Meanwhile, when the α-axis current iα is calculated based on the current detection value iw_sns in the sensor phase and β-axis current iβ is calculated using the current detection value iw_sns in the sensor phase, the following range can be expanded in the α-β coordinate system: a range where the current detection value has great influence and the error in the calculation of sensor phase reference current phase θx is small. Therefore, the influence of the current detection value in the sensor phase can be included in the β-axis current iβ and as a result, the accuracy of calculation of sensor phase reference current phase θx can be enhanced. This makes it possible to reduce periodical control fluctuation in the d-axis current and the q-axis current. Further, it is possible to enhance the accuracy of calculation of current estimation value iu_est, that is, convergence to a true value during a period of transition, such as the time of change in current command value.

In the current feedback control scheme, the β-axis current iβ can also be calculated based on the differential value of the α-axis current as in the torque feedback control scheme. However, it is supposed that this method is not necessarily suitable because of the following two reasons. First, use of the differential value is on the precondition that the waveform varies; therefore, especially, when a sine wave does not vary so much, for example, in the case of a low rotation range or low current, there is a possibility that sufficient differentiation accuracy cannot be obtained. Second, the α-axis current iα based on the current detection value iw_sns in the sensor phase does not necessarily have a regularly increasing/decreasing waveform like an ideal sine wave; therefore, there is a possibility that the waveform of the β-axis current iβ calculated by differentiation of this waveform is distorted.

(4) In this embodiment, a method in which the following processing is performed is recommended as a favorable calculation method for the differential value Δiα of the α-axis current in the torque feedback control scheme: the α-axis current iα is calculated based on the current detection value iw_sns in the sensor phase both at each switch time and at each intermediate time; and the differential value Δiα of the α-axis current is calculated by differentiating the α-axis current iα between switch times at each switch time and calculated by differentiating the α-axis current iα between intermediate times at each intermediate time.

As described above, the waveform of the current detection value detected at each switch time is distorted by the influence of switching operation. Meanwhile, the waveform of the current detection value detected at each intermediate time is not influenced by switching operation so much and the waveform thereof is hardly distorted. For this reason, the current waveform formed of both the current detection value at each switch time and the current detection value at each intermediate time does not regularly increase or decrease unlike a sine wave and tends to irregularly increase or decrease.

Meanwhile, the waveform of the current detection value detected at each switch time and the waveform of the current detection value detected at each intermediate time both substantially regularly increase or decrease. Therefore, the following can be implemented by differentiating the α-axis current between the switch times or between the intermediate times: the β-axis current iβ can be accurately calculated substantially without the influence of a current detection value which irregularly increases or decreases between the switch time and the intermediate time. Further, it is possible to enhance the accuracy of calculation of sensor phase reference current phase θx based on the α-axis current iα and the β-axis current iβ.

(5) In this embodiment, one intermediate time is set in the intermediate phase between successive switch times so that the electrical angle change between such an intermediate time and the switch time is 30[°]. This makes it possible to ensure the minimum number of intermediate times. Since the electrical angle change between the switch time and the intermediate time is constant at 30[°], it is possible to simplify control and reduce the processing load on a microcomputer and the like.

(6) In this embodiment, the following processing is performed at the first or the first and second current detection times after switching from the current feedback control scheme to the torque feedback control scheme: a set of the electrical angle at that time and the calculation value of the α-axis current is taken as the present time value; and a set of the electrical angle at the current detection time in operation in the current feedback control scheme before switching and the value of the α-axis current is taken as the past value. Then these sets are used in the calculation of the differential value Δiα of the α-axis current.

This makes it possible to, even when the control scheme is switched, transfer control information, such as the current estimation value, before switching and carry out the continuous current estimation across switching.

(7) The torque estimation section 56 in this embodiment calculates the torque estimation value trq_est by the average value based on the following: the d-axis current estimation value id_est and the q-axis current estimation value iq_est calculated at some switch time; and the d-axis current estimation value id_est and the q-axis current estimation value iq_est calculated at the next intermediate time. This makes it possible to suppress abrupt fluctuation in torque estimation value trq_est.

In the above switching pattern (5), the differentiation between the switch time and the intermediate time is substantially performed at the first switch time $t_{1s}$ after switching. However, when the torque estimation value trq_est is calculated, the influence of the current detection value at the switch time can be diluted by taking the following measure: the torque estimation value trq_est is calculated by the average value of the d-axis current estimation value id_est and the q-axis current estimation value iq_est calculated based on the differential value between the intermediate times.

Second Embodiment

In the first embodiment, the sensor phase reference current phase θx is calculated by taking the following measure when the torque feedback control scheme which does not involve the d-axis current command value id* or the q-axis current command value iq* is applied: the β-axis current iβ is calculated based on the differential value Δiα of the α-axis current iα. Thereafter, the following processing is performed as in the current feedback control scheme which involves the d-axis current command value id* and the q-axis current command value iq*: the current estimation value iu_est in the phases other than the sensor phase are calculated based on the sensor phase reference current phase θx and the current detection value iw_sns in the sensor phase using equation (11) or equation (13); and the d-axis current estimation value id_est and the q-axis current estimation value iq_est are estimated using equation (15).

In a second embodiment, meanwhile, the following processing is performed when the torque feedback control scheme which does not involve the d-axis current command value id* or the q-axis current command value iq* is applied: using an asymptotic estimation operation, or another estimation method, a d-axis current estimation value id_est and a q-axis current estimation value iq_est are estimated from the current detection value iw_sns in the sensor phase in one phase. A basic example of the second embodiment will be described with reference to FIG. 28 and FIGS. 29A, 29B. Further, a modification of the second embodiment will be described with reference to FIG. 30 and FIG. 31.

In the asymptotic estimation operation, the d-axis current estimation value id_est and the q-axis current estimation value iq_est are accurately estimated by utilizing that a W-phase axis is relatively rotated on a dq-axis plane, which is a rotating coordinate system. A W-phase estimation error Δiw is integrated to approximate them to a d-axis actual current value id and a q-axis actual current value iq.

Figure 28:
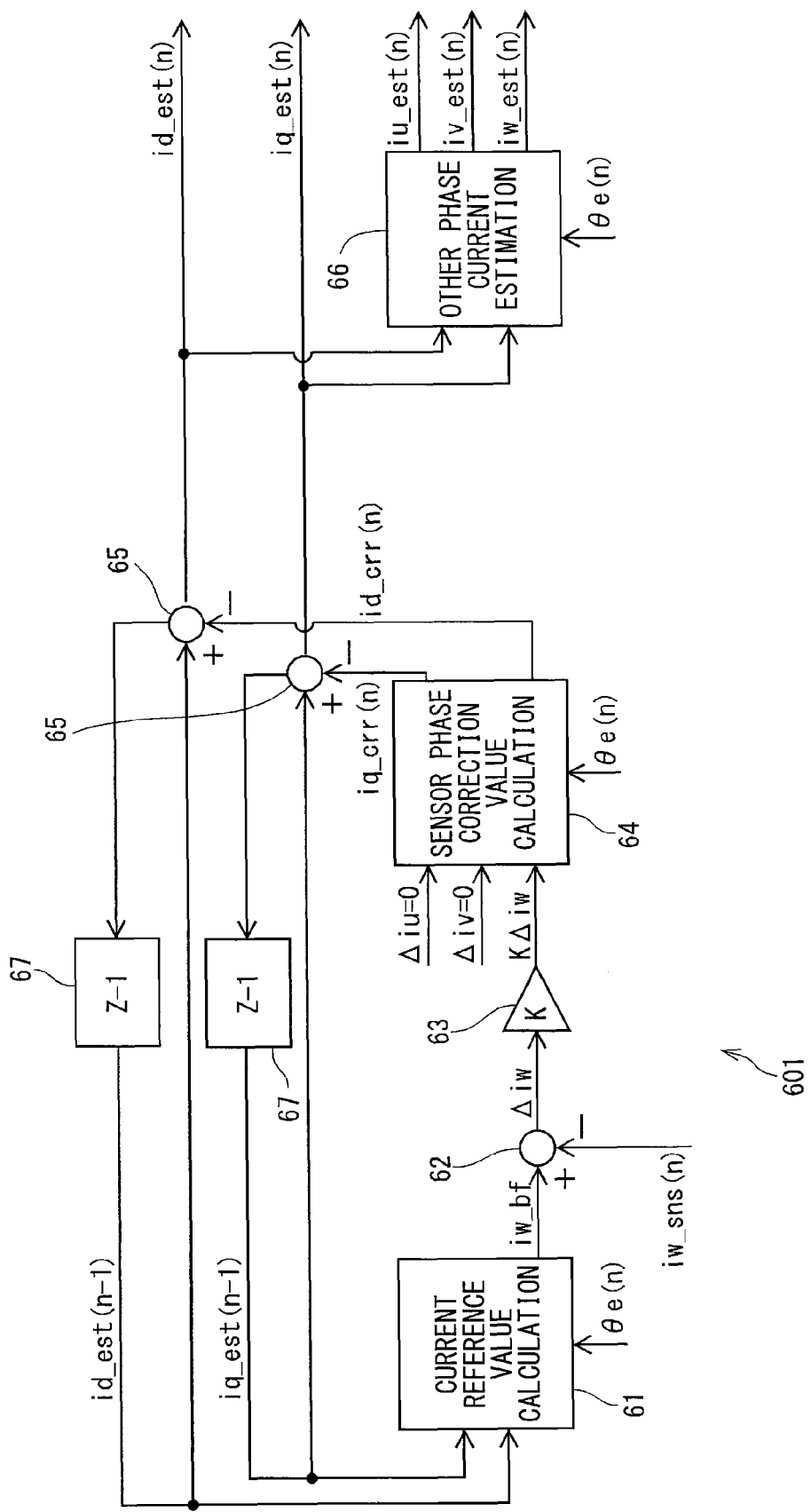
FIG. 28 is a block diagram illustrating the configuration of a current estimation section according to a second embodiment.

As illustrated in FIG. 28, a current estimation section 601 is provided in the basic example of the second embodiment. The current estimation section 601 includes: a current reference value calculation section 61, a subtracter 62, an error correction section 63, a sensor phase axis correction value calculation section 64, subtracters 65, an other phase current estimation section 66, and delay elements 67. It repeatedly carries out the asymptotic estimation operation in a predetermined operation cycle. The asymptotic estimation operation based on the W-phase current detection value iw_sns inputted at the present time is taken as the n-th operation; the inputted W-phase current detection value is taken as iw_sns(n) and the electrical angle is taken as θ(n), and the current estimation value obtained by this operation is expressed as i#_est(n) (however, # is d, q, u, v, w).

The current reference value calculation section 61 is inputted with the d-axis current estimation value id_est(n−1) and the q-axis current estimation value iq_est(n−1) calculated by the previous operation. It carries out the inverse dq conversion using the d-axis current estimation value id_est(n−1), the q-axis current estimation value iq_est(n−1) and the electrical angle θe(n). It thereby calculates the current reference value iw_bf of the W-phase component in the sensor phase.

At the subtracter 62, the W-phase estimated error Δiw which is the difference between the current reference value iw_bf and the present W-phase current detection value iw_sns(n) is calculated.

At the error correction section 63, the W-phase estimated error Δiw is multiplied by gain K to calculate a corrected estimated error KΔiw. Gain K functions as a lowpass filter (LPF) provided in the d-axis current estimation value id_est and the q-axis current estimation value iq_est. It adjusts the abruptness of variation in the d-axis current estimation value id_est and the q-axis current estimation value iq_est. The value of gain K is within a range of 0<K<1 and it is expressed as (1/Klpf) when the desired number of times of operation of the time constant of the LPF (time constant divided by operation cycle) is taken as Klpf.

At the sensor phase axis correction value calculation section 64, it is set that Δiu=0 and Δiv=0 and the corrected estimated error KΔiw is dq-converted. The d-axis current correction value id_crr(n) and the q-axis current correction value iq_crr(n) in the sensor phase axis direction are thereby calculated. In this embodiment, the d-axis current correction value id_crr(n) and q-axis current correction value iq_crr(n) in the sensor phase axis direction correspond to correction vector. In the following description, a vector which has the d-axis current correction value id_crr(n) and q-axis current correction value iq_crr(n) in the sensor phase axis direction respectively as a d-axis component and a q-axis component will be expressed as a correction vector (Δid, Δiq) as appropriate.

The correction vector constantly indicates one set of (Δid, Δiq). It should be noted that it is different from the d-axis current difference Δid and the q-axis current difference Δiq inputted to the PI calculation section 23 or the like in the current feedback control scheme described with reference to FIG. 5 and FIG. 6.

At the subtracter 65, the d-axis current corrected value id_crr(n) in the sensor phase axis direction is subtracted from the previous d-axis current estimation value id_est(n−1) fed back via the delay element 67 to calculate a d-axis current estimation value id_est(n). Further, the q-axis current correction value iq_crr(n) in the sensor phase axis direction is subtracted from the previous q-axis current estimation value iq_est(n−1) fed back via the delay element 67 to calculate a q-axis current estimation value iq_est(n).

That the following processing is performed at the subtracter 65 as integration of a correction vector on the dq-axis plane: the d-axis current correction value id_crr(n) in the sensor phase axis direction is subtracted from the previous d-axis current estimation value id_est(n−1); and the q-axis current correction value in the sensor phase axis direction is subtracted from the previous q-axis current estimation value iq_est(n−1).

The d-axis current estimation value id_est(n) and the q-axis current estimation value iq_est(n) thus estimated at the current estimation section 601 are fed back to the current reference value calculation section 61 via the delay element 67.

At the other phase current estimation section 66, the d-axis current estimation value id_est(n) and the q-axis current estimation value iq_est(n) are inverse-dq-converted based on the electrical angle θe(n). Part or all of the three-phase current estimation values iu_est(n), iv_est(n), iw_est(n) are calculated as required.

Equation (19) indicates a recurrence equation representing the asymptotic estimation operation in the basic example. In equation (19), the phase θw(n) relative to the W-phase is equivalent to the electrical angle θe(n)+120[°].

K×{cos(θw(n))}×Δiw corresponds to the d-axis current correction value id_crr(n) in the sensor phase axis direction and K×{−sin(θw(n))}×Δiw corresponds to the q-axis current correction value iq_crr(n) in the sensor phase axis direction.

$$\begin{bmatrix} id\_est(n) \\ iq\_est(n) \end{bmatrix} = \begin{bmatrix} id\_est(n-1) \\ iq\_est(n-1) \end{bmatrix} - K \begin{bmatrix} \cos(\theta w(n)) \\ -\sin(\theta w(n)) \end{bmatrix} \Delta iw \quad (19)$$

Figure 29A:
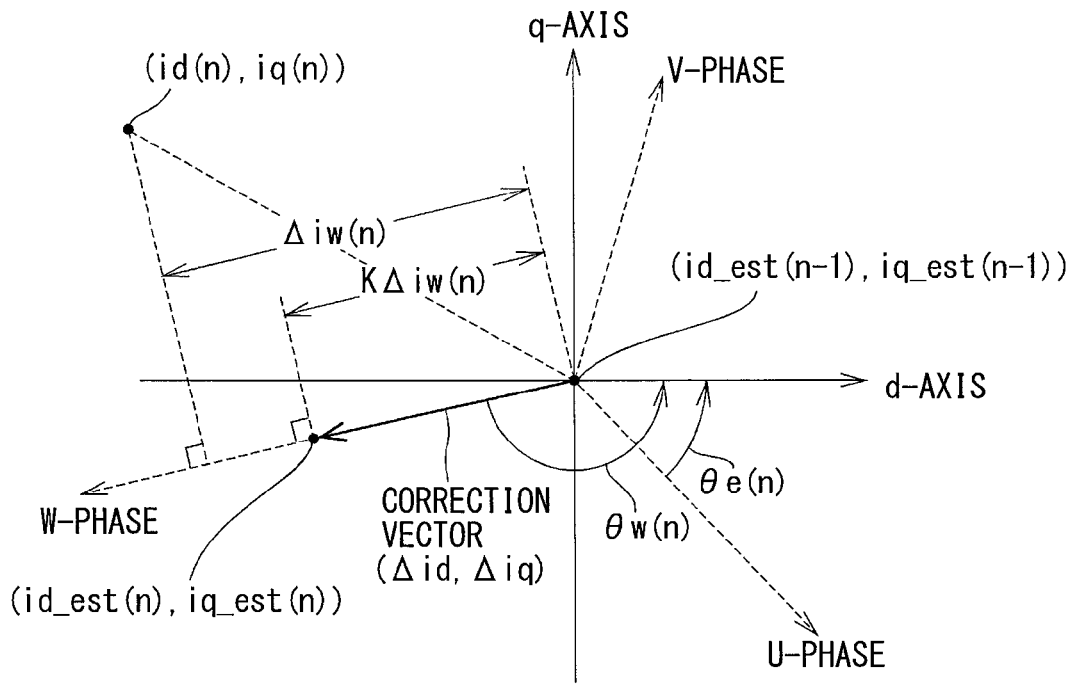
FIGS. 29A and 29B are vector diagrams explaining asymptotic estimation operation in the second embodiment.

When the recurrence equation indicated by equation (19) is expressed by vector diagram, FIG. 29A is obtained.

Figure 29B:
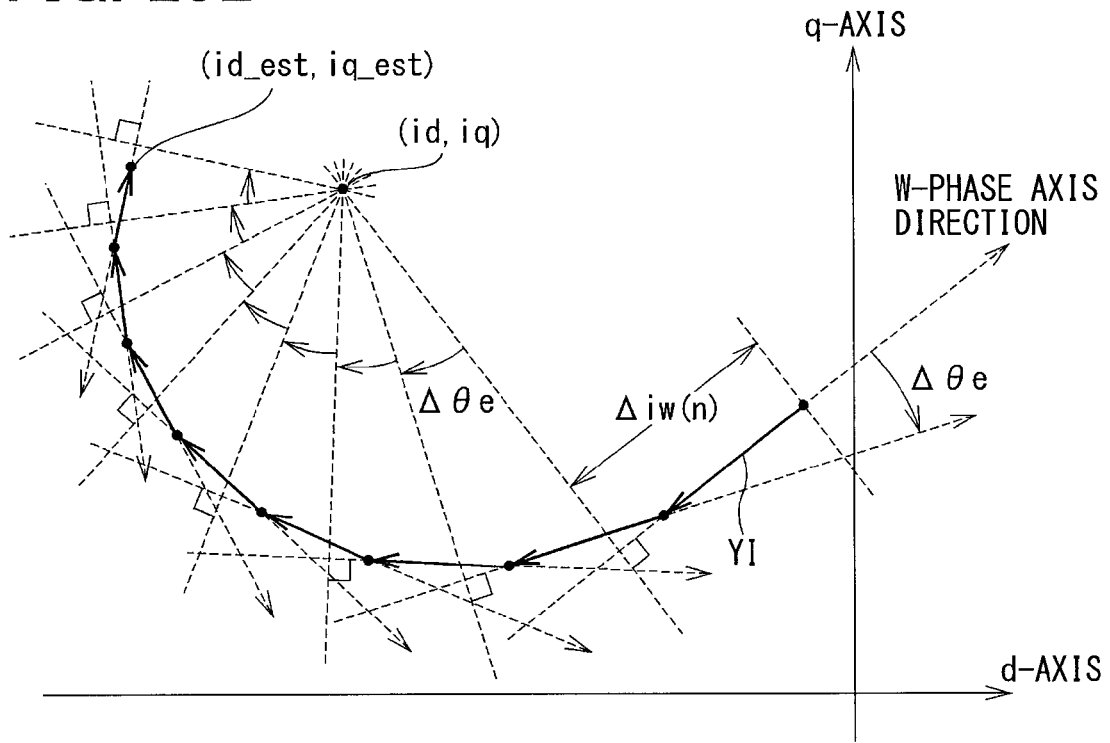

As illustrated in FIG. 29B, that the W-phase axis is relatively rotated on the dq-axis plane as the rotating coordinate system is utilized and the correction vector (Δid, Δiq) indicated by arrow Y1 is integrated. The d-axis current estimation value id_est and the q-axis current estimation value iq_est are thereby approximated to the d-axis actual current value id and the q-axis actual current value iq.

Gain K is the filter element for governing the speed at which the d-axis current estimation value id_est and the q-axis current estimation value iq_est approximate to the d-axis actual current value id and the q-axis actual current value iq. When the gain K is too large, that is, it has a value close to 1, an error vector Δle, which is the difference between the d-axis current estimation value id_est and the q-axis current estimation value iq_est and the d-axis actual current value id and the q-axis actual current value iq, becomes near orthogonal to the W-phase axis. Then it moves so that it draws a vortex in the direction of the circumference with the d-axis actual current value id and the q-axis actual current value iq at the center. This makes it difficult for the d-axis current estimation value id_est and the q-axis current estimation value iq_est to approximate to the d-axis actual current value id and the q-axis actual current value iq. In consideration of this regard, the gain K is set to such a value that the estimation values readily approximate to the d-axis actual current value id and the q-axis actual current value iq as appropriate within the range of 0<K<1.

Modification to Second Embodiment

In the above-described basic example, the direction of the correction vector (Δid, Δiq) is the sensor phase axis direction. The modification described below is different from the basic example in that a vector component in the direction orthogonal to the sensor phase axis is included in the correction vector ($\Delta$id, $\Delta$iq). In the following description, the axis orthogonal to the sensor phase axis is referred to as the R axis and the direction orthogonal to the sensor phase axis is referred to as the orthogonal direction.

Figure 30:
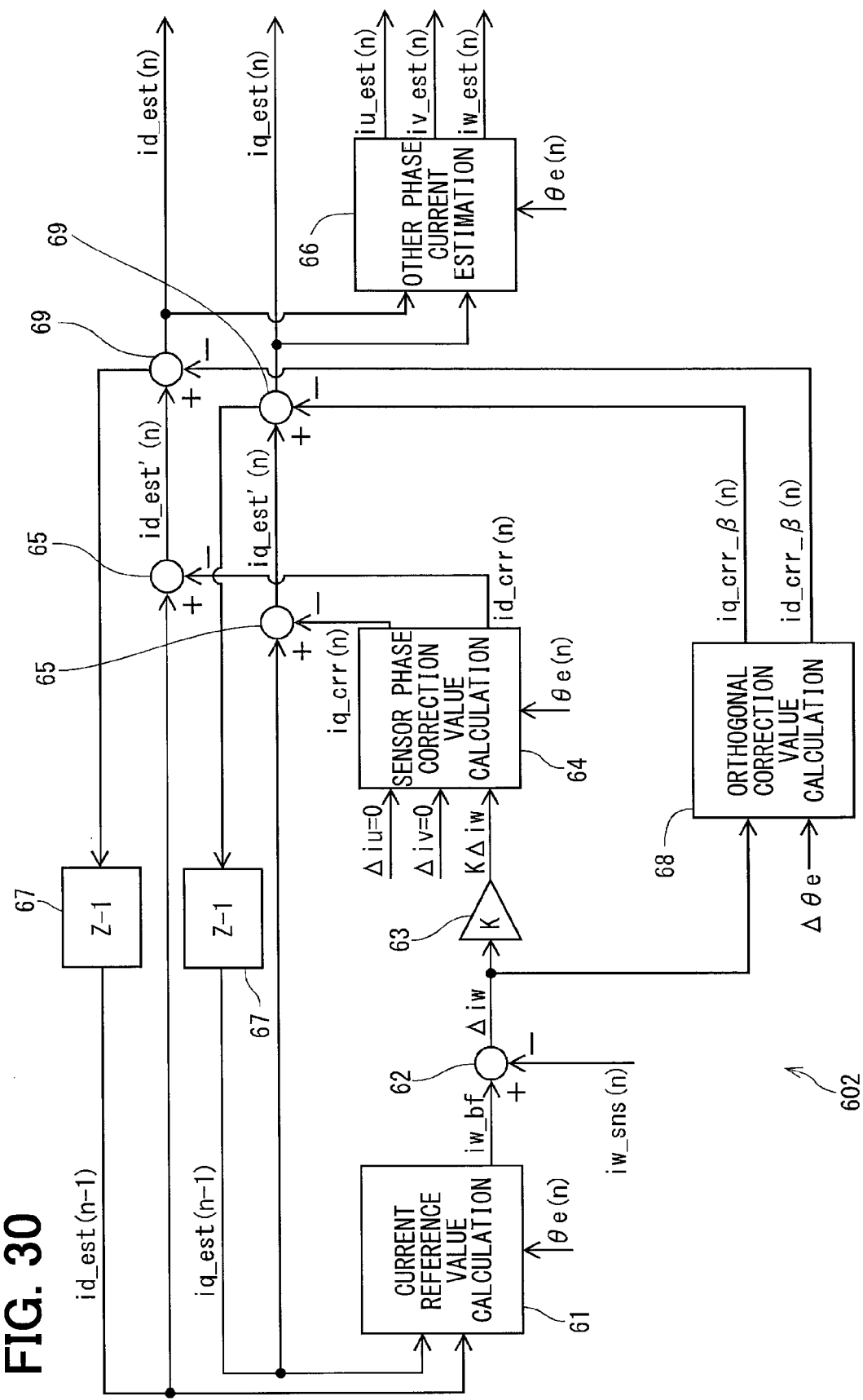
FIG. 30 is a block diagram illustrating the configuration of a current estimation section according to a modification of the second embodiment.

As illustrated in FIG. 30, a current estimation section 602 has an orthogonal direction correction value calculation section 68 in addition to the configuration elements of the basic example shown in FIG. 28.

In the modification, at the sensor phase axis correction value calculation section 64, the d-axis current correction value id_crr(n) and the q-axis current correction value iq_crr(n) in the sensor phase axis direction are calculated. At the subtracter 65, the d-axis current correction value id_crr(n) in the sensor phase axis direction is subtracted from the previous d-axis current estimation value id_est(n−1) fed back via the delay element 67. A d-axis current temporary estimation value id_est'(n) corrected in the W-phase direction is thereby calculated. At the subtracter 65, similarly, the q-axis current correction value iq_crr(n) in the sensor phase axis direction is subtracted from the previous q-axis current estimation value iq_est(n−1) fed back via the delay element 67. A q-axis current temporary estimation value iq_est'(n) corrected in the W-phase direction is thereby calculated. The d-axis current temporary estimation value id_est'(n) and the q-axis current temporary estimation value iq_est'(n) are the same as the d-axis current estimation value id_est(n) and the q-axis current estimation value iq_est(n) in the basic example, respectively.

At the orthogonal direction correction value calculation section 68, a β-axis estimated error $\Delta i\beta$ which is a component orthogonal to the sensor phase axis is calculated by equation (20). In addition, the d-axis current correction value id_crr_β(n) and the q-axis current corrected value iq_crr_β(n) in the orthogonal direction are calculated by dq conversion by equation (21) using the β-axis estimated error $\Delta i\beta$.

At the subtracter 69, the orthogonal direction d-axis current correction value id_crr_β(n) is subtracted from the d-axis current temporary estimation value id_est'(n) to calculate a d-axis current estimation value id_est(n). Further, the orthogonal direction q-axis current correction value iq_crr_β(n) is subtracted from the q-axis current temporary estimation value iq_est'(n) to calculate a q-axis current estimation value iq_est(n).

$$\Delta i\beta = \frac{\cos\Delta\theta e}{\sin\Delta\theta e}\left\{\Delta iw(n) - \frac{1}{\cos\Delta\theta e}(1-K)\Delta iw(n-1)\right\} \quad (20)$$

$$\begin{bmatrix} \text{id\_crr}\_\beta(n) \\ \text{iq\_crr}\_\beta(n) \end{bmatrix} = K\begin{bmatrix} \cos(\theta w(n)+90°) \\ -\sin(\theta w(n)+90°) \end{bmatrix}\Delta i\beta \quad (21)$$

Equation (22) is a recurrence equation representing the asymptotic estimation operation in the modification.

$$\begin{bmatrix} \text{id\_est}(n) \\ \text{iq\_est}(n) \end{bmatrix} = \begin{bmatrix} \text{id\_est}(n-1) \\ \text{iq\_est}(n-1) \end{bmatrix} - K\begin{bmatrix} \cos(\theta w(n)) \\ -\sin(\theta w(n)) \end{bmatrix}\Delta iw - \begin{bmatrix} \text{id\_crr}\_\beta(n) \\ \text{iq\_crr}\_\beta(n) \end{bmatrix} \quad (22)$$

Figure 31:
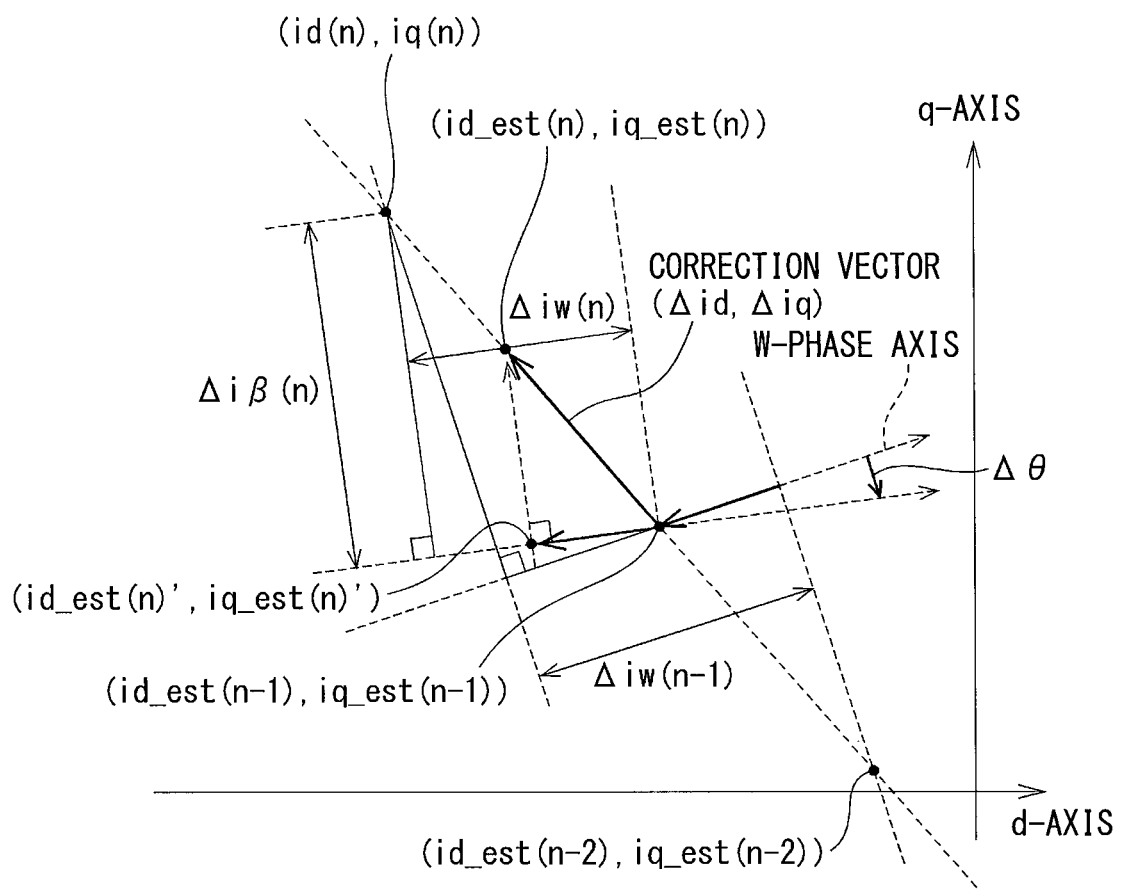
FIG. 31 is a vector diagram explaining asymptotic estimation operation according to a modification of the second embodiment.

When the recurrence equation indicated by equation (22) is expressed by a vector diagram, FIG. 31 is obtained. In FIG. 31, the resultant vector of the following corresponds to the a correction vector ($\Delta$id, $\Delta$iq): the d-axis current correction value id_crr(n) and the q-axis current correction value iq_crr(n) in the sensor phase axis direction; and the d-axis current correction value id_crr_β(n) and the q-axis current correction value iq_crr_β(n) in the orthogonal direction.

At the current estimation section 602 in the modification, as shown in FIG. 31, the correction vector ($\Delta$id, $\Delta$iq) calculated based on the estimated error $\Delta$iW is integrated on the dq-axis plane and a d-axis current estimation value id_est(n) and a q-axis current estimation value iq_est(n) are thereby estimated. The estimated error $\Delta$iW is the difference between a current reference value iw_bf which is the sensor phase component of the d-axis current estimation value id_est(n−1) and the q-axis current estimation value iq_est(n−1) calculated by the previous operation and the W-phase current detection value iw_sns.

In the modification, in contrast to the basic example, the response of convergence to the d-axis actual current value id and the q-axis actual current value iq can be enhanced by taking the following measure: the d-axis current estimation value id_est(n−1) and the q-axis current estimation value iq_est(n−1) are corrected not only in the sensor phase axis direction but also in the orthogonal direction.

In the modification, the following processing corresponds to integration of a correction vector on the dq-axis plane: at the subtracter 65, the d-axis current corrected value id_crr(n) in the sensor phase axis direction is subtracted from the previous d-axis current estimation value id_est(n−1) and at the subtracter 69, the orthogonal direction d-axis current correction value id_crr_β(n) is subtracted from the same; at the same time, at the subtracter 65, the q-axis current corrected value iq_crr(n) in the sensor phase axis direction is subtracted from the previous q-axis current estimation value iq_est(n−1) and at the subtracter 69, the orthogonal direction q-axis current correction value iq_crr_β(n) is subtracted from the same.

As described above, in the basic example of the second embodiment and the modification thereto, the following can be implemented by integrating the correction vector ($\Delta$id, $\Delta$iq) on the dq-axis plane by asymptotic estimation operation: the d-axis current estimation value id_est and the q-axis current estimation value iq_est can be estimated without use of the d-axis current command value id* or the q-axis current command value iq*.

Therefore, the motor control apparatus 10 can switch the control scheme for the energization of the AC motor 2 as described below, for example. When the current feedback control scheme is applied, the d-axis current estimation value id_est and the q-axis current estimation value iq_est are estimated by the current estimation method in the first embodiment. Meanwhile, when the torque feedback control scheme is applied, the d-axis current estimation value id_est and the q-axis current estimation value iq_est are estimated by the asymptotic estimation operation in this embodiment.

Also in the second embodiment as in the first embodiment, continuity can be ensured by preferably taking the following measure when the control scheme is switched: the current detection value iw_sns in the sensor phase and the electrical angle θe are constantly held as the previous values. Since the recurrence equation is used in the second embodiment, it is necessary to hold the previous values of the current detection value iw_sns in the sensor phase and the electrical angle θe regardless of the control scheme; therefore, continuity can be ensured at the time of switching.

In the asymptotic estimation operation in the second embodiment, the electrical angle change $\Delta\theta e$ between the previous operation and the present operation is relatively small in a low rotation range in which the current feedback control scheme is applied. In a low torque range, current change is relatively small. Therefore, the accuracy of estimation tends to be degraded. In the current feedback control scheme, therefore, use of the estimation method using the current command value is preferable to use of the asymptotic estimation operation.

Other Embodiments (A) In relation to the above-described embodiments, the following method is described as the best current estimation method which the current estimation sections 301, 302 can employ when the current feedback control scheme is applied: a method of obtaining the β-axis current iβ from the current detection value iw_sns in the sensor phase and the current command value (for example, iv*) in one phase other than the sensor phase in the α-β coordinate system (Equation (7)). There is also the following method though it can be inferior in the accuracy of detection of the sensor phase reference current phase θx to the above method: a method of obtaining the β-axis current iβ from the current detection value iw_sns in the sensor phase and the current command values (iu*, iv*) in the two phases other than the sensor phase (Equation (6)).

However, the current estimation method which the current estimation section can employ when the current feedback control scheme which involves the d-axis current command value id* and the q-axis current command value iq* is applied is not limited to the following: those based on the α-axis current iα and the β-axis current iβ in the α-β coordinate system as in the above-described embodiments. For example, the following technology can be applied to only the current feedback control scheme which involves the d-axis current command value id* and the q-axis current command value iq*: the technology in patent document 1 or patent document 3.

That is, it is difficult in the above-referred patent documents 1 and 2 to switch control using the same coordinate system or estimation logic identical at least at the basic part between the current feedback control scheme and the torque feedback control scheme. Therefore, the current estimation method in the conventional art may be applied to the current feedback control scheme based on the philosophy that the current estimation method which can be employed in each control scheme is individually selected. In this case, continuity at the time of switching the control scheme may be taken into account or may be not.

In summary, the core technical idea is that the current estimation method is switched between the following in a control apparatus for an AC motor: control in which a current estimation value is fed back to a current command value and control in which a torque estimation value based on a current estimation value is fed back to a torque command value. Therefore, an estimation method that uses a current command value and an estimation method that does not use a current command value may be combined.

(B) The sensor phase in which the phase current is detected with the current sensor is not limited to the W-phase in the embodiments and may be the U-phase or the V-phase. The estimated phase in which the current estimation value is calculated from the current detection value in the sensor phase and the sensor phase reference current phase θx is not limited to the U-phase in the embodiments and may be the V-phase or the W-phase.

(C) The current feedback control scheme is not limited to the sine wave PWM control mode or the overmodulation PWM control mode in which the PWM command signal is used. It may be any control scheme as long as the current command value is used and the current detection value or the current estimation value based on the current detection value is fed back to the current command value.

The torque feedback control scheme is not limited to the rectangular wave control mode in the above-described embodiments. It may be any control scheme as long as the torque estimation value based on the current detection value pertaining to driving of the AC motor is fed back to the torque command value. Alternatively, in place of the torque estimation value, the detection value about the physical quantity other than the current, for example, a value obtained by directly detecting torque with a torque sensor or the like may be fed back to the torque command value.

(D) In the first embodiment, the current detection value is only in one phase. Therefore, as a measure against that the dq conversion cannot be implemented, the following method is adopted: a method of estimating the current in the phases other than the sensor phase at the current estimation sections 301, 302, 303 of the controller 15 to implement the dq conversion. However, the implementation of the dq conversion based on the current detection value in one phase is not limited to this. For example, a new dq conversion equation which holds with a current detection value only in one phase may be devised to cope therewith.

Figure 16:
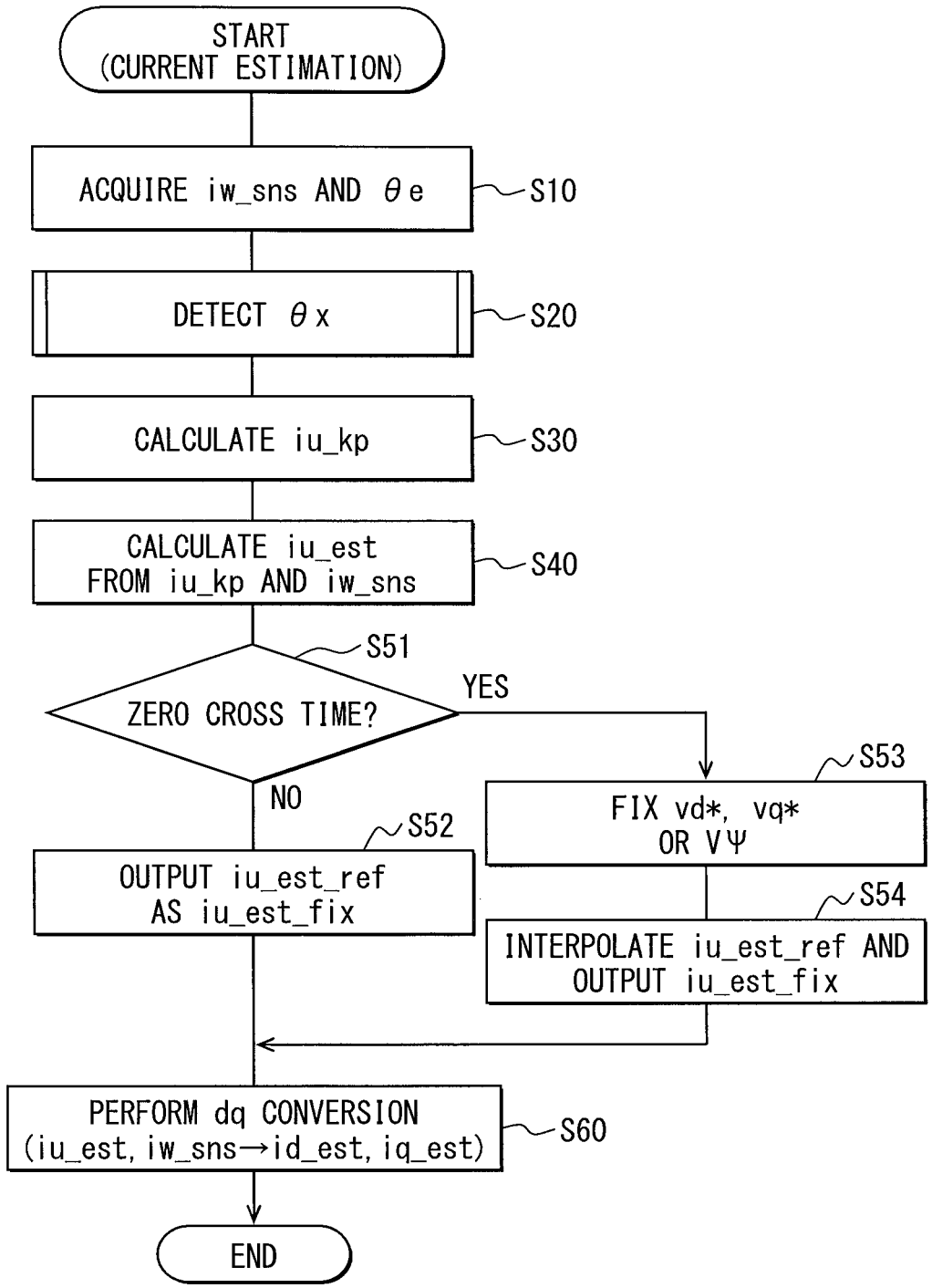
FIG. 16 is a flowchart of current estimation processing according to the first embodiment.
Figure 17:
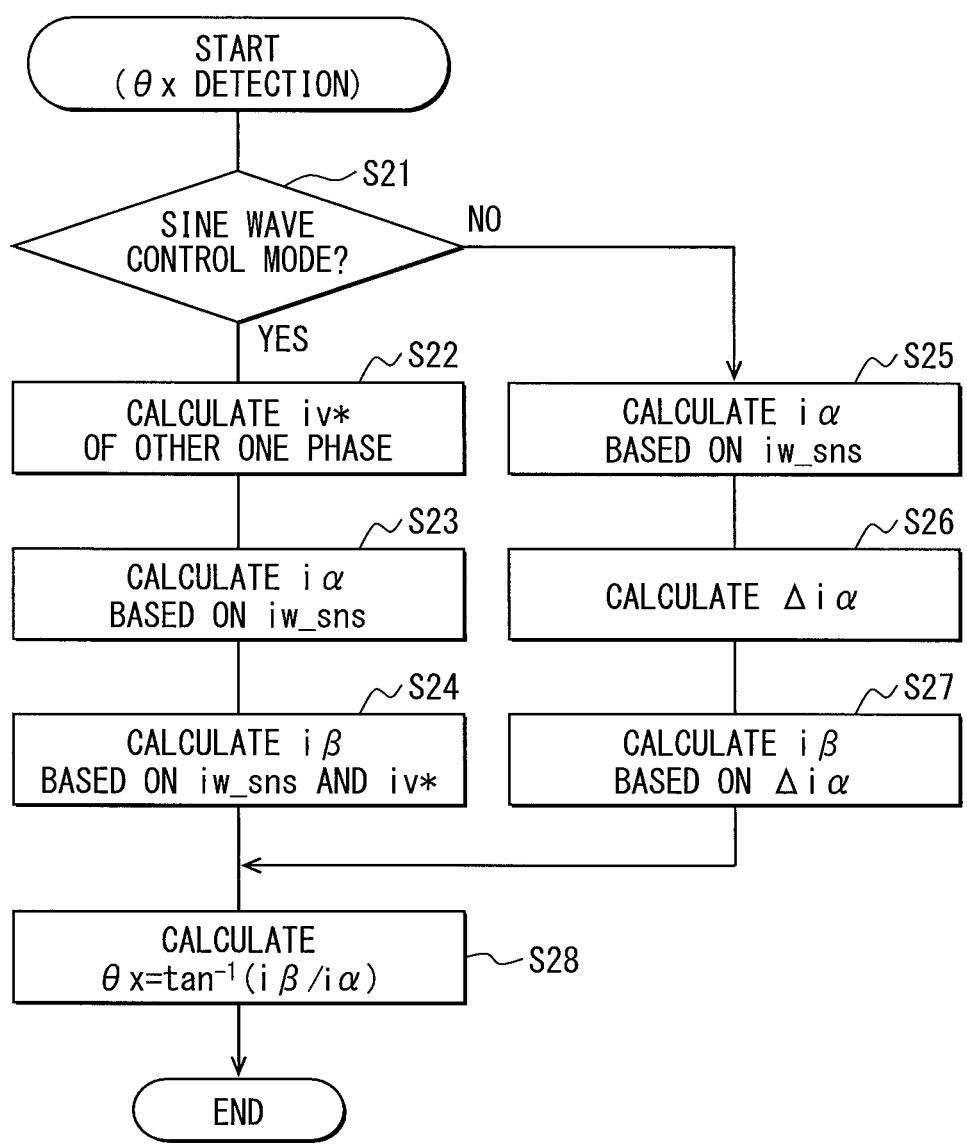
FIG. 17 is a flowchart of a sensor phase reference current phase detection processing in FIG. 16.

In this method, although a step at which a current estimation value in a phase other than the sensor phase is outputted like S52 or S54 in FIG. 16 is not present, it is understood that the operation equivalent to this step is inclusively executed within the dq conversion equation. However, the result of study reveals that both of the methods provide the same result in terms of mathematical expression.

(E) In the above-described embodiments, the AC motor is a permanent-magnet, synchronous, three-phase AC motor. In other embodiments, it may be an induction motor or any other synchronous motor. The AC motor in the embodiments is a motor-generator having functions of a motor and a generator. In other embodiments, it need not have functions of a generator.

(F) The control apparatus for an AC motor according to the embodiments is applicable not only to a system provided with only one set of an inverter and an AC motor as described with reference to the embodiments. It may be applied to a system provided with two or more sets of inverters and AC motors. Further, it may also be applied to a system of an electric train or the like in which multiple AC motors are parallel-connected to one inverter.

(G) The control apparatus for an AC motor need not be applied to an AC motor of a hybrid vehicle configured as in FIG. 1 but may be applied to an AC motor of an electric vehicle having any configuration. It may also be applied to an AC motor of some vehicles other than an electric vehicle.

What is claimed is:
1. A control apparatus for an AC motor comprising:
an inverter for driving a three-phase AC motor;
a current sensor for detecting a current flowing in a sensor phase in only one of three phases of the AC motor; and
a controller for controlling energization of the AC motor by switching turn-on/off of a plurality of switching elements of the inverter, the controller further switching a control scheme between a current feedback control scheme and a torque feedback control scheme in controlling energization of the AC motor, the current feedback control scheme feeding a current detection value in the sensor phase detected by the current sensor and a current estimation value based on the current detection value back to a current command value, and the torque feedback control scheme feeding a torque estimation value pertaining to driving of the AC motor back to a torque command value, wherein:

the controller has a current estimating section for estimating a d-axis current estimation. value and a q-axis current estimation value based on the current detection value in the sensor phase, and calculates the torque estimation value based on the d-axis current estimation value and the q-axis current estimation value calculated by the current estimating section when the torque feedback control scheme is applied;

the current estimation section calculates a sensor phase reference current phase as a current phase relative to the sensor phase based on an α-axis current and a β-axis current in a fixed coordinate system formed of an α-axis agreeing with the sensor phase and a β-axis orthogonal to the α-axis, calculates the current estimation value in a phase other than the sensor phase based on the sensor phase reference current phase and the current detection value in the sensor phase, and dq-converts the current detection value in the sensor phase and the current estimation value in the phase other than the sensor phase to estimate the d-axis current estimation value and the q-axis current estimation value; and the current estimation section calculates, with respect to calculation of the α-axis current and the β-axis current, the α-axis current based on the current detection value in the sensor phase and, at least when the torque feedback control scheme is applied, calculates the β-axis current based on a differential value of the α-axis current.

2. The control apparatus for an AC motor according to claim 1, wherein:
the current estimation section calculates, when the current feedback control scheme is applied, the β-axis current using the current command value in one phase or two phases other than the sensor phase.

3. The control apparatus for an AC motor according to claim 2, wherein:
the current estimation section calculates, when the current feedback control scheme is applied, the β-axis current based on the current command value in one phase other than the sensor phase and the current detection value in the sensor phase.

4. The control apparatus for an AC motor according to claim 1, wherein:
the current estimation section calculates, when the torque feedback control scheme is applied, the α-axis current based on the current detection value in the sensor phase at a switch time when turn-on/off of the switching elements is switched and at one or more intermediate times set between the successive switch times; and
the current estimation section calculates a differential value of the α-axis current based on an amount of change of the α-axis current to an electrical angle change between any two of the switch times or the intermediate times.

5. The control apparatus for an AC motor according to claim 4, wherein:
a plurality of the intermediate times are set between the successive switch times.

6. The control apparatus for an AC motor according to claim 5, wherein:
the current estimation section calculates, when the torque feedback control scheme is applied, the differential value of the α-axis current at each switch time based on the amount of change of the α-axis current to the electrical angle change between a present switch time and a previous switch time and the differential value of the α-axis current at each intermediate time based on the amount of change of the α-axis current to the electrical angle change between a present intermediate time and a previous intermediate time.

7. The control apparatus for an AC motor according to claim 6, wherein:
the current estimation section calculates, when an energization control scheme for the AC motor is switched from the current feedback control scheme to the torque feedback control scheme, at the switch time or the intermediate time when the α-axis current is calculated at least for a third or following time after switching, the differential value of the α-axis current at each switch time based on the amount of change of the α-axis current to the electrical angle change between the present switch time and the previous switch time and the differential value of the α-axis current at each intermediate time based on the amount of change of the α-axis current to the electrical angle change between the present intermediate time and the previous intermediate time.

8. The control apparatus for an AC motor according to claim 5, wherein:
the current estimation section calculates, when an energization control scheme for the AC motor is switched from the current feedback control scheme to the torque feedback control scheme, at the time when the α-axis current is calculated for a first or a second time after switching, the differential value of the α-axis current using past values which are a set of the electrical angle at the time when the current detection value in the sensor phase is detected during operation in the current feedback control scheme before switching and a value of the α-axis current calculated at that time.

9. The control apparatus for an AC motor according to claim 8, wherein:
the current estimation section calculates, at the switch time or the intermediate time for calculating the α-axis current for a first time after switching, the differential value of the α-axis current based on the amount of change of the α-axis current to the electrical angle change between the present switch time or the present intermediate time and the time when the current detection value in the sensor phase is detected last before switching.

10. The control apparatus for an AC motor according to claim 8, wherein:
the current estimation section calculates, at the switch time or the intermediate time for calculating the α-axis current for a first time after switching, the differential value of the α-axis current based on the amount of change of the α-axis current to the electrical angle change between the present switch time or the present intermediate time and the time when the current detection value in the sensor phase is detected at the second last time before switching, and
the current estimation section calculates, at the switch time or the intermediate time for calculating the α-axis current for a second time after switching, the differential value of the α-axis current based on the amount of change of the α-axis current to the electrical angle change between the present switch time or the present intermediate time and the time when the current detection value in the sensor phase is detected last before switching.

11. The control apparatus for an AC motor according to claim 1, wherein:
the torque estimation value is calculated based on an average value of at least two of the current estimation values calculated by the current estimation section.

12. The control apparatus for an AC motor according to claim 1, wherein:
the controller feeds, when the torque feedback control scheme is applied, a detected value about a physical quantity other than current back to the torque command value in place of the torque estimation value.

13. A control apparatus for an AC motor comprising:
an inverter for driving a three-phase AC motor;
a current sensor for detecting a current flowing in a sensor phase in only one of three of the AC motor; and
a controller for controlling energization of the AC motor by switching turn-on/off of a plurality of switching elements of the inverter, the controller further switching a control scheme between a current feedback control scheme and a torque feedback control scheme in controlling energization of the AC motor, the current feedback control scheme feeding a current detection value in the sensor phase detected b the current sensor and a current estimation value based on the current detection value back to a current command value, and the torque feedback control scheme feeding torque estimation value pertaining to driving of the AC motor hack to a torque command value, wherein:
the controller has a current estimating section for estimating a d-axis current estimation value and a q-axis current estimation value based on the current detection value in the sensor phase, and calculates the torque estimation value based on the d-axis current estimation value and the q-axis current estimation value calculated by the current estimating section when the torque feedback control scheme is applied, and
the current estimation section calculates, when the torque feedback control scheme is applied, estimates in an asymptotic estimation operation, which is repeatedly performed in a predetermined operation cycle, the d-axis current estimation value and the q-axis current estimation value by integrating on a dq-axis plane a correction vector calculated based on an estimated error which is a difference between a sensor phase current reference value as an axis component of the sensor phase based on the d-axis current estimation value and the q-axis current estimation value calculated by a previous operation and the current detection value in the sensor phase at a present time.

14. The control apparatus for an AC motor according to claim 13, wherein:
the current estimation section calculates the correction vector in the asymptotic estimation processing as a resultant vector of a correction value in a direction of a sensor phase axis and a correction value in a direction orthogonal to the sensor phase axis.

15. The control apparatus for an AC motor according to claim 13, wherein:
the torque estimation value is calculated based on an average value of at least two of the current estimation values calculated by the current estimation section.

16. The control apparatus for an AC motor according to claim 13, wherein:
the controller feeds, when the torque feedback control scheme is applied, a detected value about a physical quantity other than current back to the torque command value in place of the torque estimation value.

* * * * *